US007058593B1

(12) United States Patent
Merritt

(10) Patent No.: US 7,058,593 B1
(45) Date of Patent: Jun. 6, 2006

(54) COMBINATION ON-LINE SWEEPSTAKES AND SALES SYSTEM

(76) Inventor: Frederick L. Merritt, 291 N. Hubbards La. PMB 117, Louisville, KY (US) 40207

( * ) Notice: Subject to any disclaimer, the term of this patent is extended or adjusted under 35 U.S.C. 154(b) by 1169 days.

(21) Appl. No.: 09/625,660

(22) Filed: Jul. 26, 2000

Related U.S. Application Data

(60) Provisional application No. 60/145,910, filed on Jul. 27, 1999.

(51) Int. Cl.
*G06F 17/60* (2006.01)
(52) U.S. Cl. ...................................................... 705/14
(58) Field of Classification Search .................. 705/14
See application file for complete search history.

(56) References Cited

U.S. PATENT DOCUMENTS

| 5,724,521 | A | * | 3/1998 | Dedrick | 705/26 |
| 5,848,396 | A | * | 12/1998 | Gerace | 705/10 |
| 6,061,660 | A | * | 5/2000 | Eggleston et al. | 705/14 |

FOREIGN PATENT DOCUMENTS

JP        2001000727 A  *  1/2001

OTHER PUBLICATIONS

FREELOTTO, PlasmaNet, INc., http:\\www.freelotto.com (printed Oct. 31, 2000).
TREELOOT, Virtumundo, Inc., http:\\www.treeloot.com (printed Oct. 31, 2000).
WEBSTAKES.COM, Promotions.com, Inc., http:\\www.webstakes.com (printed Oct. 31, 2000).
By: Bognanno, Michael L, CEO pay as a tournament prize. .. Labor Law Journal, Aug. 1994, vol. 45 Issue 8, p. 485, 8p, 2 charts, 1 graph; (AN 9507050072)□□.*

* cited by examiner

*Primary Examiner*—Arthur Duran
(74) *Attorney, Agent, or Firm*—Stites & Harbison, PLLC; David W. Nagle, Jr.

(57) ABSTRACT

An Internet-based system allows registered users of the system to enter sweepstakes contests for various prizes, said prizes being offered by prize presenters registered with the system. Upon entry of a particular sweepstakes, the sweepstakes player is re-directed to an advertisement based on the demographic information previously entered by the user. Advertisers registered with the system pay for these re-directions. Once a predetermined number of re-directions has occurred, creating a predictable amount of revenue generation, prize presenters are compensated for offering the various sweepstakes prizes.

14 Claims, 69 Drawing Sheets

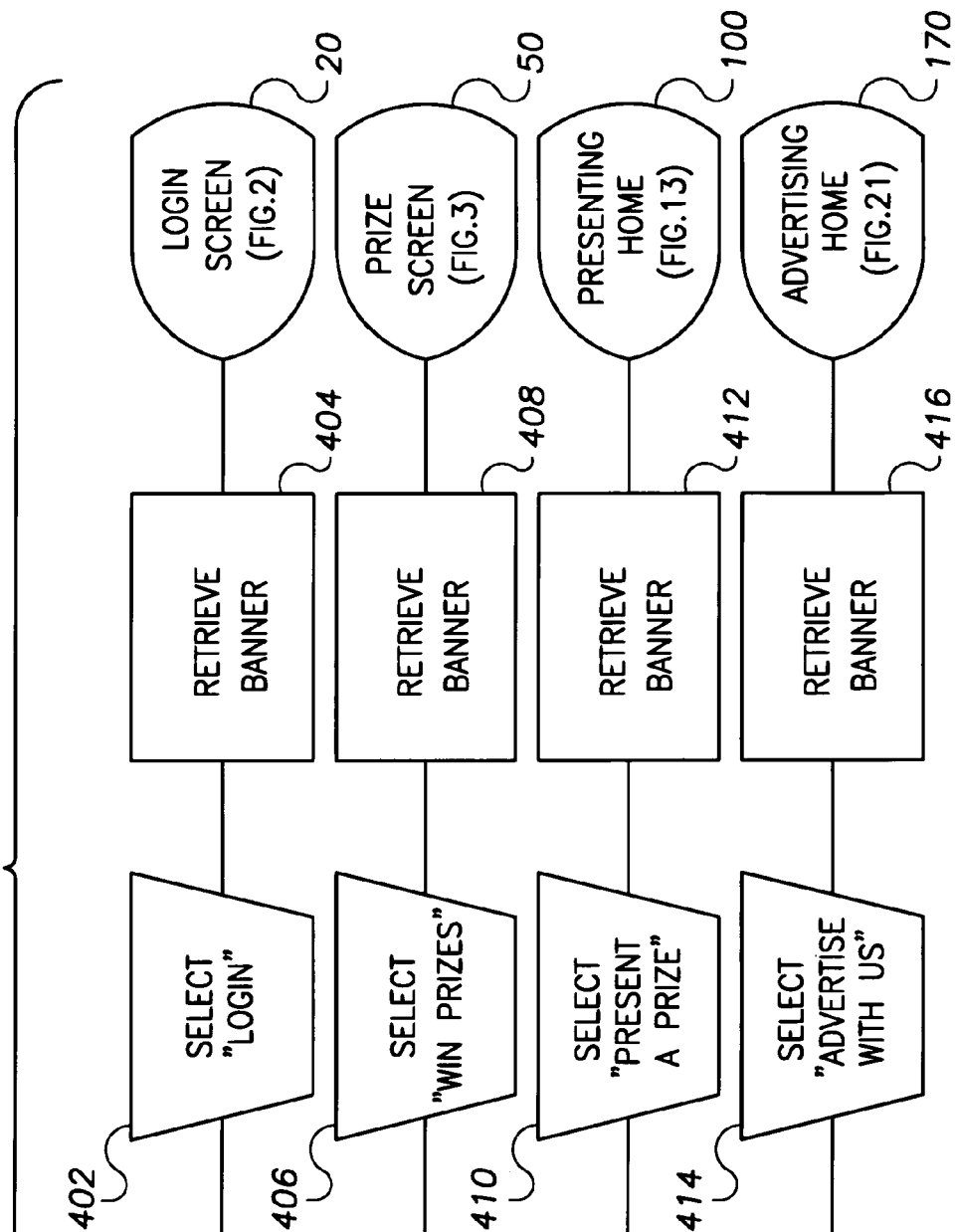

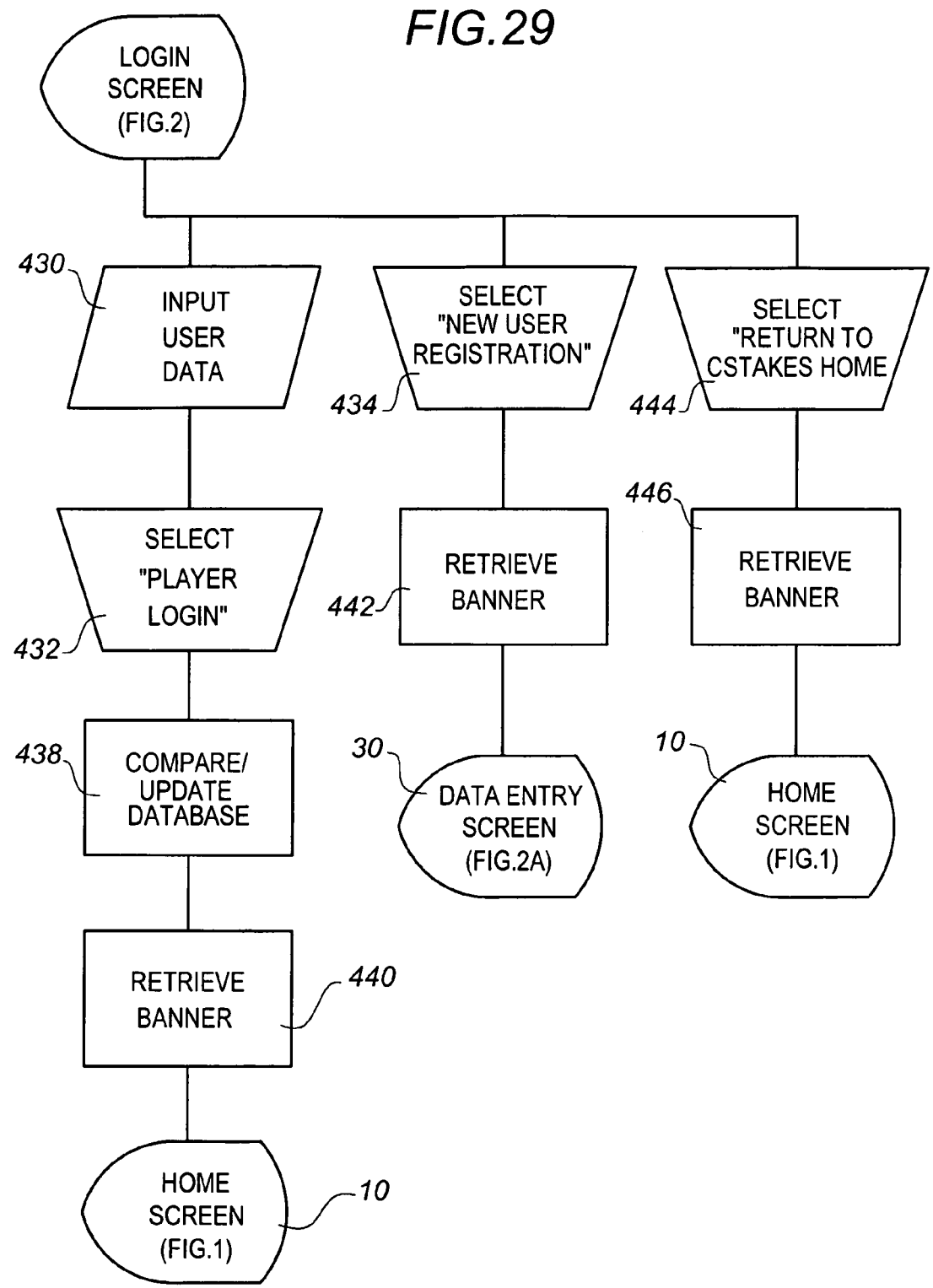

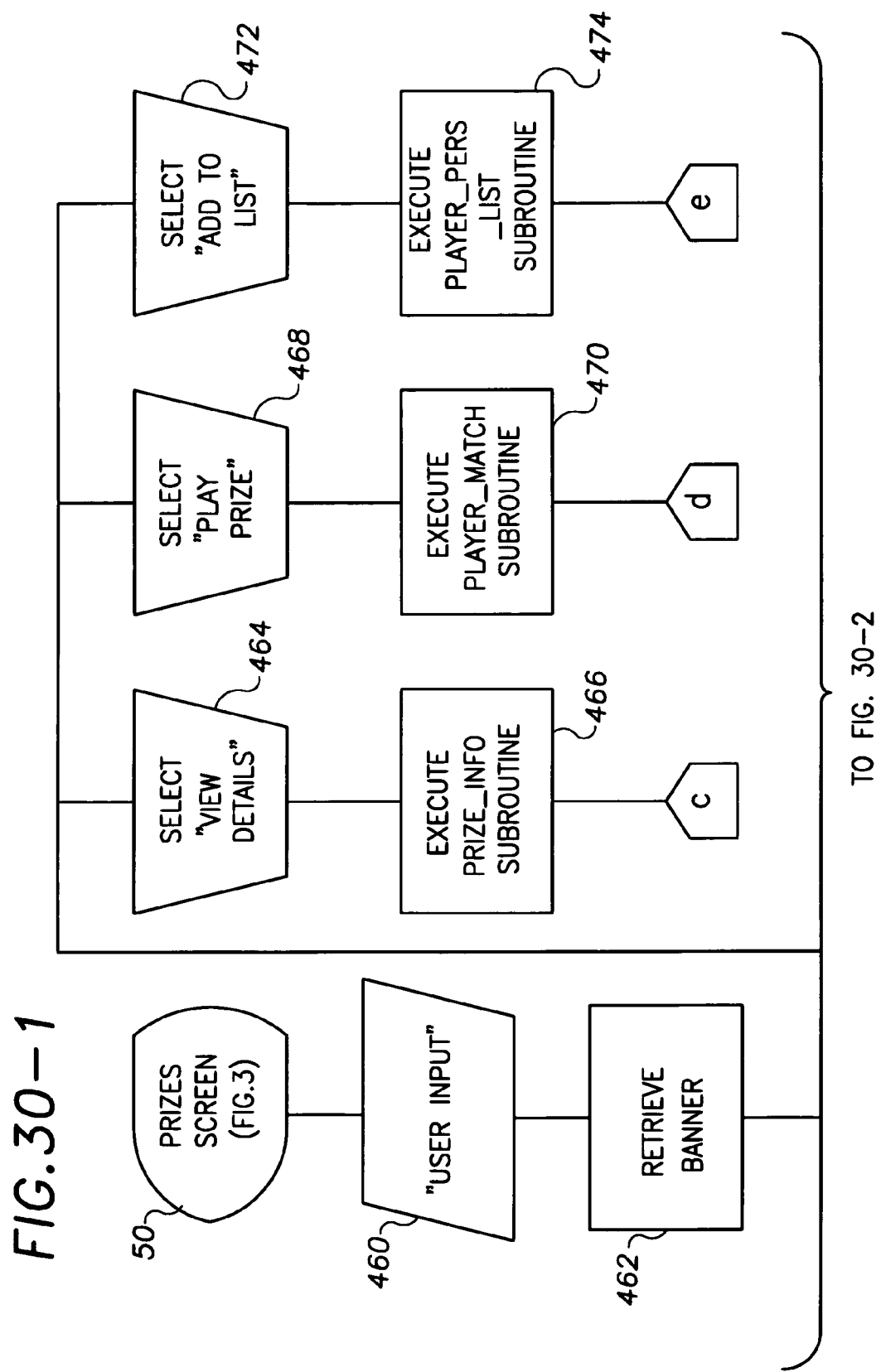

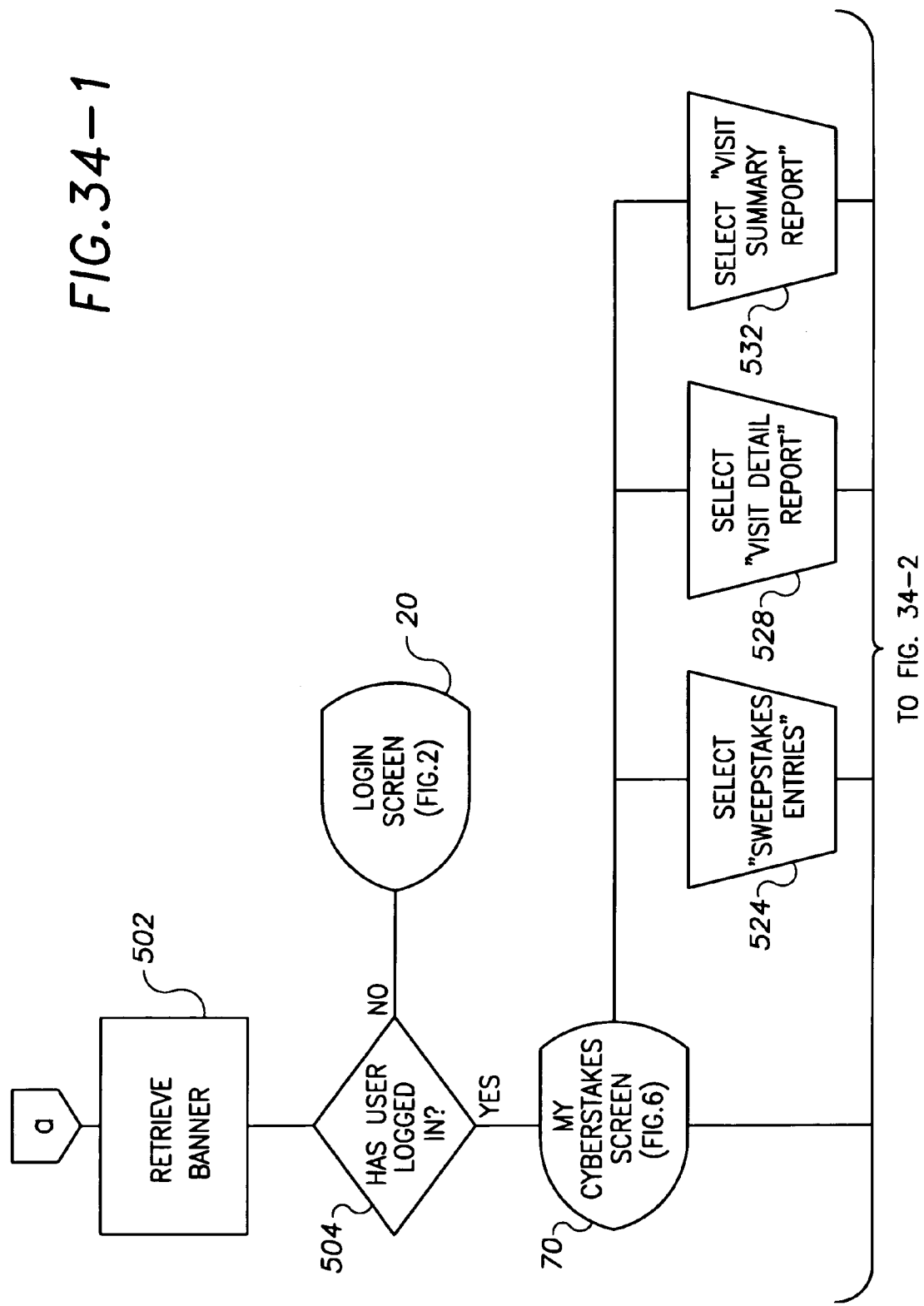

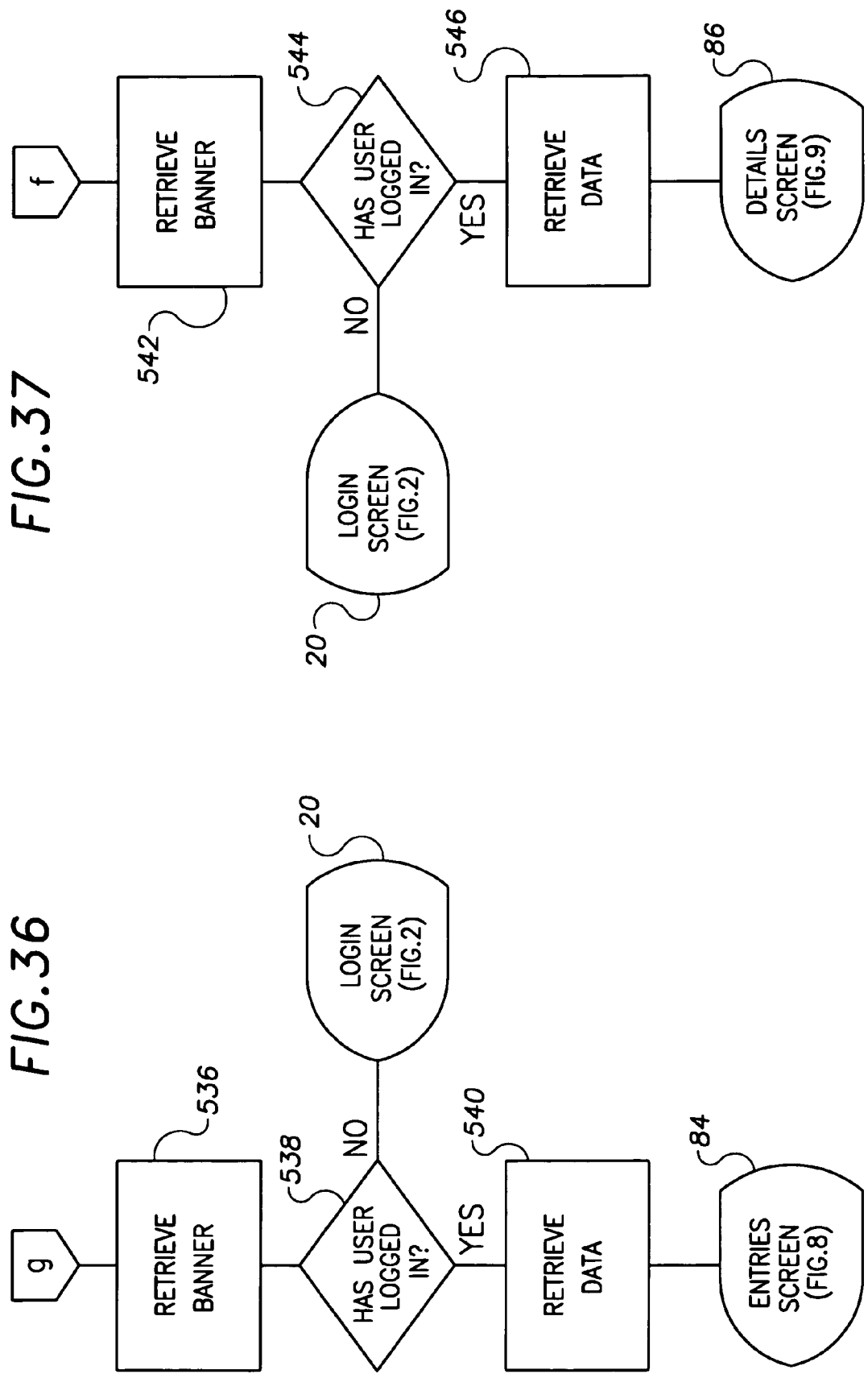

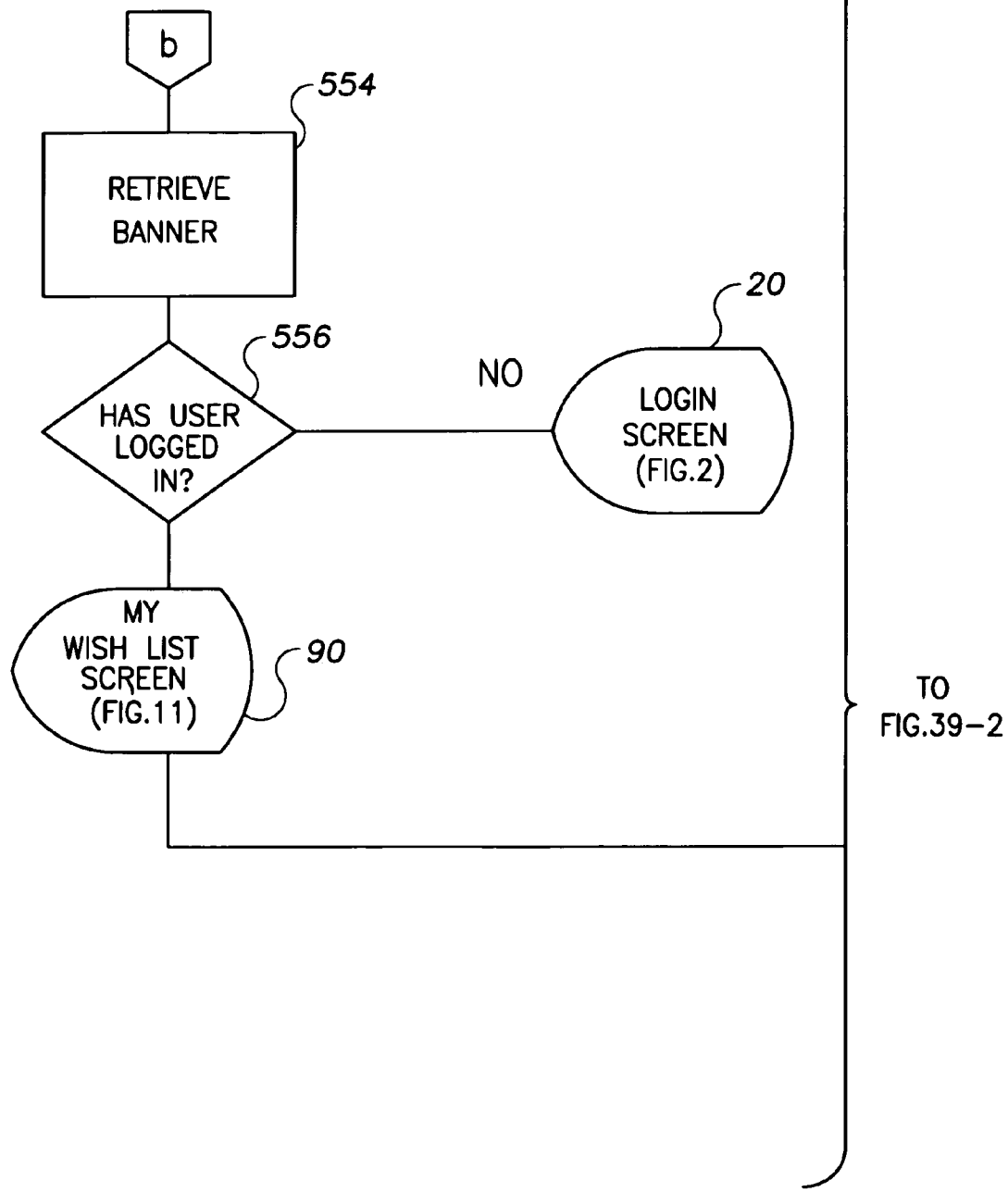

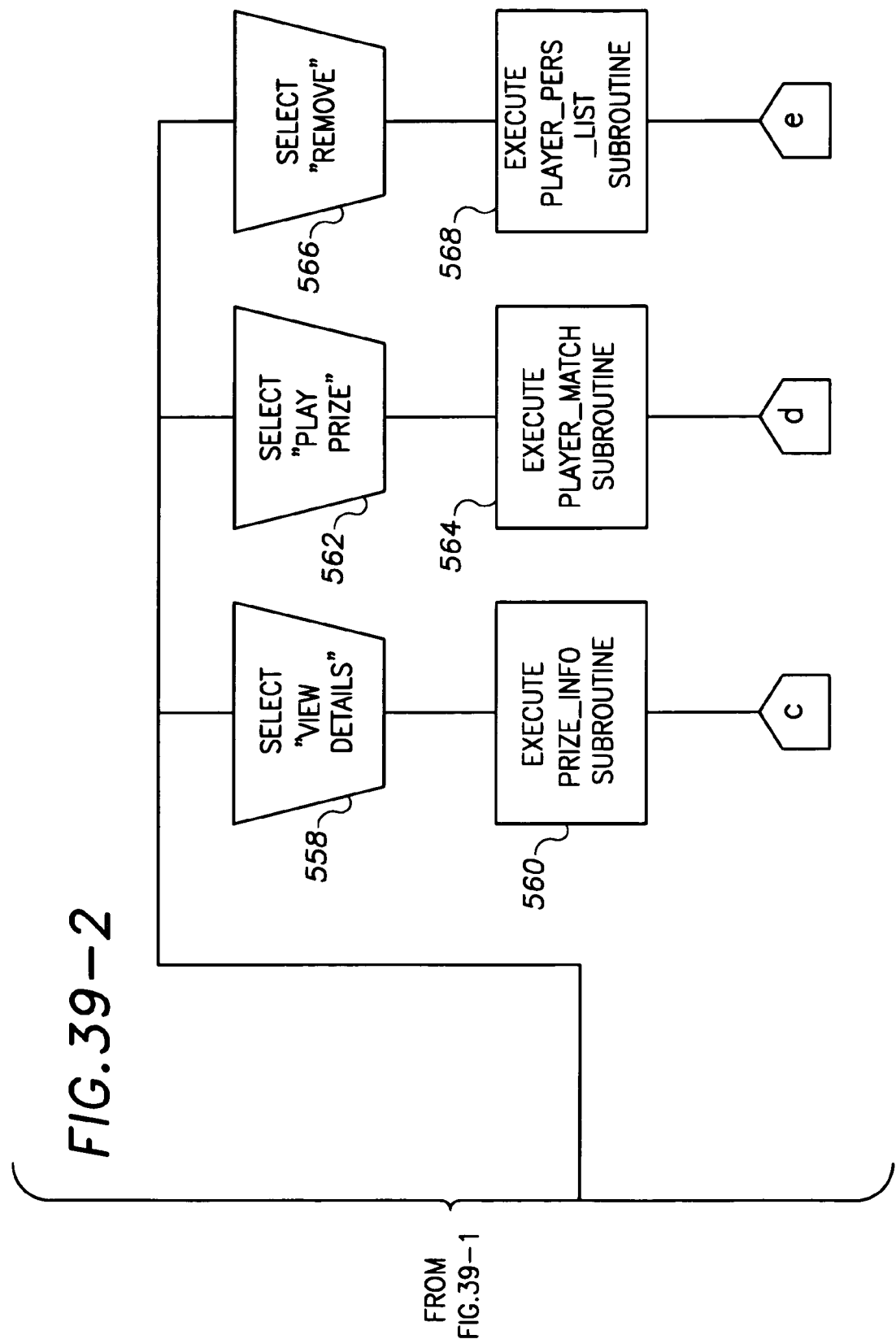

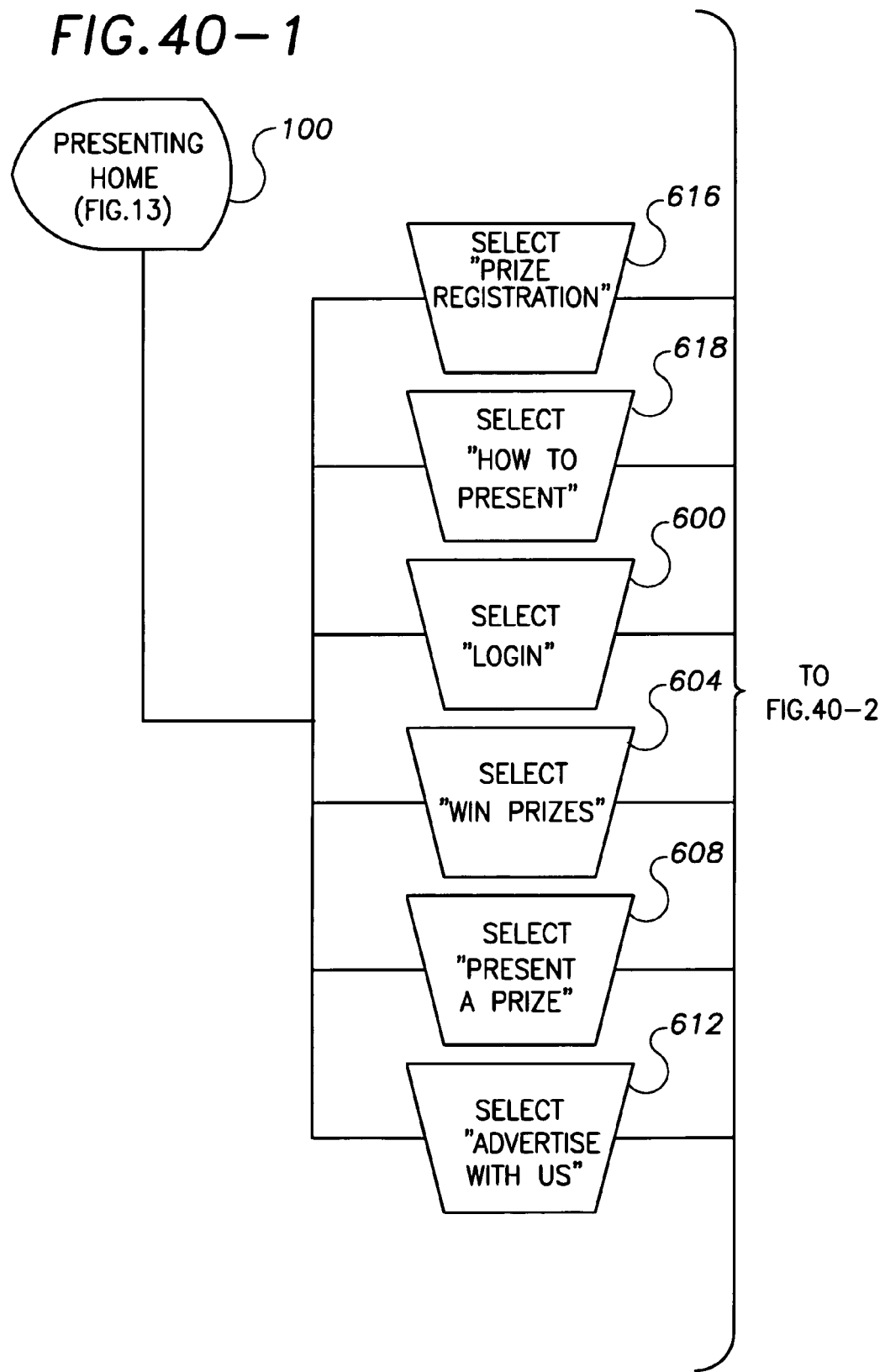

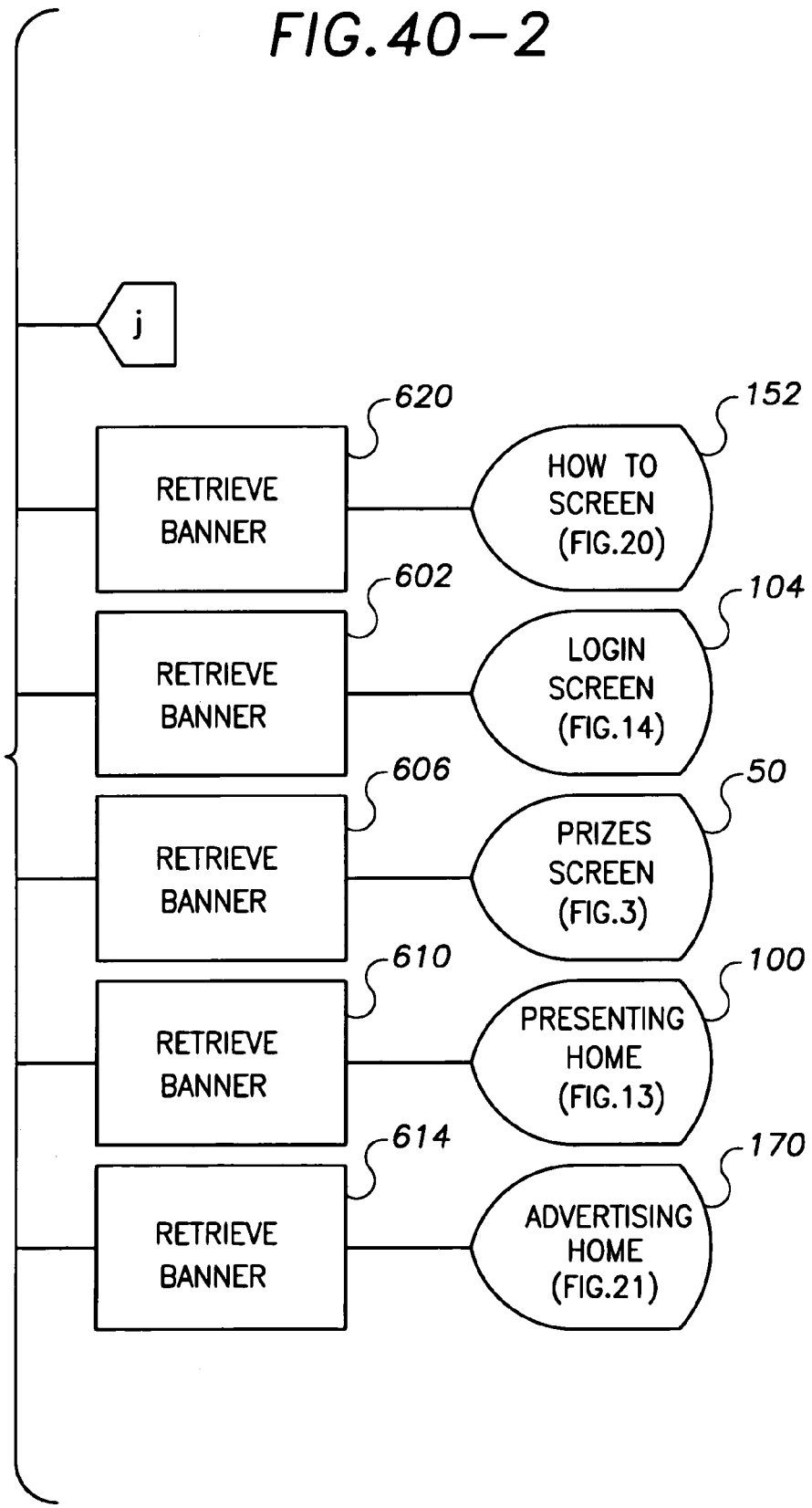

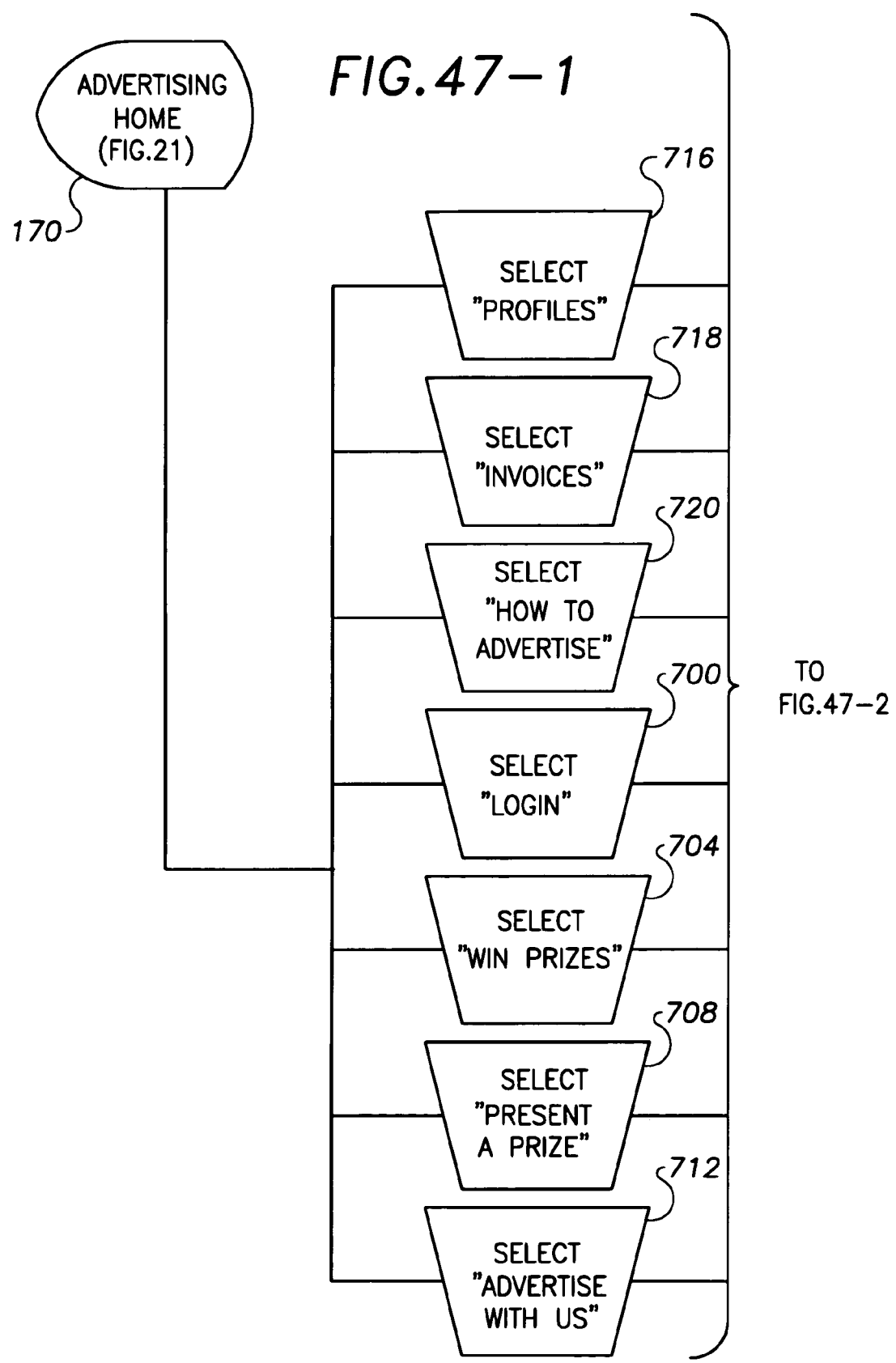

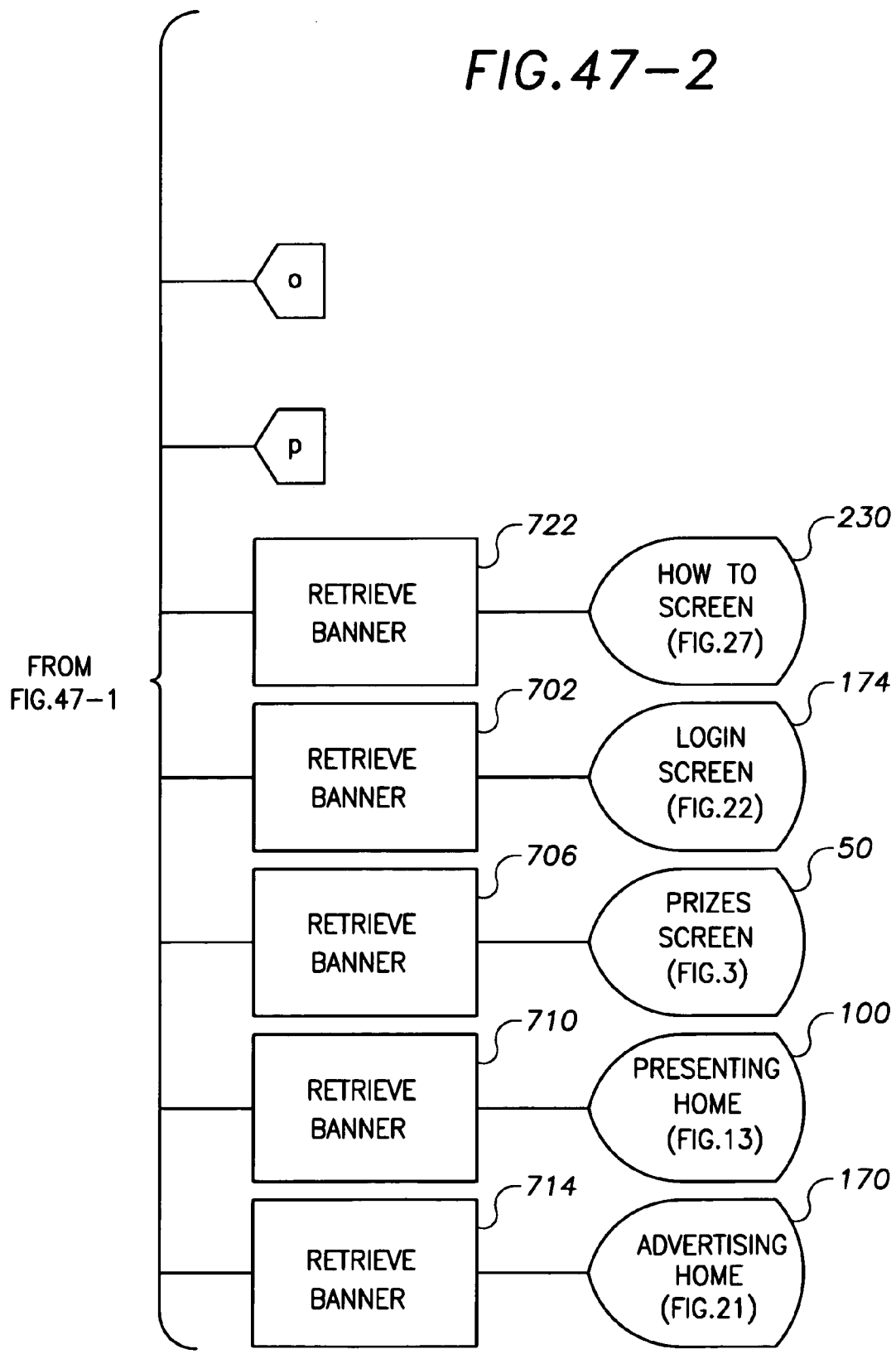

COMBINATION ON-LINE SWEEPSTAKES AND SALES SYSTEM

This application claims priority from U.S. provisional application 60/145,910 filed Jul. 27, 1999 and relates to an Internet web site that combines an on-line sweepstakes with an on-line sales function in an effort to attract visitors to the web site, visitors that are then redirected to sponsors' web sites, thereby generating advertising revenue. The entire disclosure contained in U.S. provisional application 60/145, 910, including the attachments thereto, is incorporated herein by this reference.

BACKGROUND OF THE INVENTION

With the Internet continuing to grow at an exponential pace, web sites must fiercely compete in order to attract visitors and potential customers. According to the Netsizer counter located at http://www.netsizer.com, as of July 2000, there were more than 84 million Internet hosts worldwide. Thus, an individual user is presented with the opportunity to surf through a virtually endless collection of web sites. The problem web site marketers face is how to attract visitors, and specifically those visitors who are within a targeted demographic, to a particular web site. Clearly, the more visitors there are to a particular web site, the most attractive the site becomes to advertisers who want their products viewed by as many potential customers as possible.

In order to attract visitors, web sites offer various "content" including, for example, news, weather reports, interactive games, and chat rooms. Recently, on-line giveaways, sweepstakes, and similar promotions have also become a popular means for attracting visitors. Although such promotions may generate traffic through the web site, providing such financial incentives is expensive, and advertisers have no guarantees that the visitors frequenting the web site fit their definition of "potential customers."

It is an object of the present invention to provide a system that incorporates a sweepstakes components that attracts Internet users to the web site incorporating the system of the present invention.

It is a further object of the present invention to provide a system that incorporate a sales component that serves as an alternative to on-line auctions, specifically allowing users to sell merchandise at an established selling price.

It is a further object of the present invention to provide a system that effectively and efficiently matches advertisers with targeted consumers specifically Internet users matching a particular demographic profile.

These and other objects and advantages of the present invention will become apparent upon a reading of the following description.

SUMMARY OF THE INVENTION

The following invention pertains to a system that includes an Internet web site employing a sweepstakes promotion to attract visitors. To enter the sweepstakes, however, visitors are asked to provide demographic information, such as age, sex, and household income. The systems then utilizes this information to determine what advertisements to display or what web sites the visitor should be directed to. Additionally, the system includes a sales component which is used to provide the sweepstakes prizes.

DESCRIPTION OF THE FIGURES

FIG. 2A depicts the DATA ENTRY SCREEN for players in the preferred system;

FIG. 7 depicts an example of a MY PROFILE SCREEN in the preferred system;

FIG. 19 depicts an example of an UPDATE SCREEN in the preferred system;

FIG. 24 depicts an example of a PROFILE INFO SCREEN in the preferred system;

FIGS. 28–53 are flow charts that depict the navigation through and operation of the preferred system, beginning from the HOME SCREEN of FIG. 1;

DESCRIPTION OF THE PRESENT INVENTION

Figure 1:
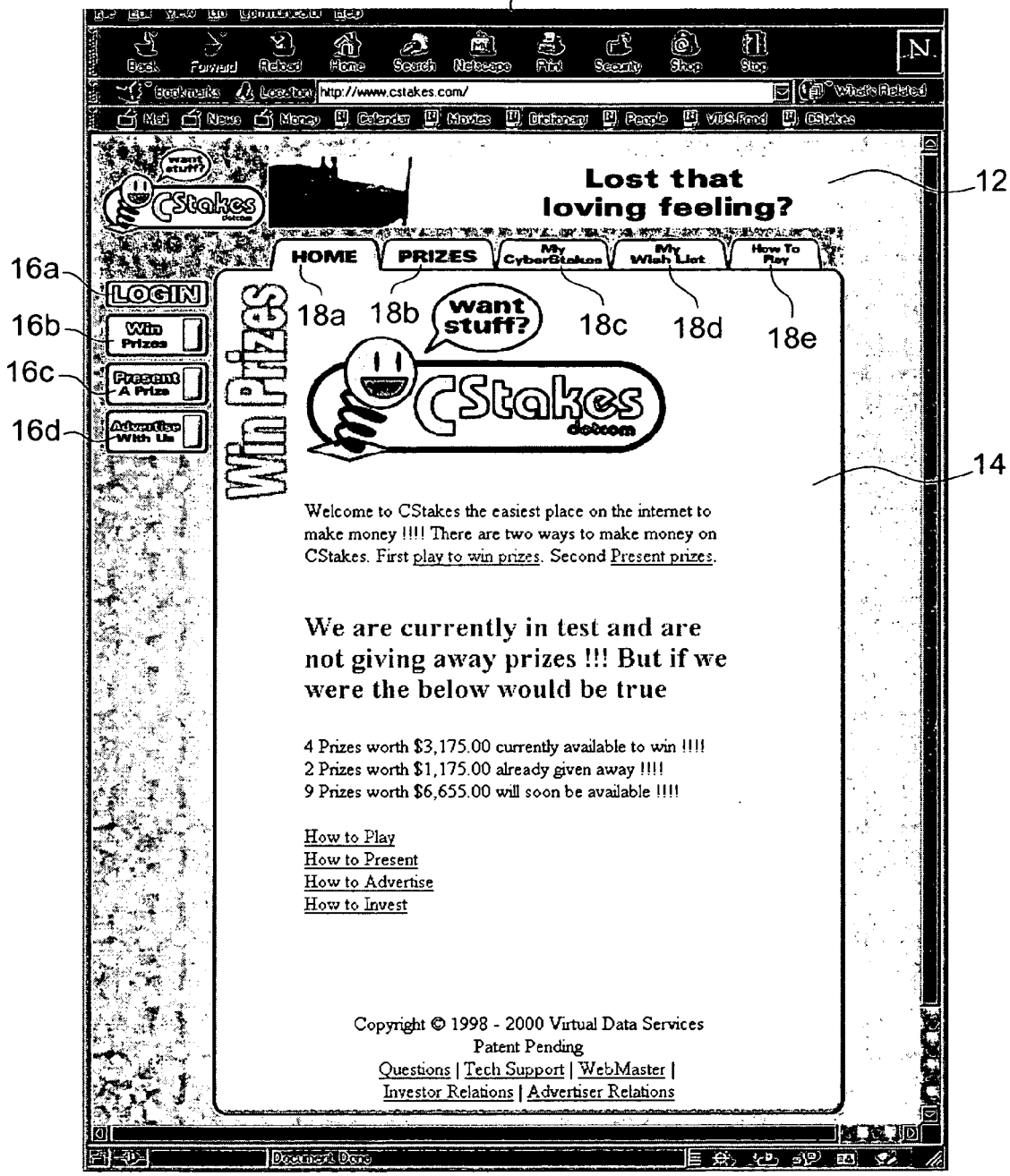
FIG. 1 depicts the HOME SCREEN, as displayed in an Internet browser, of a preferred system in accordance with the present invention.

The following invention pertains to a system that includes an Internet web site employing a sweepstakes promotion to attract visitors. To enter the sweepstakes, however, visitors are requested, but not necessarily required, to provide demographic information, such as age, sex, and household income. The system then utilizes this information to determine what web sites the visitor should be directed to and what advertisements to display. Additionally, the system includes a sales component which is used to provide the sweepstakes prizes, as will be explained in further detail below.

Prior to viewing the various components and features of the preferred system as implemented through an Internet web site, the operation of the system is best explained by an example: User A has a computer that he would like to sell. Such a user is termed a "prize presenter" in the system of the present invention. Since User A has been unable to sell the computer at the price he wants, he decides to list the computer on the web site that hosts the preferred combination on-line sweepstakes and sales system of the present invention. User A wants $500 for the computer, and thus lists $500 as the "selling" price of the computer. User B visits the preferred web site and is interested in the computer. User B thus registers as a sweepstakes "player," entering various demographic information in response to questions presented by the system. After registering, User B clicks on the listing for the computer and is re-directed to an advertiser's web site, this site having been selected based on an analysis of the demographic information User B entered when registering. User B is now entered into a sweepstakes for the computer.

The advertiser to whose web site User B was directed pays for the "hit." If, for example, the advertiser is willing to pay $0.25 for each hit generated by the system of the present invention, after 2000 hits, $500 in revenue would be generated. This is the price User A was seeking for his computer. The sweepstakes for the computer would end, and one of the players entered in this particular sweepstakes would be randomly selected as the winner of the computer. User A is then responsible for delivering the computer to the winner. Once delivery has been verified, User A will receive a check for $500 from the system administrators, the $500 being generated by the advertising revenue associated with the sweepstakes.

In order for the system administrator to realize a profit for providing the sweepstakes and sales services, it is contemplated that each listed item will be "marked up" at a predetermined rate. For example, the computer described in the above example might be marked up 10% to $550, thereby requiring 200 additional "hits" to be generated prior to the sweepstakes. Once $550 in advertising revenue had been realized, the administrator would transmit $500 to the seller and realize a $50 profit.

The system, as described, is attractive to advertisers as it efficiently matches advertisements with users falling within targeted demographics. Since advertisers can better direct their advertisements towards certain individuals or segments of the population, the advertisers are likely to pay a higher price per hit.

For individuals interested in selling items (i.e., "prize presenters"), the preferred system is an attractive alternative to standard auctions, as the prize presenters can set their price. No negotiation or mandatory acceptance of a bid is necessary. The system, however, does encourage reasonable selling prices as the system displays to visitors how many more "hits" are required to be generated prior to the sweepstakes. Thus, if a prize presenter lists a $50 radio at a selling price of $50,000, very few, if any, visitors are going to waste their time entering a sweepstakes that will require 200,000 hits to be generated before the $50 radio is given away. Nevertheless, it is further contemplated that the system of the present invention impose limits on the "marking up" of a prize from its estimated value.

The appended Figures depict various screen shots of a preferred system in accordance with the present invention, along with detailed flow charts that demonstrate use of and movement through the system by users.

FIG. 1 depicts the HOME SCREEN or opening screen 10 of a preferred system in accordance with the present invention, said screen 10 being displayed in the commonly used Netscape® Internet browser. As shown, this screen 10 preferably includes a banner advertisement location 12 that appears at the top of the screen 10. Through presentation of advertising banners in this location 12, additional revenue may be generated by the system administrator providing the sweepstakes and sales services in accordance with the present invention. Of course, various advertisements will rotate through this banner advertisement location 12. Furthermore, such a banner advertisement location 12 is included on each and every screen of the preferred system; however, the following description will not particularly point out and describe the banner advertisement location on each and every screen.

The HOME SCREEN 10 also includes a central message window 14. Various text messages, images, and/or hyperlinks can be displayed in this window 14, as shown in FIG. 1. Along the periphery of this window 14 are a series of buttons 16 and a series of tabs 18. For purposes of this description, a "button" is an image that can be selected through the clicking of a computer mouse or use of a similar input device to redirect a user to another Internet web page. A "tab" is an image that can similarly be selected through the clicking of a computer mouse or use of a similar input device to either redirect a user to another Internet web page or to open a new document or image into the central message window 14.

In this preferred system, there are four buttons arrayed along the central message window 14: a LOGIN button 16a, a WIN PRIZES button 16b, a PRESENT A PRIZE button 16c, and an ADVERTISE WITH US button 16d. It is important to note that, although these buttons are not particularly pointed out with reference to all of the screens described in this specification, these four buttons do appear on each and every screen of the preferred system. Aside from the LOGIN button 16a, these buttons each perform the identical function when selected regardless of which screen is being displayed at the time the button is selected.

In this preferred system, there are also five tabs arrayed along the top of the central message window 14: a HOME tab 18a, a PRIZES tab 18b, a MY CYBERSTAKES tab 18c, a MY WISH LIST tab 18d, and a HOW TO PLAY tab 18e. Similar to the buttons 16 described above, it is important to note that, although these tabs 18 are not particularly pointed out with reference to all of the screens described in this specification, these five tabs do appear on each and every "player" screen of the preferred system. In this regard, a "player" screen is distinguished from a "prize presenter" screen or an "advertiser" screen, a distinction that will be clarified below.

Figures 1, 28:
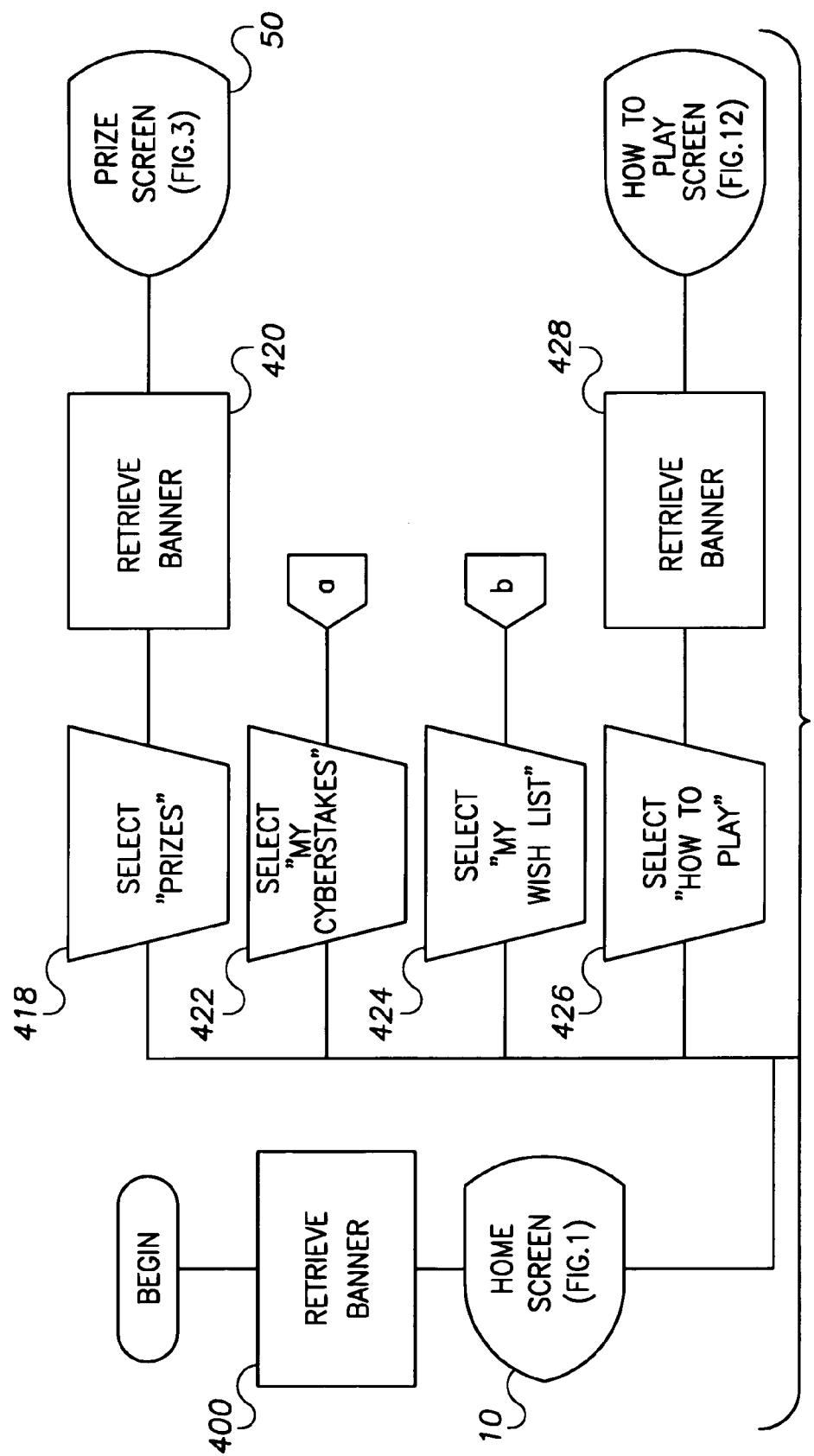

FIG. 28 is a flow chart depicting navigation through and operation of the system, beginning from the HOME SCREEN 10. As shown in FIG. 28, when a user first enters the Internet (i.e., Worldwide Web) address associated with the system of the present invention into an Internet browser (e.g., Netscape® or Microsoft Explorer®), an advertising banner is retrieved as indicated by the RETRIEVE BANNER process 400, and the HOME SCREEN 10 (as depicted in FIG. 1) is displayed. For a user to continue through the system, one of the buttons 16 or tabs 18 must be clicked or otherwise selected by the user.

Figure 2:
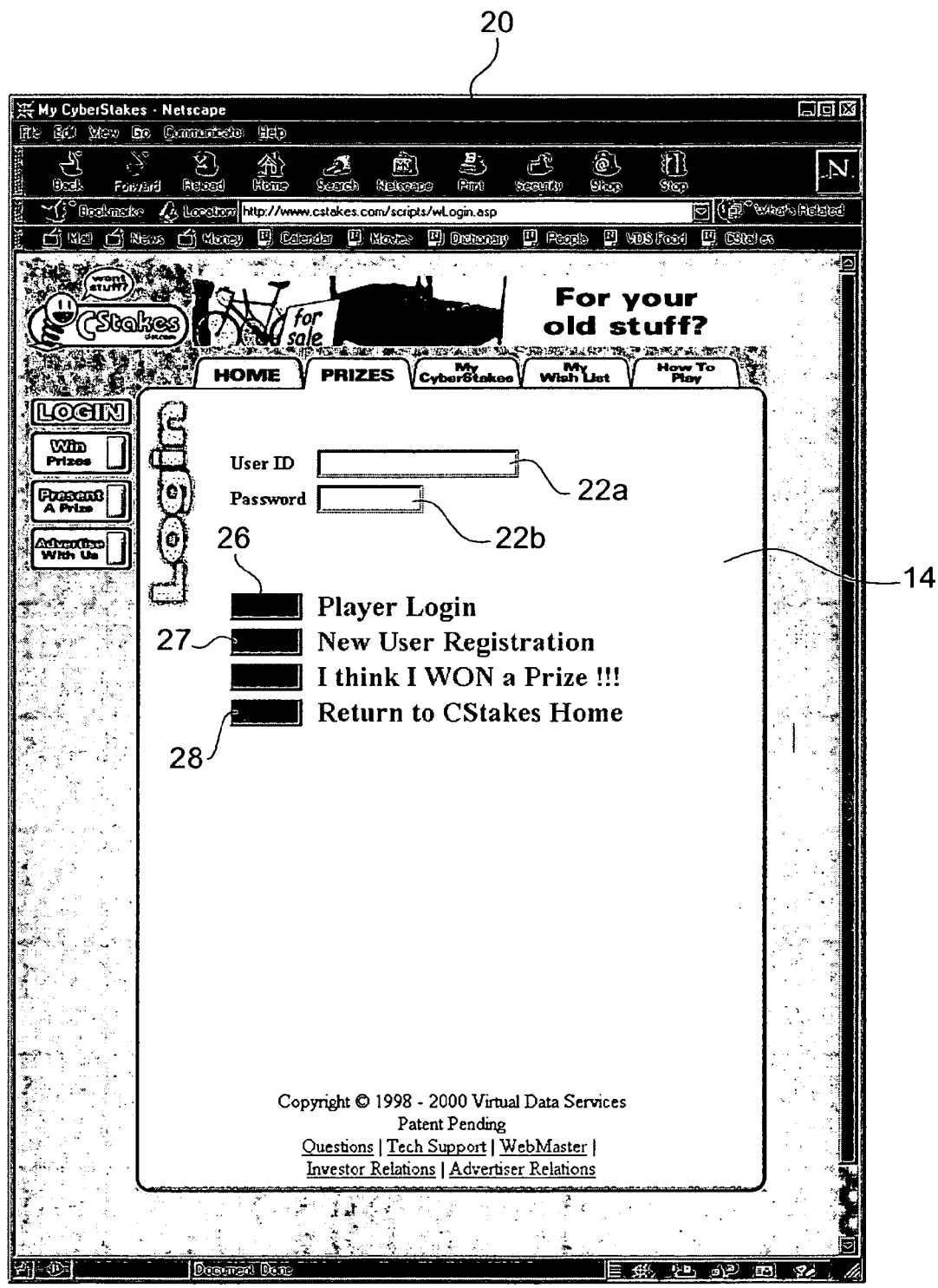
FIG. 2 depicts the LOGIN SCREEN for players in the preferred system.

If a user is a registered user of the system or wishes to become one, he would select the LOGIN button 16a, as indicated at SELECTION 402 of FIG. 28. A new advertising banner would be retrieved as indicated by RETRIEVE BANNER 404, and the user would be re-directed to the LOGIN SCREEN 20, as depicted in FIG. 2 and which will be more fully described below.

Figure 3:
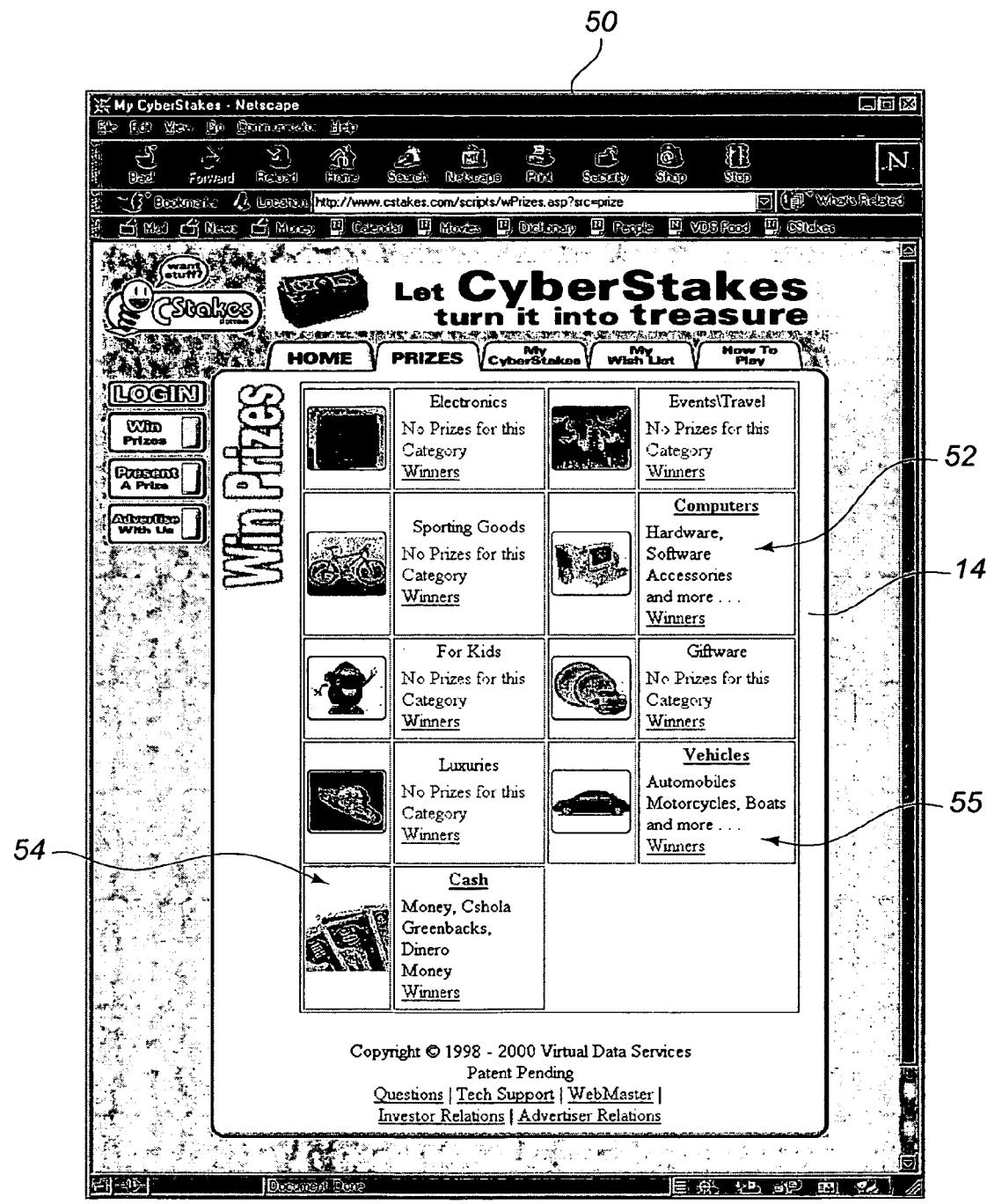
FIG. 3 depicts an example of a PRIZES SCREEN in the preferred system.

If the user would like to view available prizes or enter one or more of the sweepstakes, he would select the WIN PRIZES button 16b at SELECTION 406 of FIG. 28. Again, a new advertising banner would be retrieved as indicated by RETRIEVE BANNER 408, and the user would be re-directed to the PRIZES SCREEN 50, as depicted in FIG. 3 and which will be more fully described below.

Figure 13:
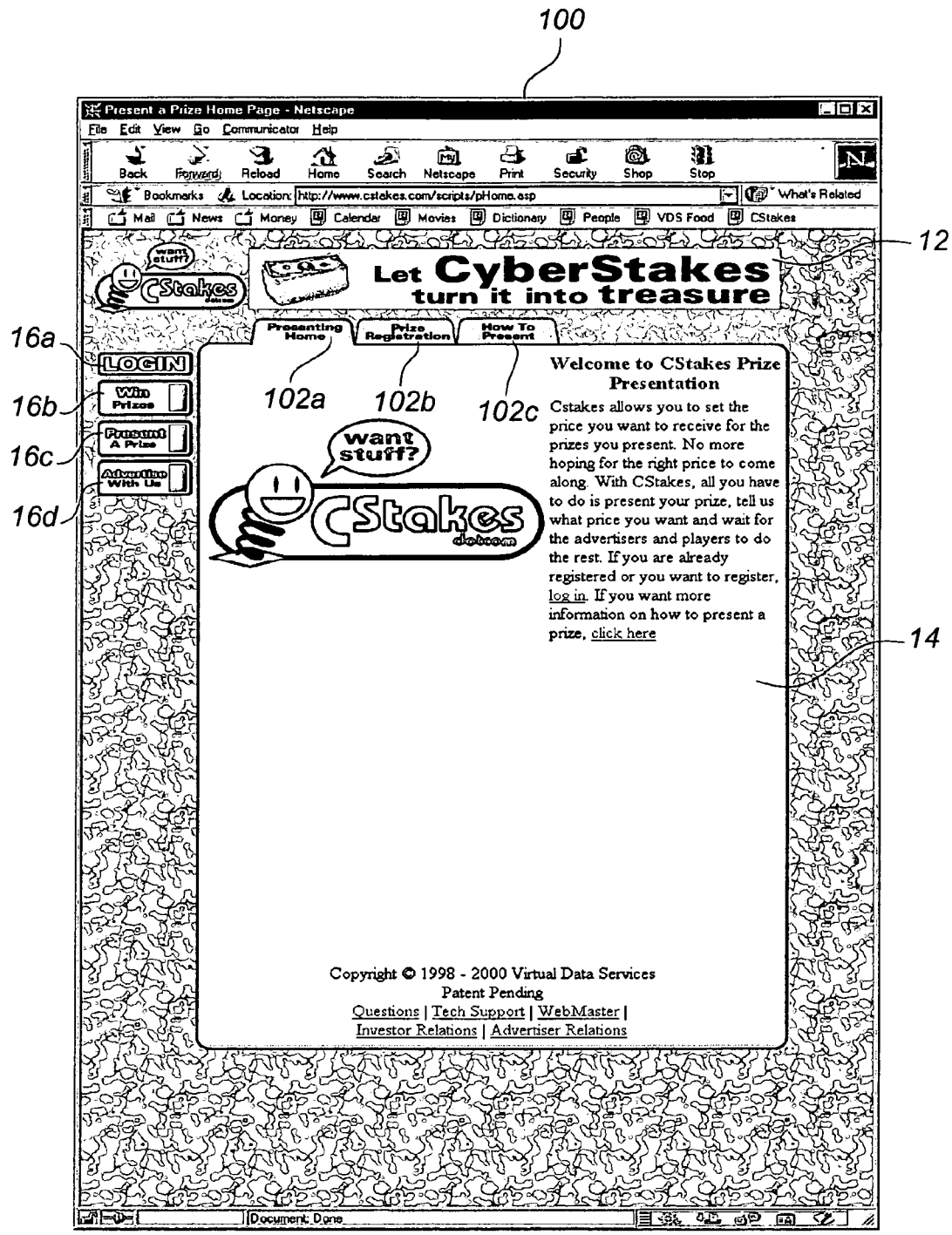
FIG. 13 depicts the PRESENTING HOME SCREEN of the preferred system.

If the user is a prize presenter or wished to become one, he would select the PRESENT A PRIZE button 16c at SELECTION 410 of FIG. 28. Again, a new advertising banner would be retrieved as indicated by RETRIEVE BANNER 412, and the user would be re-directed to the PRESENTING HOME SCREEN 100, as depicted in FIG. 13 and which will be more fully described below.

Figure 21:
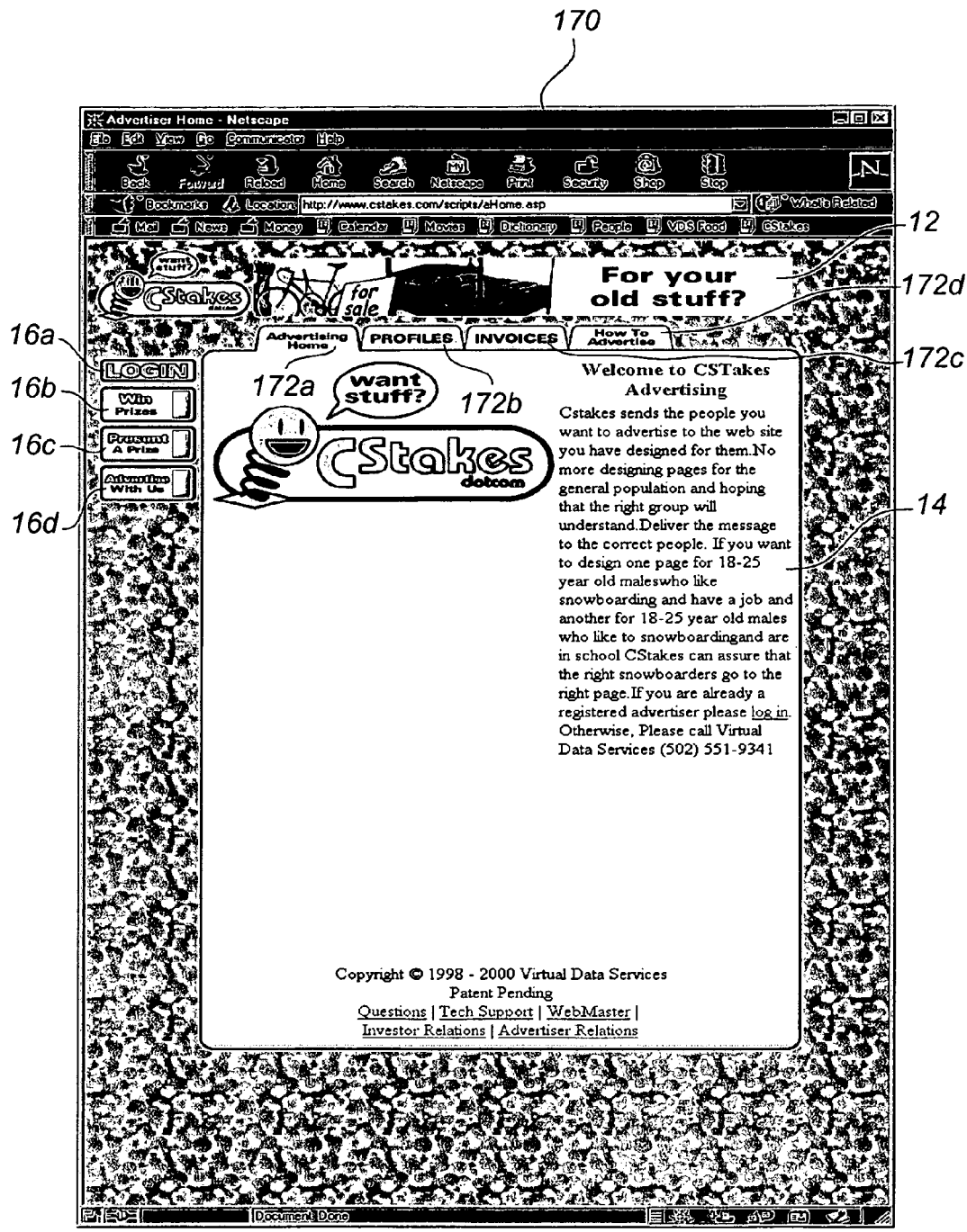
FIG. 21 depicts the ADVERTISING HOME SCREEN in the preferred system.

Finally, if the user is an advertiser or wishes to become one, he would select the ADVERTISE WITH US button 16d at SELECTION 414. Again, a new advertising banner would be retrieved as indicated by RETRIEVE BANNER 416, and the user would be re-directed to the ADVERTISING HOME screen 170, as depicted in FIG. 21 and which will be more fully described below.

As mentioned above, the tabs 18 included on the HOME SCREEN 10 are "player" tabs in that they are designed for a user that will be playing for sweepstakes prizes. It is assumed that the majority of visitors to the web site hosting the system of the present invention will be players, rather than prize presenters or advertisers. Other tabs will be included on the various screens related to prize presenters and advertisers, as will be discussed below.

Referring still to FIG. 28 and the tabs 18 shown in FIG. 1, if a player wishes to view available prizes or enter one or more of the sweepstakes, he would select the PRIZES tab 18b at SELECTION 418. A new advertising banner would be retrieved as indicated by RETRIEVE BANNER 420, and the user would be re-directed to the PRIZES SCREEN 50, as depicted in FIG. 3 and which will be more fully described below.

Figures 2, 34:
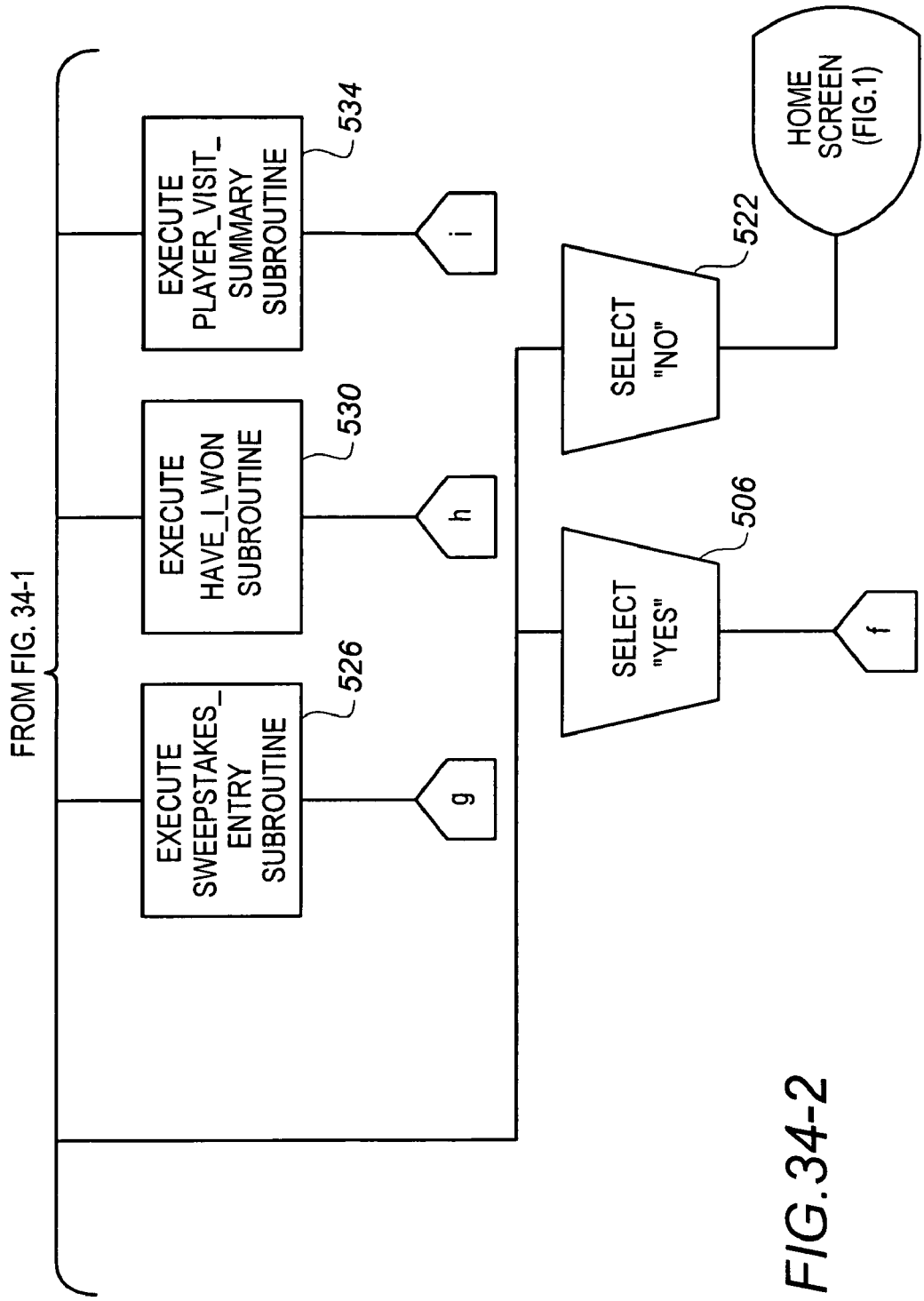

To view a personalized screen detailing information about the registered player, the player would select the MY CYBERSTAKES tab 18c at SELECTION 422, which would initiate the subroutine depicted in FIG. 34.

To view a personalized screen detailing information about the prizes sought by the registered player, the player would select the MY WISH LIST tab 18d at SELECTION 424, which would initiate the subroutine depicted in FIG. 39.

Figure 12:
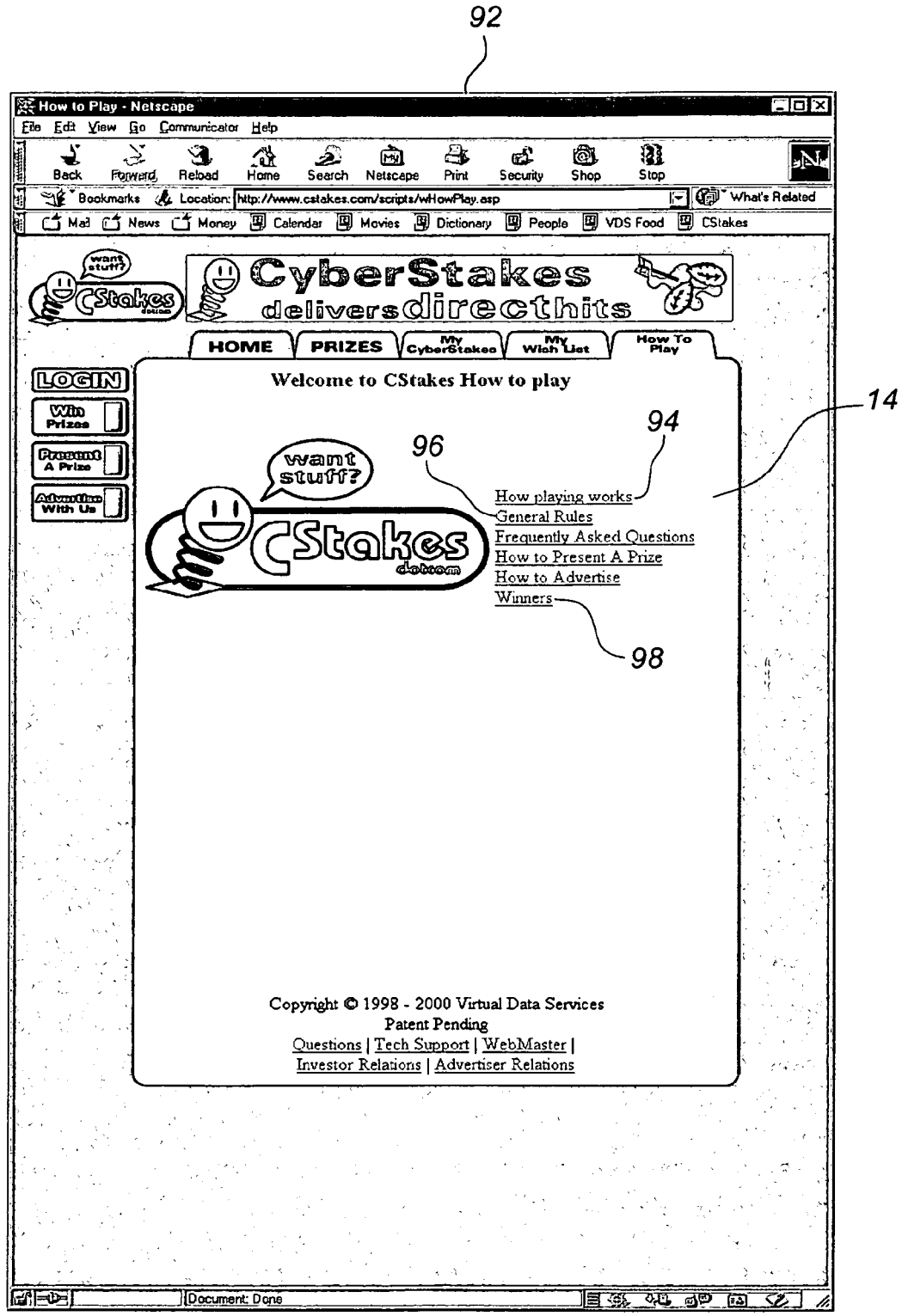
FIG. 12 depicts the HOW TO PLAY SCREEN in the preferred system.

To view instructions on how to play, that is, instructions on how the preferred system works, the player would select the HOW TO PLAY tab 18e at SELECTION 426. A new advertising banner would be retrieved as indicated by RETRIEVE BANNER 428, and the user would be re-directed to the HOW TO PLAY screen 92, as depicted in FIG. 12 and which will be more fully described below.

Finally, as mentioned above, various hyperlinks can be displayed in the central message window 14 of the HOME SCREEN 10. Selection of any of these hyperlinks may also cause the user to be re-directed to another screen within the system of the present invention, or even to a third-party Internet site.

As mentioned above, FIG. 2 depicts the LOGIN SCREEN 20 for players. The buttons and tabs arrayed around the periphery of the central message window 14 are the same buttons 16 and tabs 18 that appear on the HOME SCREEN 10, as depicted in FIG. 1. In the central message window 14 of the LOGIN SCREEN 20, there are multiple data entry fields 22. In this particular embodiment, there are two fields 22 in which a user can enter his User ID 22a and PASSWORD 22b.

FIG. 29 is a flow chart depicting operation of the system with respect to this LOGIN SCREEN 20. As indicated at INPUT 430, a registered user can enter the various information into the data entry fields 22 using a conventional computer keyboard or similar peripheral device. Once the requisite data is entered, the user can select the PLAYER LOGIN button 26 at SELECTION 432 of FIG. 29; this button 26 is located in the central message window 14 of the LOGIN SCREEN 20, as depicted in FIG. 2. If the user has not previously registered with the system, the user can select the NEW USER REGISTRATION button 27 at SELECTION 434 of FIG. 29; this button 27 is also located in the central message window 14 of the LOGIN SCREEN 20, as depicted in FIG. 2. A third button, the RETURN TO CSTAKES HOME button 28, is also located in the central message window 14 of the LOGIN SCREEN 20. A user can select this button 28 at any time at SELECTION 444 of FIG. 29; a new advertising banner would be retrieved as indicated by RETRIEVE BANNER 446, and the user would be returned to the HOME SCREEN 10, as depicted in FIG. 1. Finally, although not indicated in the flow chart of FIG. 29, the LOGIN SCREEN 20 depicted in FIG. 2 also includes a fourth button, the I THINK I WON A PRIZE! button 29, selection of this button 29 re-directing the user to a list of prize winners.

Returning to FIG. 29, if the user does select the PLAYER LOGIN button 26 at SELECTION 432, the system first verifies that the login name and password entered in data entry fields 22a and 22b match records maintained in an integral USER DATABASE at COMPARE/UPDATE 438, a new advertising banner would be retrieved as indicated by RETRIEVE BANNER 440, and the user would be returned to the prior screen, i.e. the HOME SCREEN 10, as depicted in FIG. 1. Also, it is preferred that the USER DATABASE be updated with record of the user's visit at COMPARE/UPDATE 438.

As mentioned in the preceding paragraph, the preferred system included an integral USER DATABASE. This USER DATABASE is the storage location for all data about users of the system, whether they be "players," "prize presenters," or "advertisers." The preferred system also includes and incorporates two additional databases: a PRIZE DATABASE and PROFILE DATABASE. All information and data about prizes offered through the sweepstakes component of the preferred system is stored and maintained in the PRIZE DATABASE. And, all information about advertising profiles, that is, all information that defines the target demographic profiles (as established by the advertisers) is stored and maintained in the PROFILE DATABASE. The architecture and design of these three databases is not essential to system of the present invention provided that the databases can meet the storage and retrieval requirements set forth herein. Various commercial software packages and/or programming techniques could be used by those skilled in the art to develop these databases without departing from the spirit and scope of the present invention.

In this description, for the sake of clarity, depictions of the USER DATABASE, PRIZE DATABASE, and PROFILE DATABASE are not included in the flow charts of FIGS. 29–53, although retrieval and update functions associated with these databases are appropriately shown and described with reference to FIGS. 29–53.

Figure 2A:
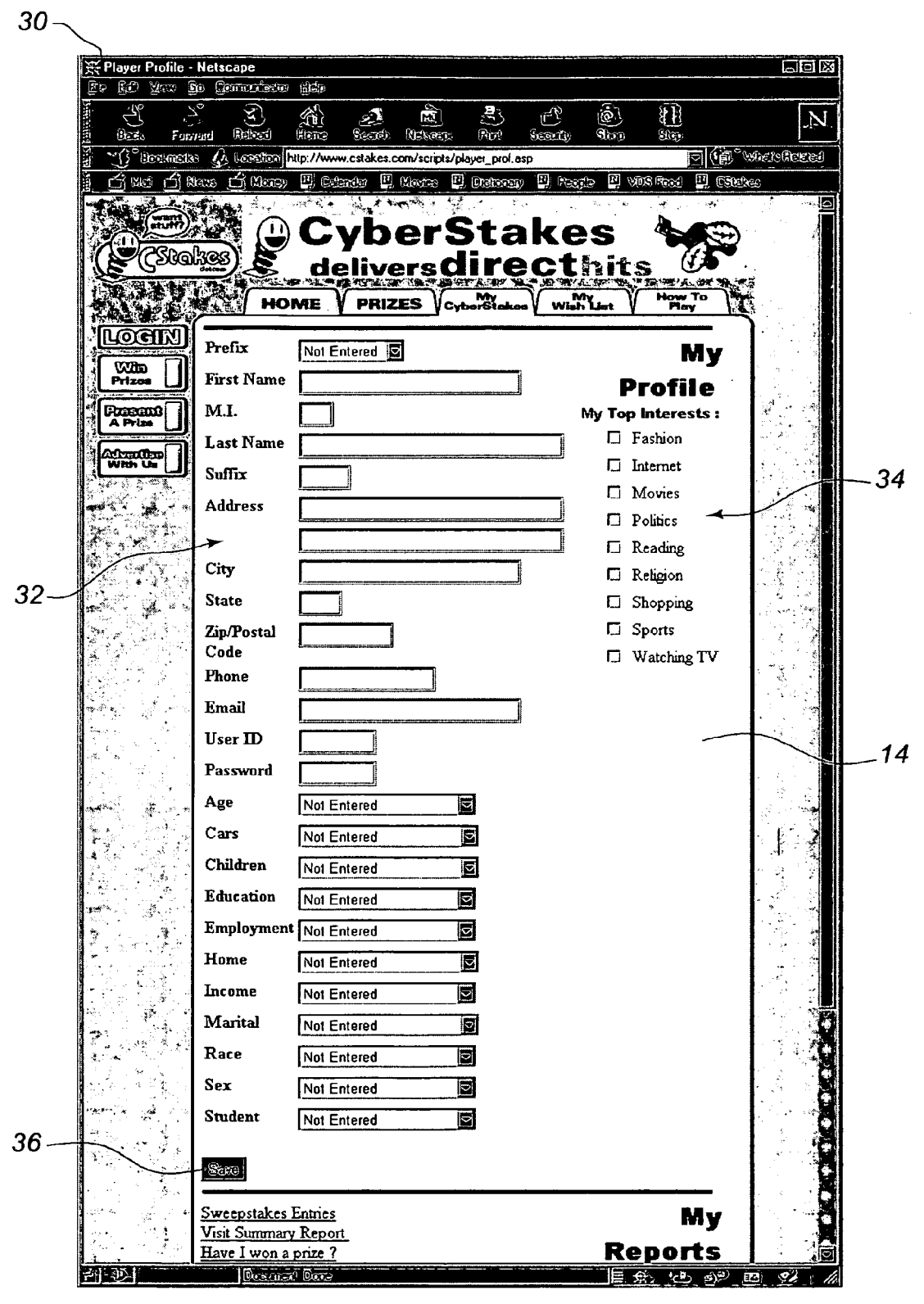

Referring still to FIG. 29, if the user selects the NEW USER REGISTRATION button 27 at SELECTION 434, a new advertising banner would be retrieved as indicated by RETRIEVE BANNER 442, and the user would be re-directed to the DATA ENTRY SCREEN 30, as depicted in FIG. 2A. In the central message window 14 of the DATA ENTRY SCREEN 30, there are multiple data entry fields, indicated generally by reference numeral 32, that allow the user to input the requisite demographic information. In this particular embodiment, the following demographic information is requested:

TABLE 1

Prefix
First Name
M.I. (Middle Initial)
Last Name
Suffix
Address
City
State
Zip/Postal Code
Phone
Email
User ID
Password
Age
Cars
Children
Education
Employment
Home
Income
Marital
Race
Sex
Student As shown in FIG. 2A, some of this information is entered through a conventional computer keyboard or similar peripheral device, whereas other information (e.g., age, education) may be entered using a computer mouse or similar peripheral device to make a selection from a pull-down menu. Of course, either method of data entry may be used without departing from the spirit and scope of the present invention. Additionally, the DATA ENTRY SCREEN 30 of this particular embodiment includes one or more check boxes 34 that allow a user to indicate particular interests, e.g., fashion, Internet, movies, politics, reading, religion, shopping, sports, and watching TV. Once the user has entered all of the requisite data into the DATA ENTRY SCREEN 30, selection of the SAVE button 36 causes this information to be stored in the integral USER DATABASE. The system then returns the user to the LOGIN SCREEN 20, as depicted in FIG. 2. Of course, it is contemplated that standard programming and validation techniques be employed to ensure that all requisite data is properly entered and stored throughout the system of the present invention.

As mentioned above with reference to the HOME SCREEN 10 depicted in FIG. 1, if the user would like to view available prizes or enter one or more of the sweepstakes, he could select the WIN PRIZES button 16b at SELECTION 406 of FIG. 28. Alternatively, the user could select the PRIZES tab 18b at SELECTION 418 of FIG. 28. In either event, a new advertising banner would be retrieved, and the user would be re-directed to the PRIZES SCREEN 50, a sample of which is depicted in FIG. 3. The PRIZES SCREEN 50 displays in the central message window 14 various categories of prizes that are being given away through the sweepstakes function of the system of the present invention. This information is maintained in an integral PRIZE DATABASE that is accessed when the PRIZES SCREEN 50 is displayed. On this particular sample screen, prizes are available in only two categories: the "Computers" category, as indicated by reference numeral 52, and the "Cash" category, as indicated by reference numeral 54.

Figures 2, 30:
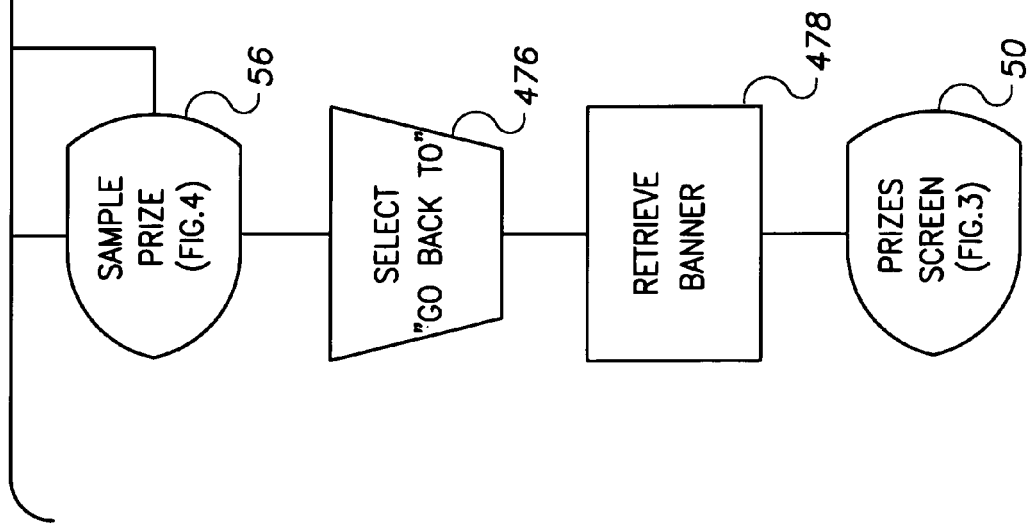

FIG. 30 is a flow chart depicting operation of the system with respect to this PRIZES SCREEN 50. As indicated by INPUT 460 of FIG. 30, the system does nothing until the user makes a selection. As always, the user may select one of the buttons 16 or tabs 18 arrayed around the periphery of the central message window 14, or the user may select one of the prize categories in which prizes are available. In this example, the user can select "Computers" 52, "Cash" 54, or "Vehicles" 55 by clicking on the hypertext link or image associated with the selected prize category. Assuming for sake of example that the user selected the "Cash" category 54 at INPUT 460, a new advertising banner would be retrieved as indicated by RETRIEVE BANNER 462, and the user would be re-directed to a SAMPLE PRIZES SCREEN 56, as depicted in FIG. 4.

Figure 4:
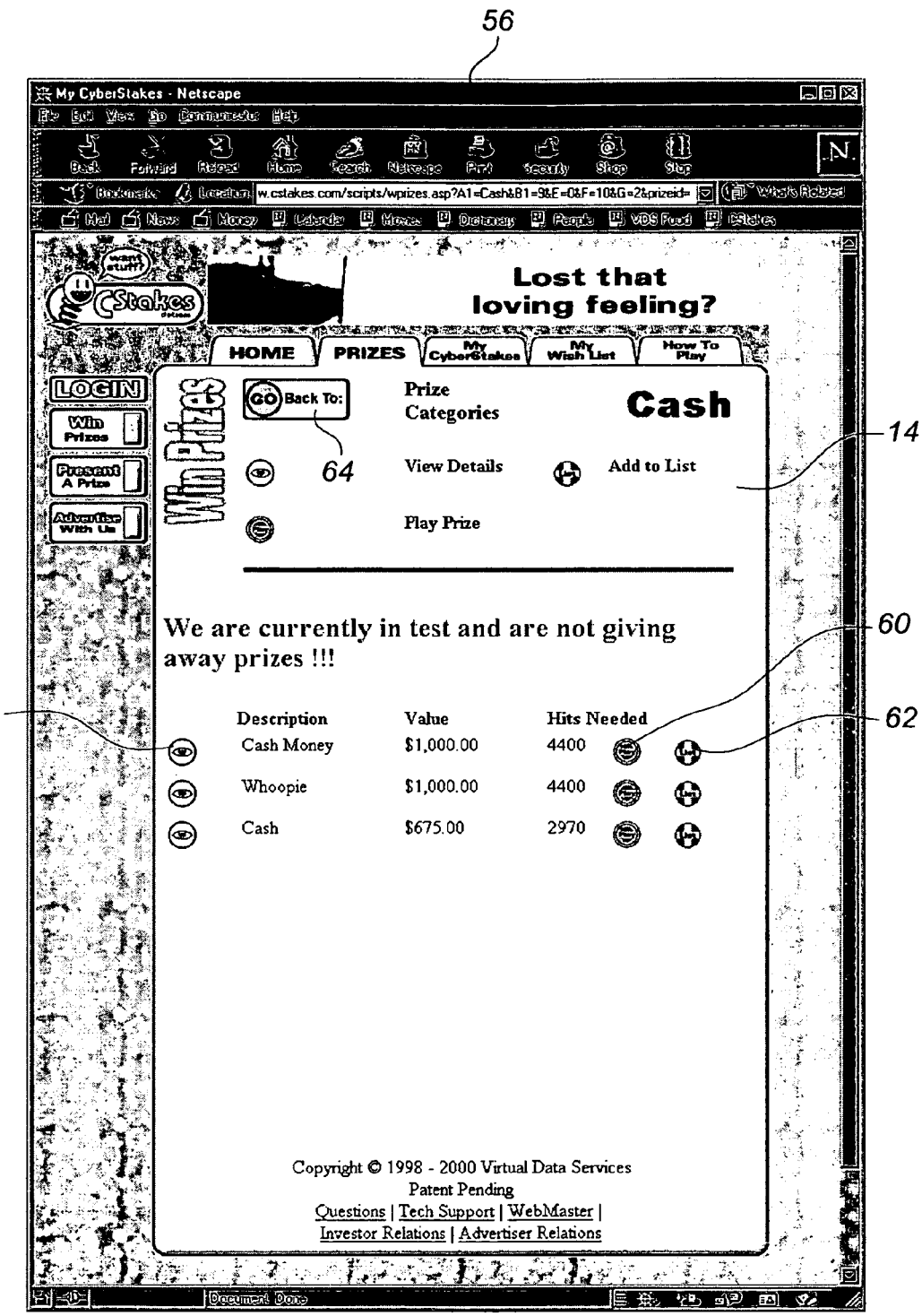
FIG. 4 depicts an example of a SAMPLE PRIZES SCREEN in the preferred system.

Referring now to FIG. 4, there are three prizes available in the "Cash" category, each of which is set forth in the central message window 14, along with information about the prizes, such as value of the prizes and hits needed prior to the sweepstakes. Again, prize information displayed in the central message window 14 is maintained in and retrieved from an integral PRIZE DATABASE that is accessed when the SAMPLE PRIZES SCREEN 56 is displayed. Of course, any number of prizes could be available and displayed without departing from the spirit and scope of the present invention.

With respect to each of these available prizes, the user has three options. If the user would like more information about a particular prize, he could select the VIEW DETAILS icon 58 associated with the prize at SELECTION 464 of FIG. 30, which would trigger execution of the "PRIZE_INFO" sub-routine at EXECUTE 466 of FIG. 30. This subroutine will be described further below with reference to FIG. 31. If the user would like to play for a particular prize, he could select the PLAY PRIZE icon 60 associated with the prize at SELECTION 468 of FIG. 30, which would trigger execution of the "PLAYER_MATCH" subroutine at EXECUTE 470, which will be described further below with reference to FIG. 32. If the user would like to add a particular prize to his personal watch list, he could select the ADD TO LIST icon 62 associated with the prize at SELECTION 472 of FIG. 30, which would trigger execution of the "PLAYER_PERS_LIST" subroutine at EXECUTE 474, which will be described further below with reference to FIG. 33. Finally, at any time, a user can return to the PRIZES SCREEN 50 by selecting the GO BACK TO button 64 at SELECTION 476 of FIG. 30; the GO BACK TO button 64 is also located in the central message window 14 of the SAMPLE PRIZES SCREEN 56, as depicted in FIG. 4. A new advertising banner would be retrieved as indicated by RETRIEVE BANNER 478, and the user would be returned to the PRIZES SCREEN 50, as depicted in FIG. 3.

Figure 31:
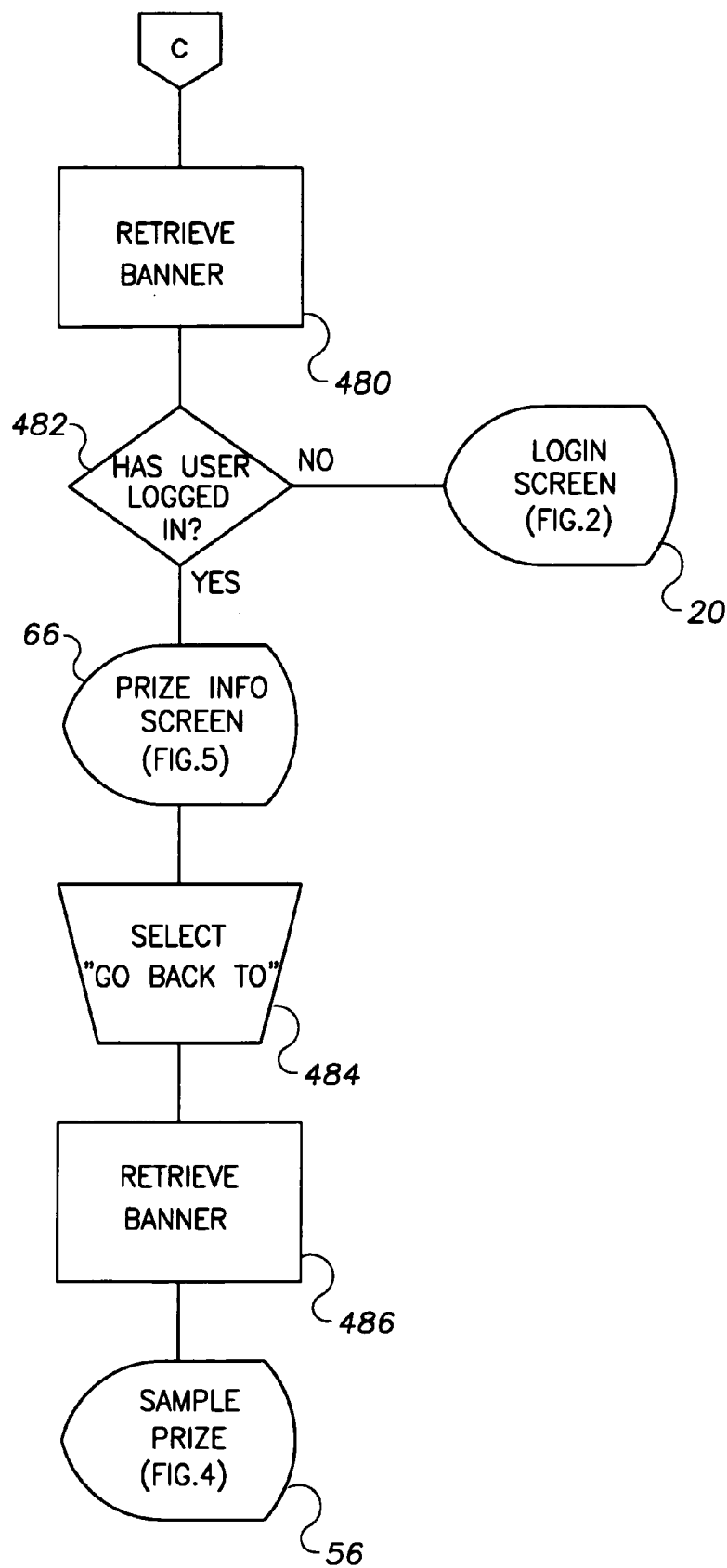

FIG. 31 is a flow chart depicting the operation and function of the "PRIZE_INFO" subroutine. The first step in this subroutine is the retrieval of a new advertising banner at RETRIEVE BANNER 480. A determination is then made at DECISION 482 as to whether the user has logged into the system. If not, the user is re-directed to the LOGIN SCREEN 20, as depicted in FIG. 2. It is important to note that throughout the system of the present invention, it will be repeatedly verified that the user has logged into the system. Although this may be repetitive, such re-verification is a security measure.

Figure 5:
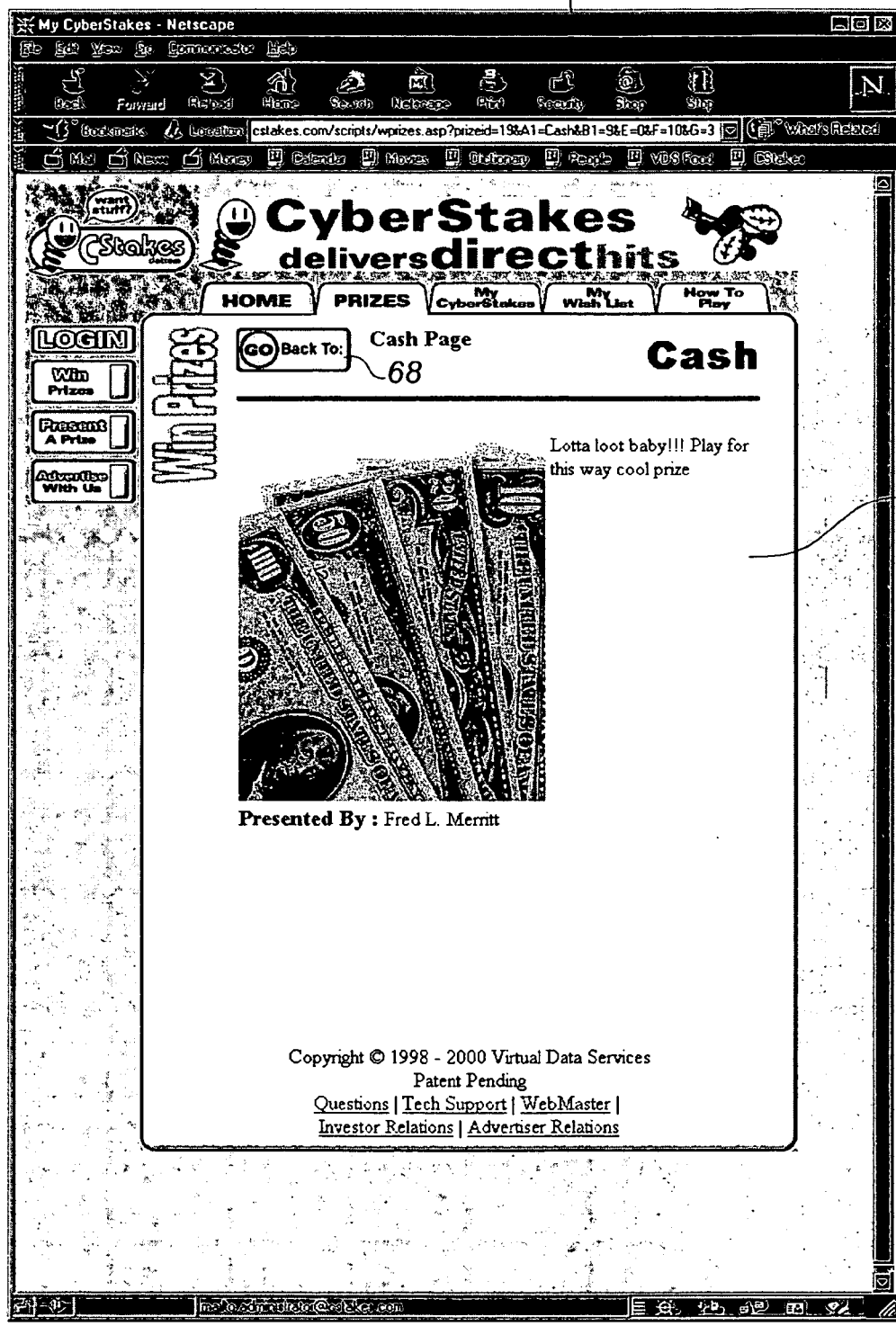
FIG. 5 depicts an example of a PRIZE INFO SCREEN in the preferred system.

If the user has already logged into the system, the PRIZE INFO SCREEN 66 is displayed for the particular prize selected, as depicted in FIG. 5. Text and/or images associated with the selected prize, in this example—cash, are retrieved from the PRIZE DATABASE and displayed in the central message window 14 of the PRIZE INFO SCREEN 66. To return to the SAMPLE PRIZES SCREEN 56, the user can select the GO BACK TO button 68 at SELECTION 484 of FIG. 31; the GO BACK TO button 64 is also located in the central message window 14 of the PRIZE INFO SCREEN 66. A new advertising banner would be retrieved as indicated by RETRIEVE BANNER 486, and the user would be returned to the SAMPLE PRIZES SCREEN 56, as depicted in FIG. 4.

Figure 32:
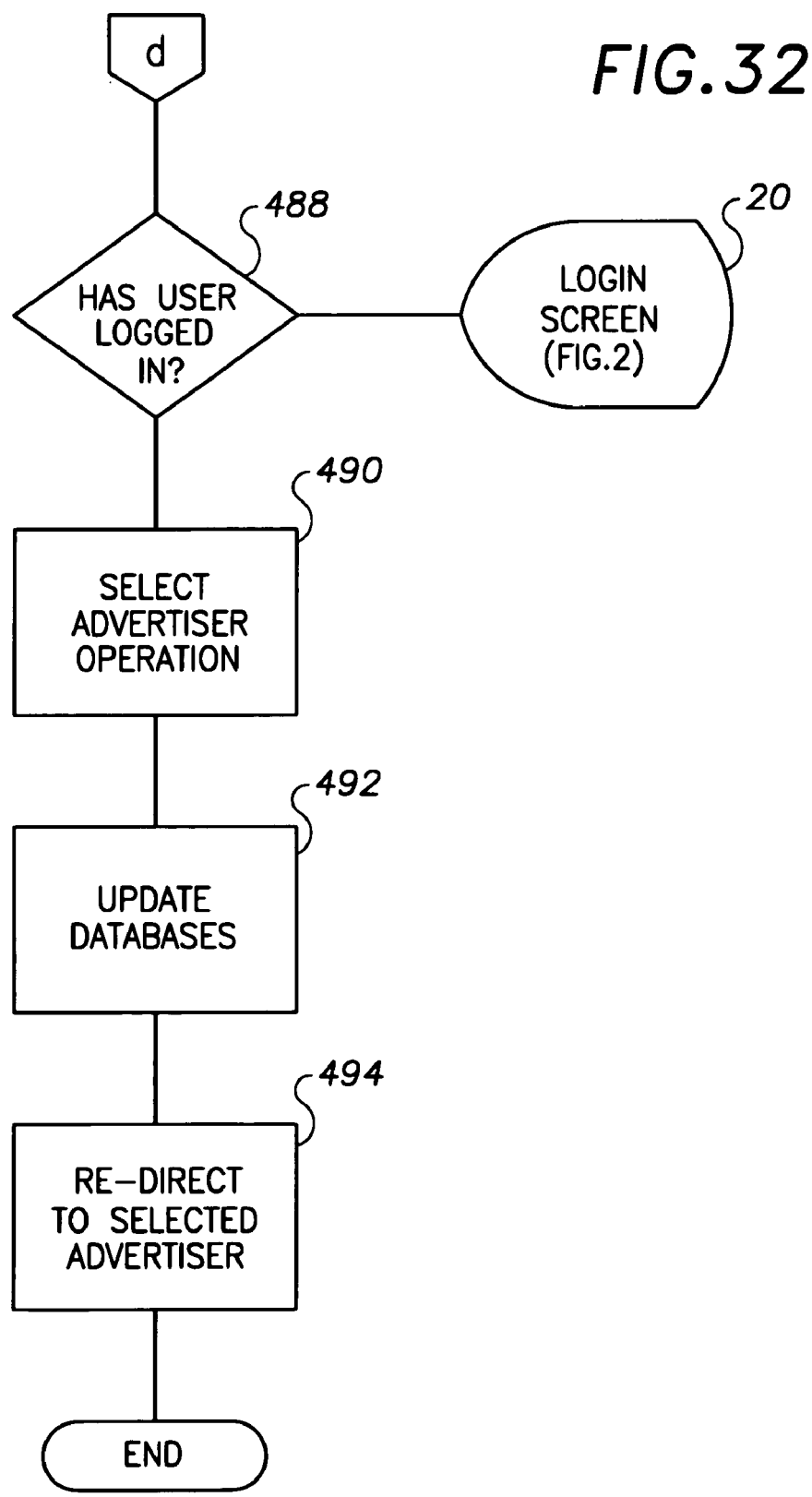

FIG. 32 is a flow chart depicting the operation and function of the "PLAYER_MATCH" subroutine. This subroutine performs the primary function of the system of the present invention. Specifically, this subroutine matches a user with a selected advertiser. The first step in this subroutine is the determination at DECISION 488 as to whether the user has logged into the system. If not, the user is re-directed to the LOGIN SCREEN 20, as depicted in FIG. 2. If the user has already logged into the system, the system matches the user with a particular advertiser at OPERATION 490. In this regard, the system compares the user profile maintained in the integral USER DATABASE with the preferred or target demographic profiles as established by advertisers and maintained in the PROFILE DATABASE. The comparison is effectuated by comparing such data as sex, age, interests, etc. A user is a "perfect match" if he meets all the criteria of a certain target profile, e.g., a male, college-educated professional, 25–30 years old. If no perfect match is available, a user may be re-directed to an advertiser that is a close match, i.e., meets some but not all of the criteria of a particular target profile.

It is also possible that an individual user is within the targeted demographic population of more than one advertiser. In such a situation, the system must determine which advertiser the user is re-directed to. To make such a determination, it is contemplated that the system considers such factors as the status of the advertiser and/or the time that has elapsed since a re-direction to a particular advertiser has occurred. For example, an advertiser may be willing to pay a premium to ensure that all individuals within a targeted demographic are first directed to their site rather than that of another advertiser. Or, perhaps two advertisers have the same status, but one user was directed to the first advertiser just a few minutes prior, so the next user would be directed to the second advertiser. Of course, various other criteria and factors could be considered in effectuating an appropriate match without departing from the spirit and scope of the present invention.

Once the appropriate match has been made, the databases are updated as indicated at UPDATE DATABASES 492 of FIG. 32. Specifically, the USER DATABASE is updated with information that the particular registered user entered the sweepstakes for the prize; the PRIZE DATABASE is updated so as to lower the number of remaining hits required before the prize is given away; and the PROFILE DATABASE is updated reflect that a user was directed to a particular advertiser's site. Finally, as indicated at REDIRECT 494, the user is re-directed to the selected advertiser's web site, thus exiting the system of the present invention. It is further contemplated that rather than be re-directed to a new web site, a pop-up advertising window could be displayed without departing from the spirit and scope of the present invention.

Figure 33:
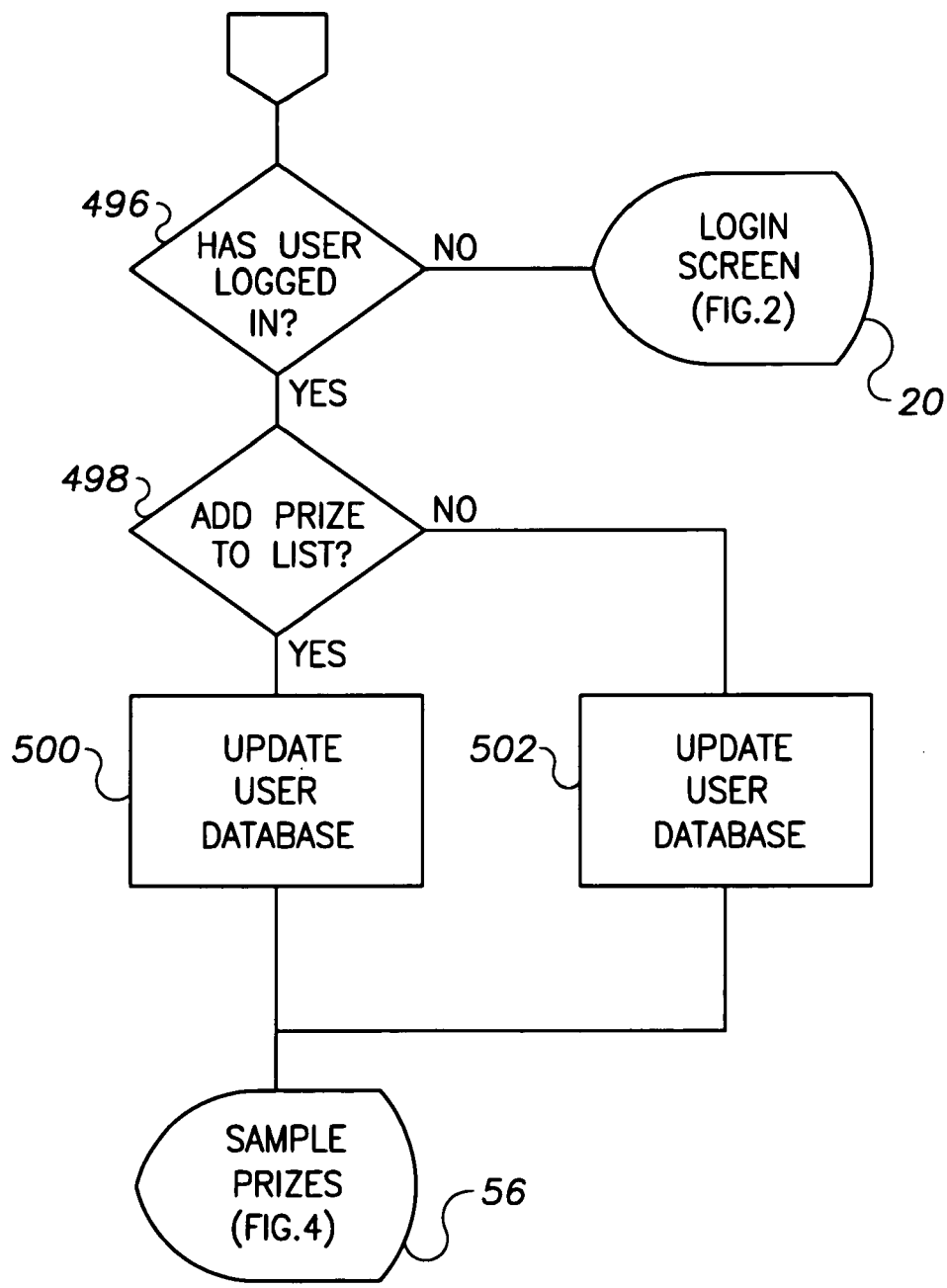

FIG. 33 is a flow chart depicting the operation and function of the "PLAYER_PERS_LIST" subroutine. The first step in this subroutine is the determination at DECISION 496 as to whether the user has logged into the system. If not, the user is re-directed to the LOGIN SCREEN 20, as depicted in FIG. 2. If the user has already logged into the system, the system then determines at DECISION 498 whether the prize is currently on the user's personal watch list. In other words, is the prize is to be added to the user's list. If so, the logic flow proceeds to UPDATE 500, and the USER DATABASE is updated so that the selected prize is associated with the user's profile. If not (i.e., the prize is already on the user's personal watch list), the logic flow proceeds to UPDATE 502, and the USER DATABASE is updated so that the selected prize is removed from the user's profile. Throughout the execution of this subroutine, the user remains at the SAMPLE PRIZES SCREEN 56.

Returning to HOME SCREEN 10 of FIG. 1 and the associated flow chart of FIG. 28, to view a personalized screen detailing information about the registered player, the player would select the MY CYBERSTAKES tab 18c at SELECTION 422, which would initiate the subroutine depicted in FIG. 34. Referring now to FIG. 34, a new advertising banner is retrieved at RETRIEVE BANNER 502. A determination is then made at DECISION 504 as to whether the user has logged into the system. If not, the user is re-directed to the LOGIN SCREEN 20, as depicted in FIG. 2. If the user has already logged into the system, the MY CYBERSTAKES SCREEN 70 is displayed for the particular user, as depicted in FIG. 6.

Figure 6:
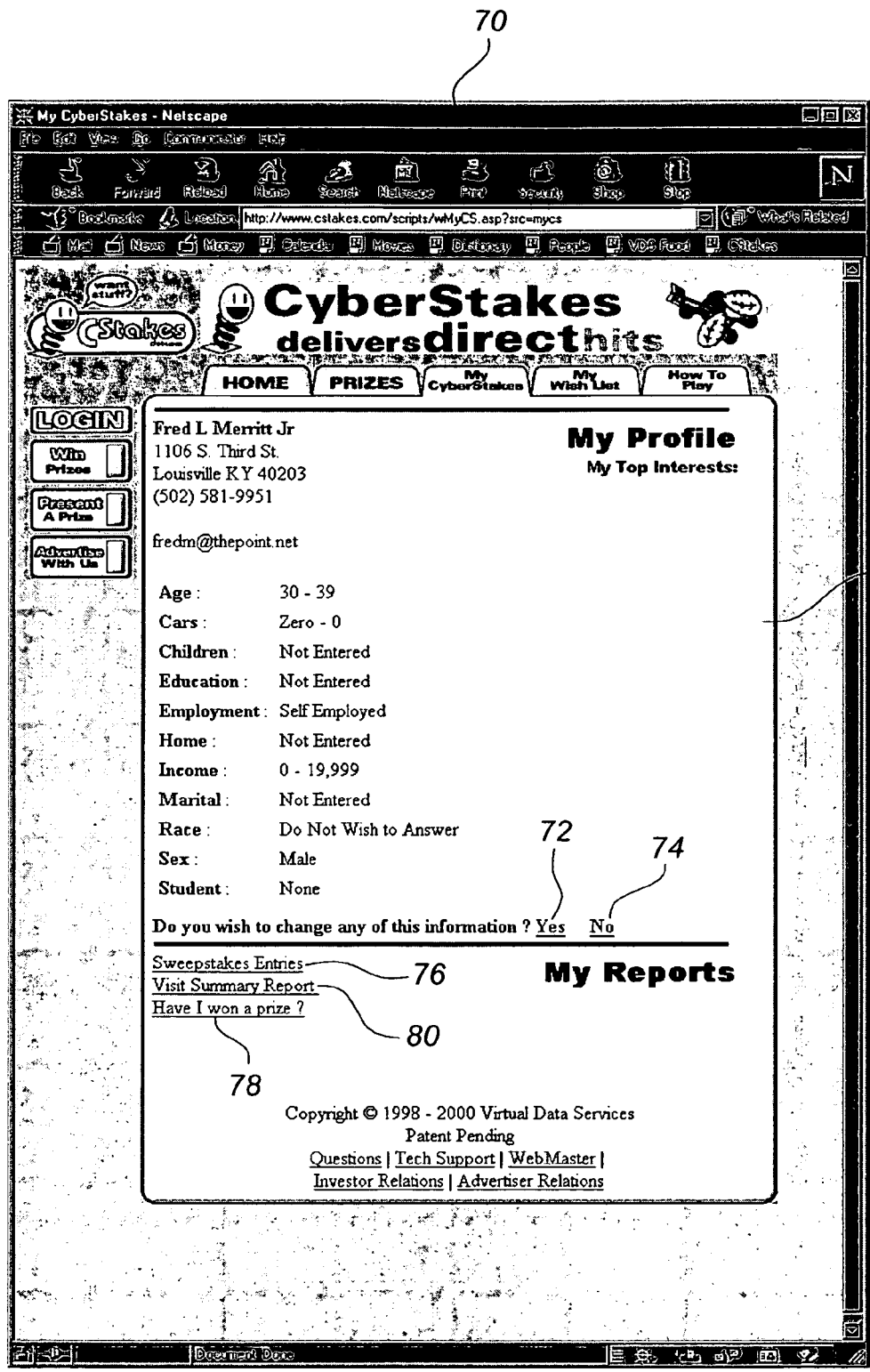
FIG. 6 depicts an example of a MY CYBERSTAKES SCREEN in the preferred system.
Figure 7:
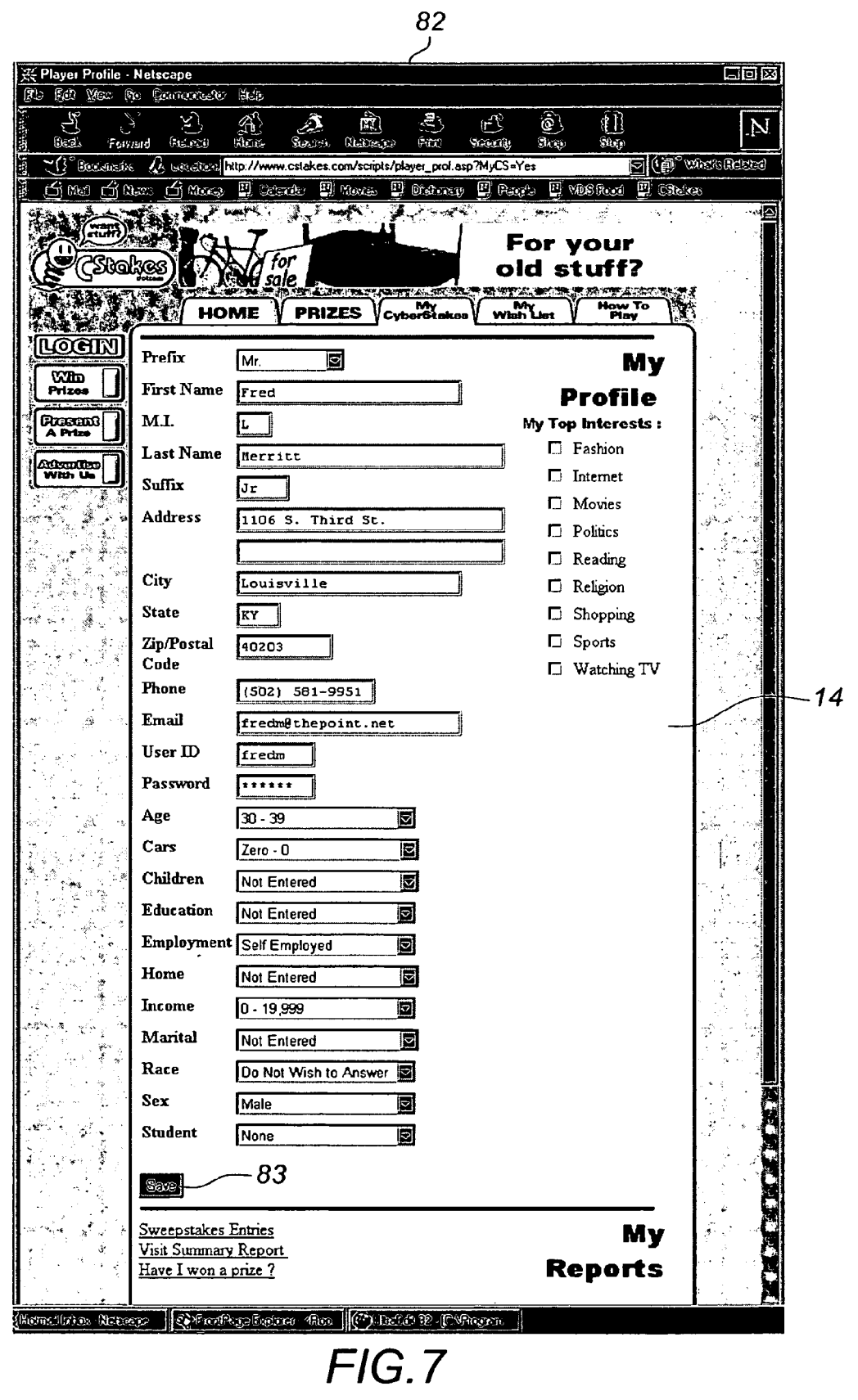
Figure 35:
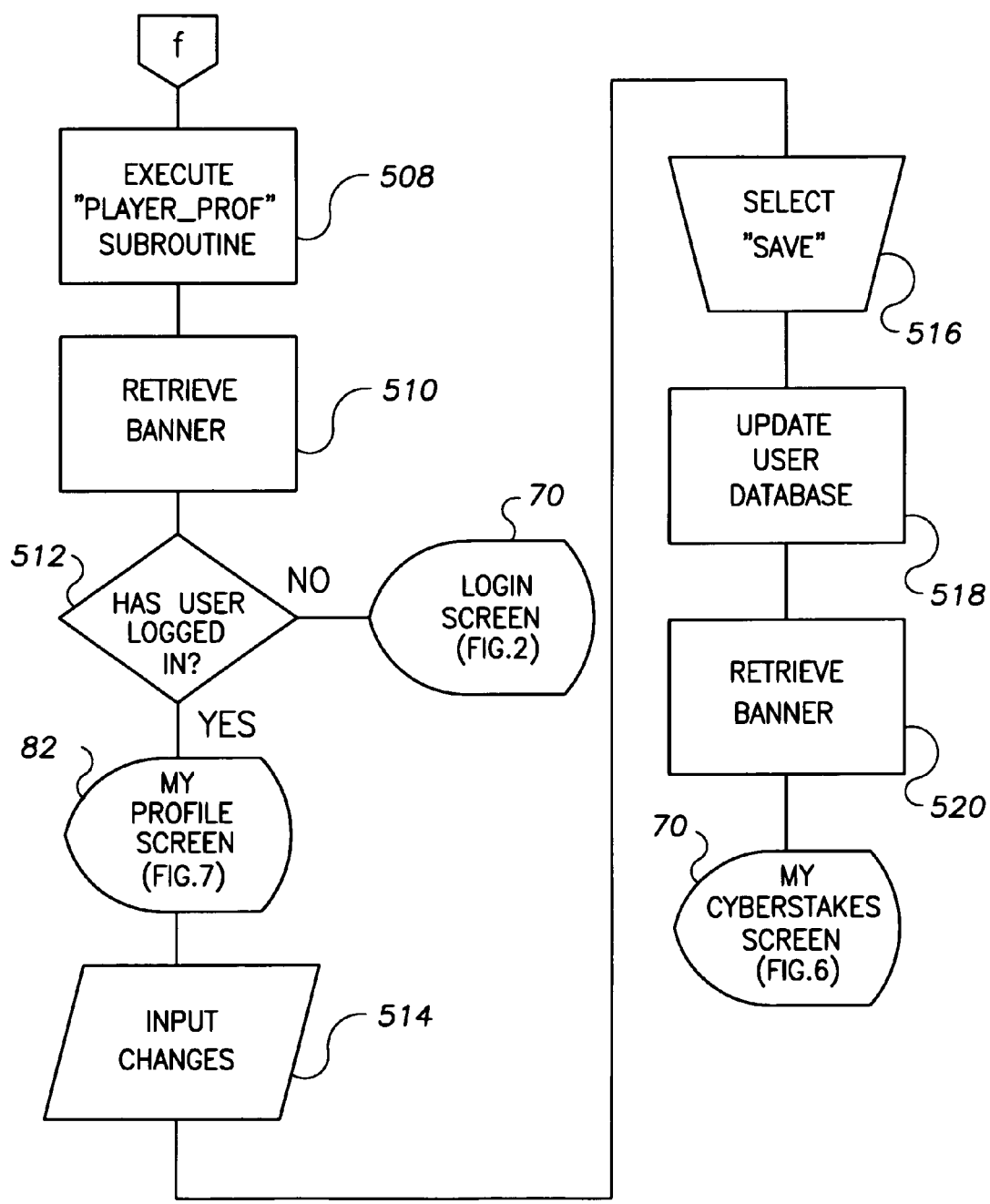

As shown in FIG. 6, the MY CYBERSTAKES SCREEN 70 simply displays the various demographic information that was entered when the user first registered with the system, as described with reference to FIG. 2A. From the MY CYBERSTAKES SCREEN 70, the user has the option of editing or revising any of this demographic information. Specifically, by selecting the YES hyperlink 72 in the central message window 14 at SELECTION 506 of FIG. 34, the "PLAYER_PROF" subroutine is executed at EXECUTE 508 of FIG. 35. Referring now to FIG. 35, a new advertising banner is retrieved at RETRIEVE BANNER 510. Again, a determination is then made at DECISION 512 verifying that the user has properly logged into the system. If not, the user is returned to the LOGIN SCREEN 20, as depicted in FIG. 2. If the user has logged into the system, the MY PROFILE SCREEN 82 is displayed for the particular user, as depicted in FIG. 7. The MY PROFILE SCREEN 82 is almost identical to the DATA ENTRY SCREEN 30 of FIG. 2A, except that the information currently stored in the USER DATABASE is displayed in the appropriate data fields. Of course, the user can modify any or all of this information at INPUT CHANGES 514 of FIG. 35, selecting the SAVE button 83 at SELECTION 516 of FIG. 35 to update the information stored in the integral USER DATABASE at UPDATE 518. A new advertising banner is then retrieved at RETRIEVE BANNER 520 of FIG. 25, and the system returns the user to the MY CYBERSTAKES SCREEN 70, as depicted in FIG. 6.

Returning to FIG. 6 and the associated flow chart of FIG. 34, if the user does not wish to modify or revise any of the demographic information, he may select the NO hyperlink 74 in the central message window 14 at SELECTION 522, thereby returning the user to the HOME SCREEN 10, as depicted in FIG. 1.

From the MY CYBERSTAKES SCREEN 70 of FIG. 6, the user also has the option of viewing various personalized reports. Each of these reports can be displayed in the central message window 14 by selecting the appropriate hyperlink. To view a report detailing the user's sweepstakes entries, the user can select the SWEEPSTAKES ENTRIES hyperlink 76 at SELECTION 524 of FIG. 34, which causes the execution of the "SWEEPSTAKES_ENTRY" subroutine at EXECUTE 526. To view a report detailing the prizes a particular user has won, he can select the HAVE I WON A PRIZE? hyperlink 80 at SELECTION 528 of FIG. 34, which causes the execution of the "HAVE_I_WON" subroutine at EXECUTE 530. Finally, to view a report summarizing the web sites that the individual user has been re-directed to, he can select the VISIT SUMMARY REPORT hyperlink 80 at SELECTION 532 of FIG. 34, which causes the execution of the "PLAYER_VISIT_SUMMARY" subroutine at EXECUTE 534.

Figure 8:
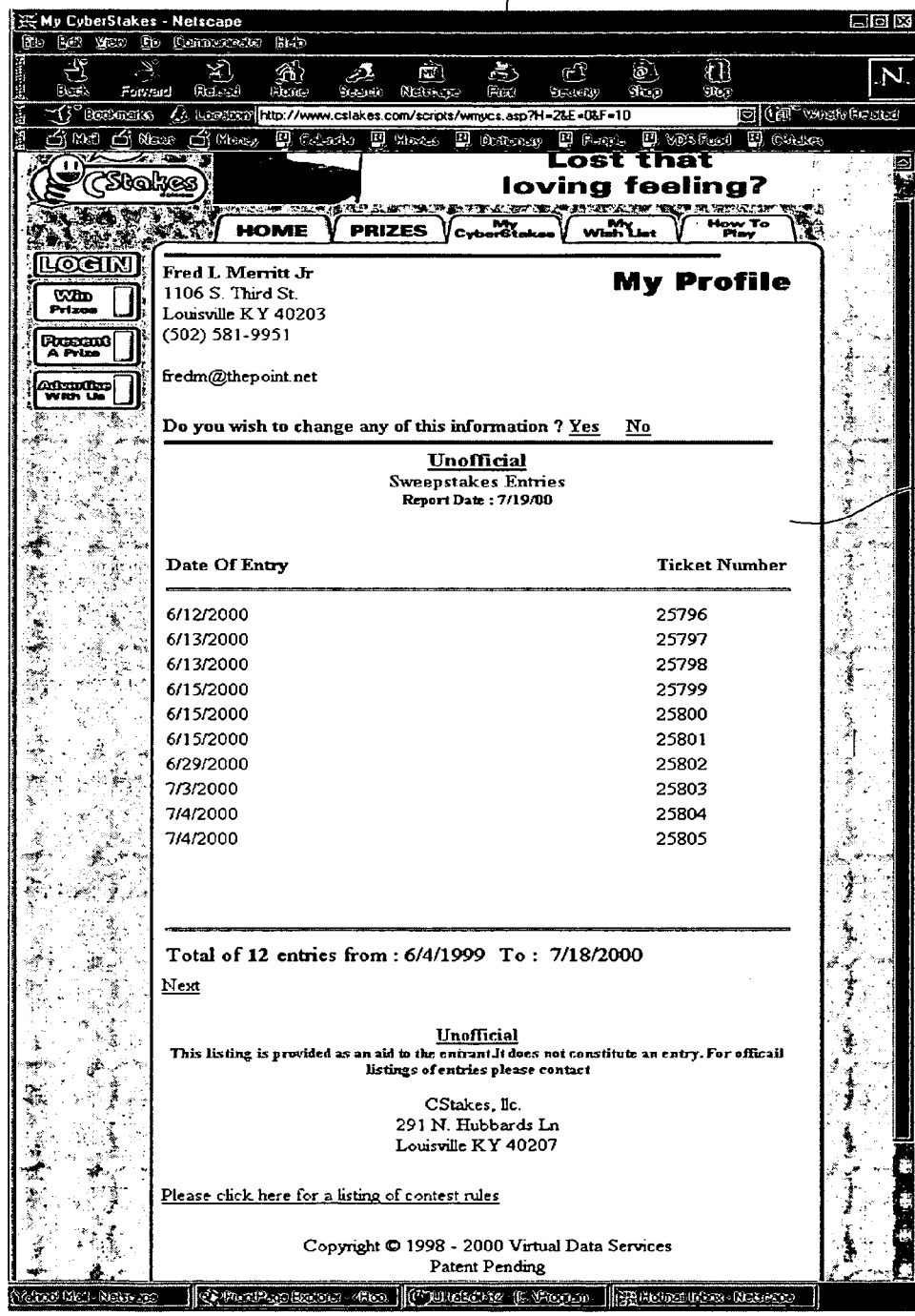
FIG. 8 depicts an example of an ENTRIES SCREEN in the preferred system.

FIG. 36 depicts the operation and function of the "SWEEPSTAKES_ENTRY" subroutine described above. Specifically, the subroutine first retrieves a new advertising banner at RETRIEVE BANNER 536. The second step in the subroutine is the determination at DECISION 538 as to whether the user has logged into the system. If not, the user is re-directed to the LOGIN SCREEN 20, as depicted in FIG. 2. If the user has already logged into the system, the system then retrieves the report data from the integral USER DATABASE at RETRIEVE DATA 540, displaying said data in the central message window 14 of the ENTRIES SCREEN 84 of FIG. 8. Again, this report details the user's sweepstakes entries, specifically providing information related to the date and ticket number of each entry. Thus, the report allows the user to verify that all entries have been appropriately recorded.

Figure 9:
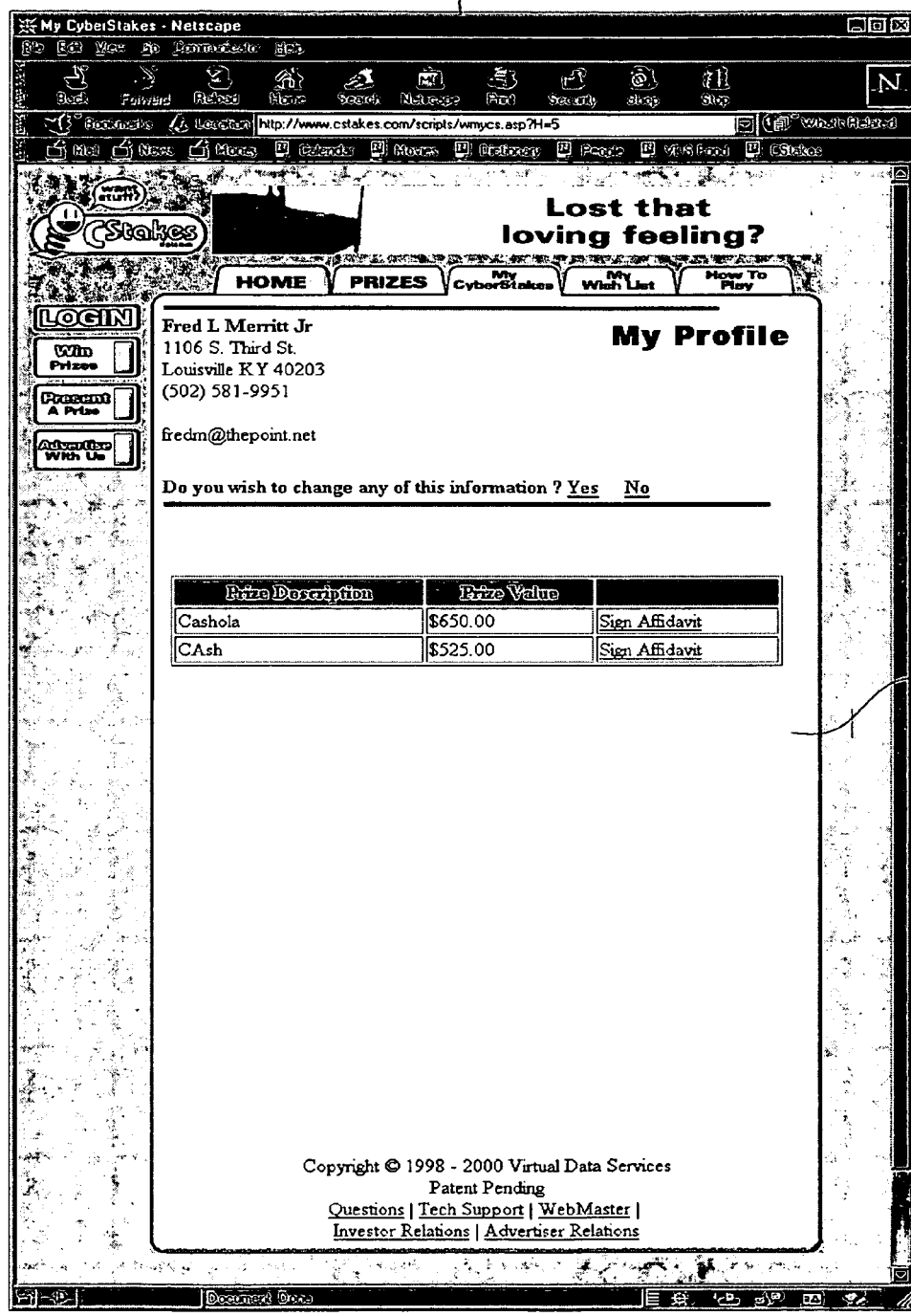
FIG. 9 depicts an example of a HAVE I WON SCREEN in the preferred system.

FIG. 37 depicts the operation and function of the "HAVE_I_WON" subroutine described above. Specifically, the subroutine first retrieves a new advertising banner at RETRIEVE BANNER 542. The second step in the subroutine is the determination at DECISION 544 as to whether the user has logged into the system. If not, the user is re-directed to the LOGIN SCREEN 20, as depicted in FIG. 2. If the user has already logged into the system, the system then retrieves the report data from the integral USER DATABASE at RETRIEVE DATA 546, displaying said data in the central message window 14 of the HAVE I WON SCREEN 86 of FIG. 9. Again, this report details the prizes a particular user has won. Although not shown in FIG. 9, it is contemplated that the report data might also included information about who won other sweepstakes that the user had entered.

Figure 10:
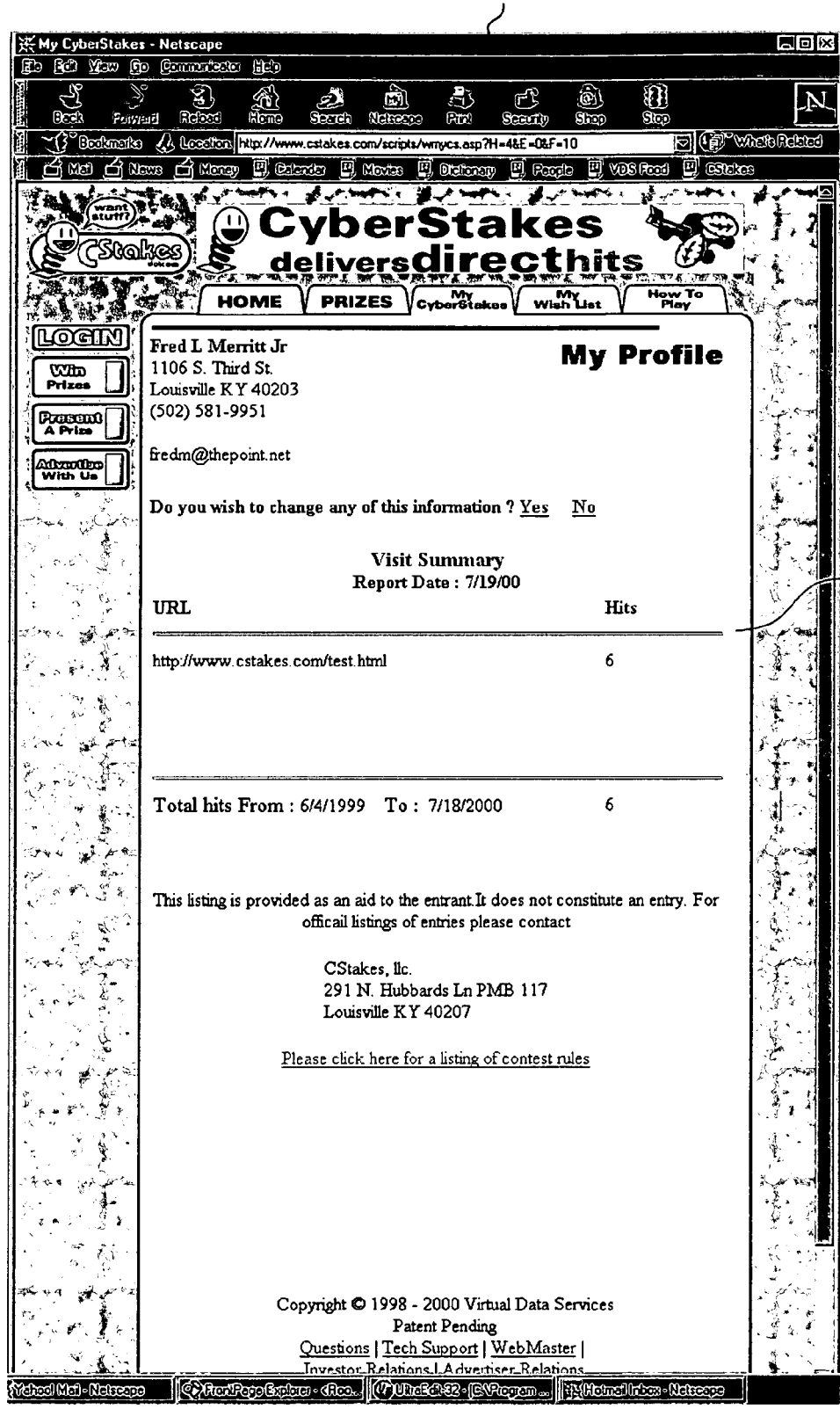
FIG. 10 depicts an example of a SUMMARY SCREEN in the preferred system.
Figure 38:
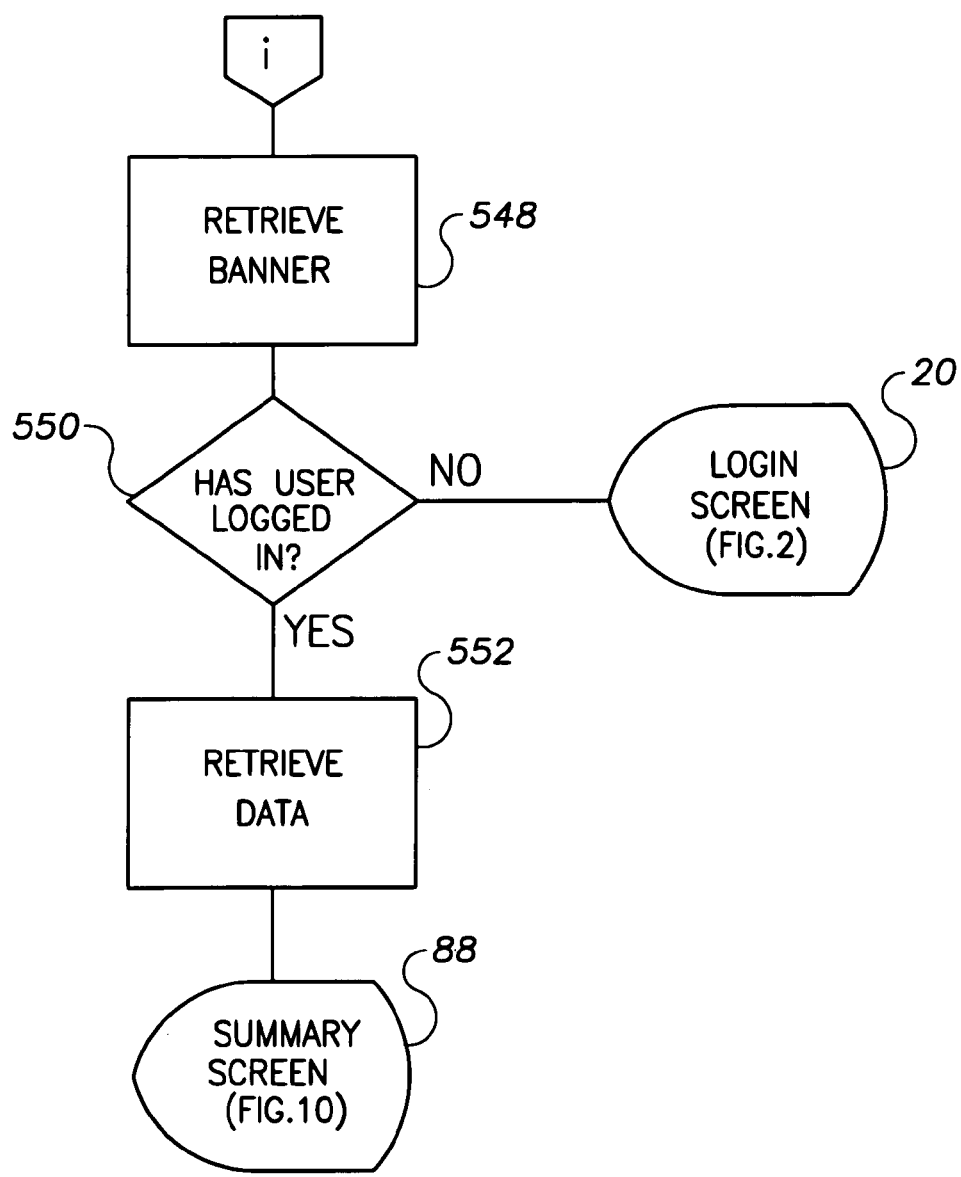

FIG. 38 depicts the operation and function of the "PLAYER_VISIT_SUMMARY" subroutine described above. Specifically, the subroutine first retrieves a new advertising banner at RETRIEVE BANNER 548. The second step in the subroutine is the determination at DECISION 550 as to whether the user has logged into the system. If not, the user is re-directed to the LOGIN SCREEN 20, as depicted in FIG. 2. If the user has already logged into the system, the system then retrieves the report data from the integral USER DATABASE at RETRIEVE DATA 552, displaying said data in the central message window 14 of the SUMMARY SCREEN 88 of FIG. 10.

Figure 11:
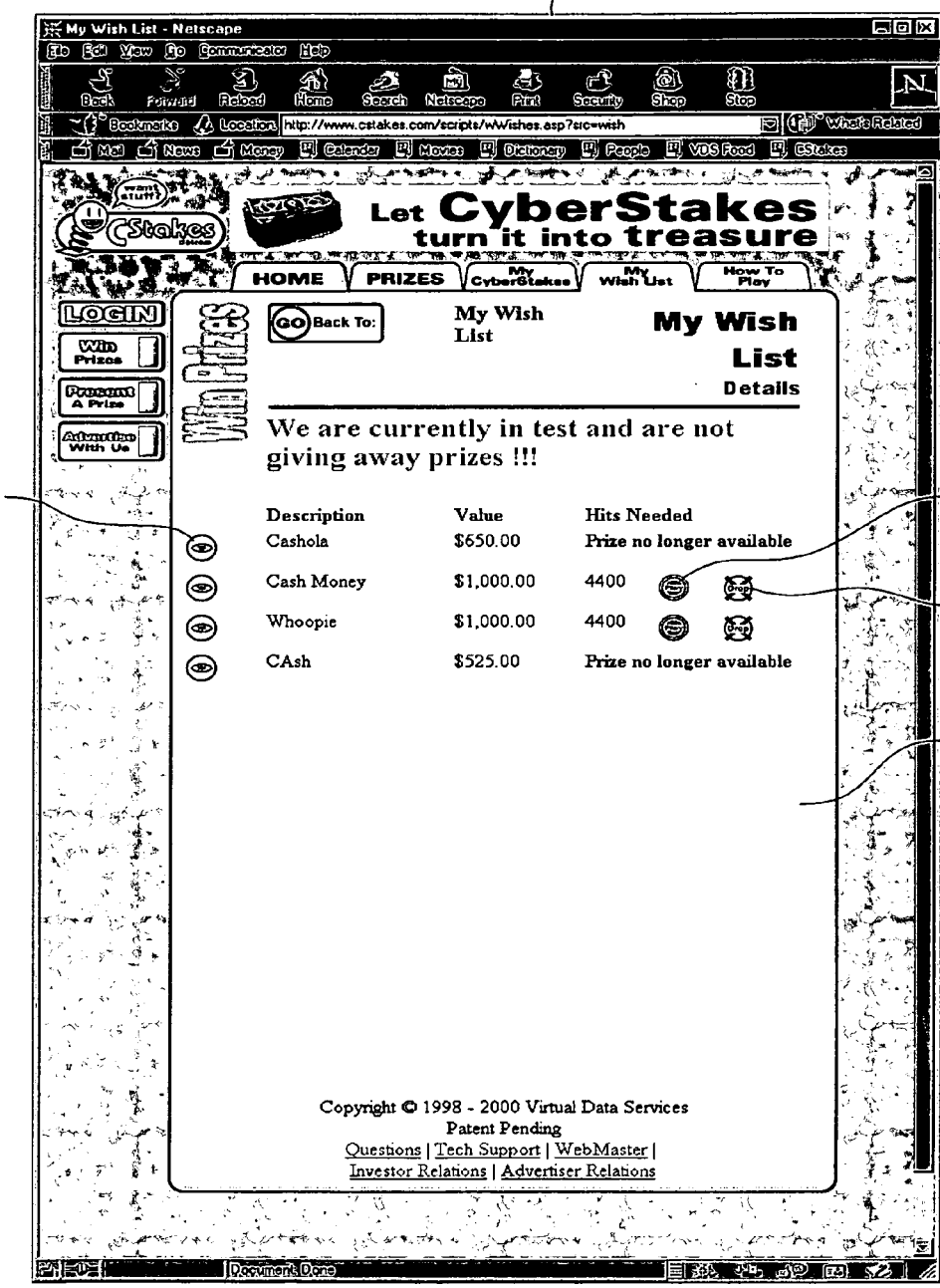
FIG. 11 depicts an example of a MY WISH LIST SCREEN in the preferred system.

FIG. 39 depicts the operation and function of the subroutine initiated by selection of the MY WISH LIST tab 18d, as discussed with reference to FIG. 1 and the associated flow chart of FIG. 28. The subroutine first retrieves a new advertising banner at RETRIEVE BANNER 554. The second step in the subroutine is the determination at DECISION 556 as to whether the user has logged into the system. If not, the user is re-directed to the LOGIN SCREEN 20, as depicted in FIG. 2. If the user has already logged into the system, the MY WISH LIST SCREEN 90 is displayed for the particular user, as depicted in FIG. 11. The MY WISH LIST SCREEN 90 displays in the central message window 14 those prizes on the user's personal watch list, record of which is maintained in the integral USER DATABASE, as described above with reference to the "PLAYER_PERS_LIST" subroutine of FIG. 33. Included with the listing of prizes is the value of each prize and the number of hits necessary before a sweepstakes for that prize will be conducted.

Similar to the options available with respect to the SAMPLE PRIZE SCREEN 56 of FIG. 4, the user has three options on the MY WISH LIST SCREEN 90. If the user would like more information about a particular prize, he could select the VIEW DETAILS icon 58 associated with the prize at SELECTION 558 of FIG. 39, which would trigger execution of the "PRIZE_INFO" subroutine at EXECUTE 560 of FIG. 39. This subroutine was described above with reference to FIG. 31. If the user would like more play for a particular prize, he could select the PLAY PRIZE icon 60 associated with the prize at SELECTION 562 of FIG. 39, which would trigger execution of the "PLAYER_MATCH" subroutine at EXECUTE 564. This subroutine was described above with reference to FIG. 32. If the user would like to remove a particular prize from his personal watch list, he could select the DROP icon 63 associated with the prize at SELECTION 566 of FIG. 30, which would trigger execution of the "PLAYER_PERS_LIST" subroutine at EXECUTE 568. This subroutine was described above with reference to FIG. 33.

Figure 12A:
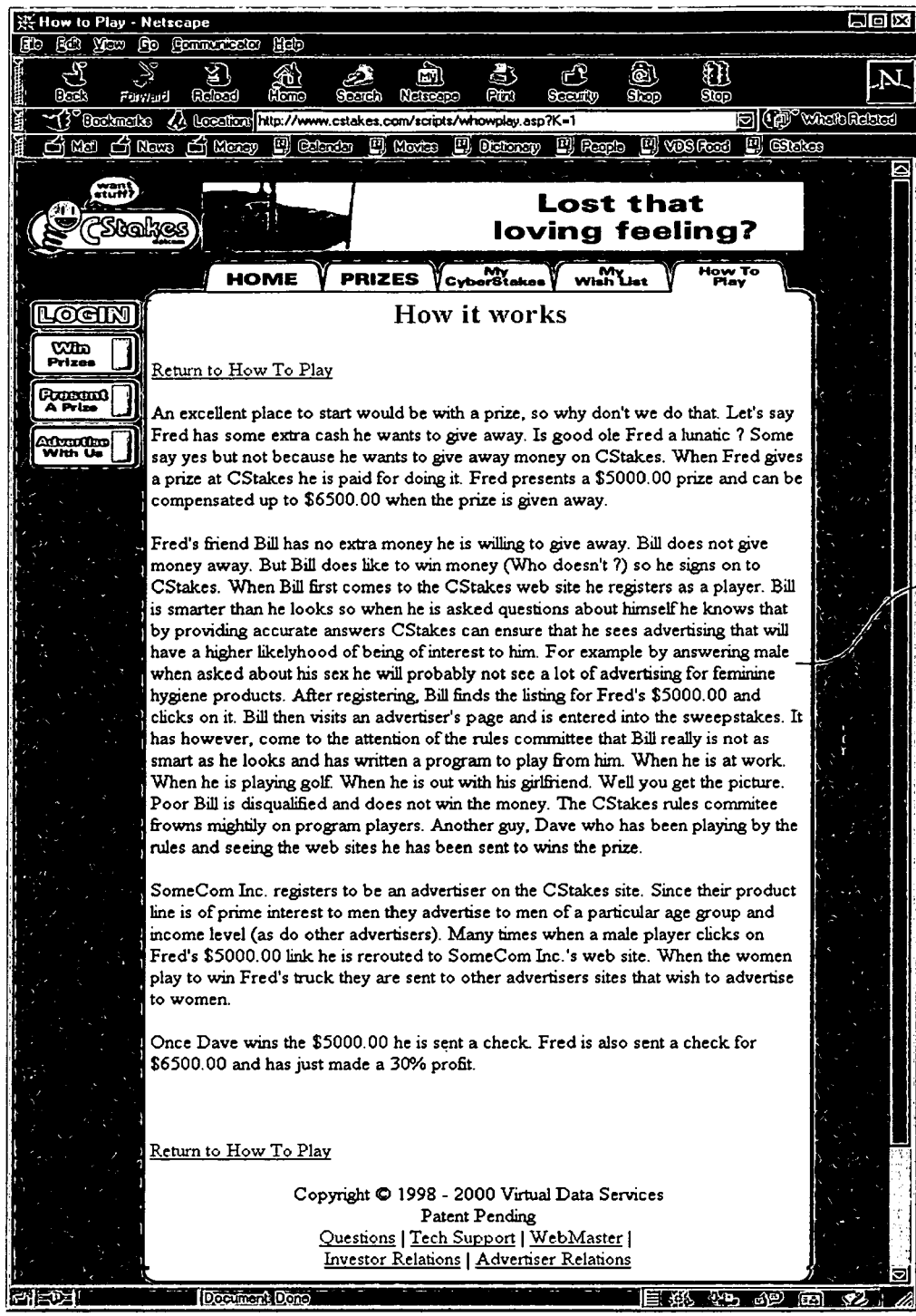
FIG. 12A depicts a screen displaying a detailed written description of the preferred system with respect to a player.
Figure 12B:
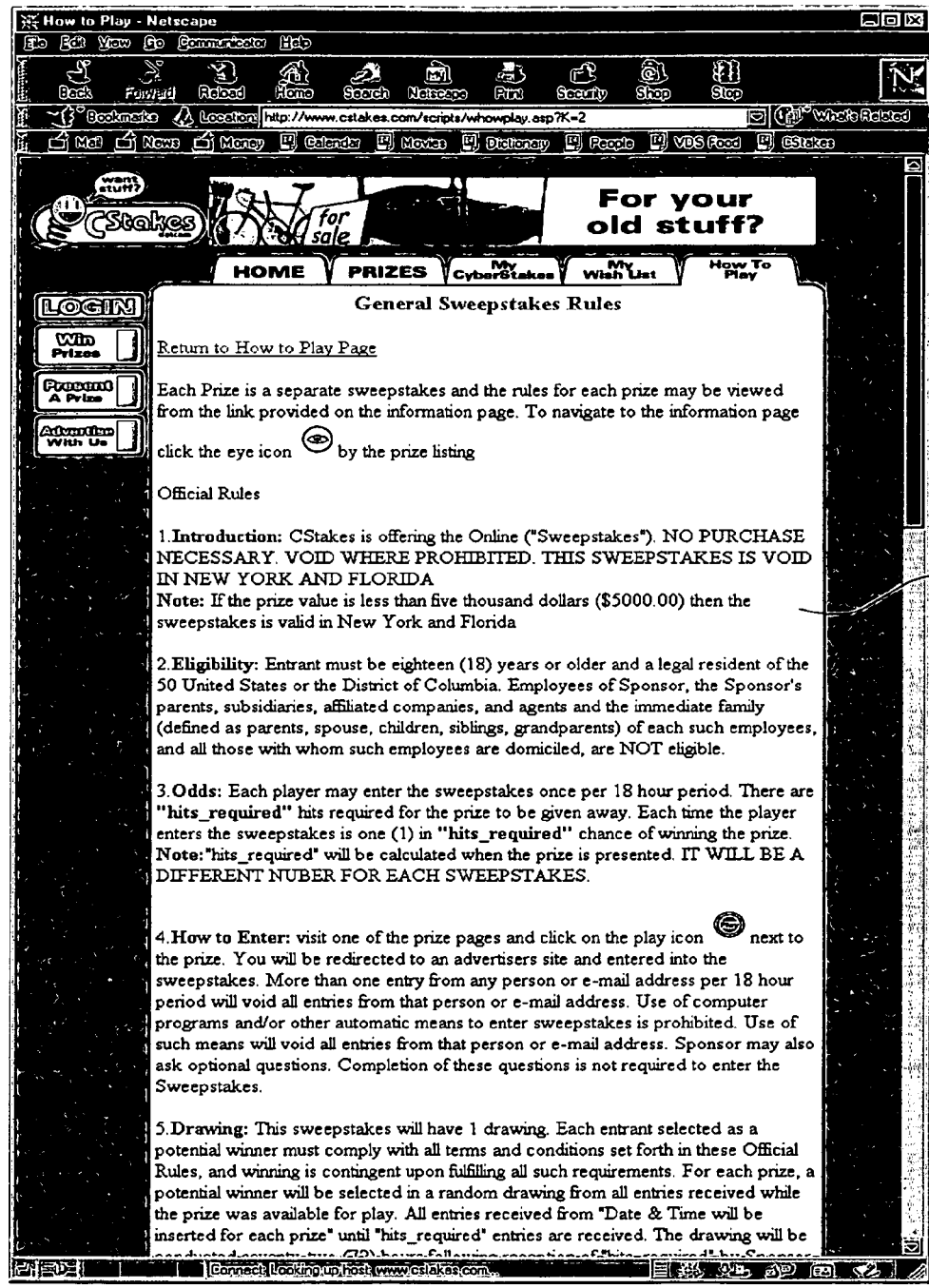
FIG. 12B depicts a screen displaying written rules of the preferred system.
Figure 12C:
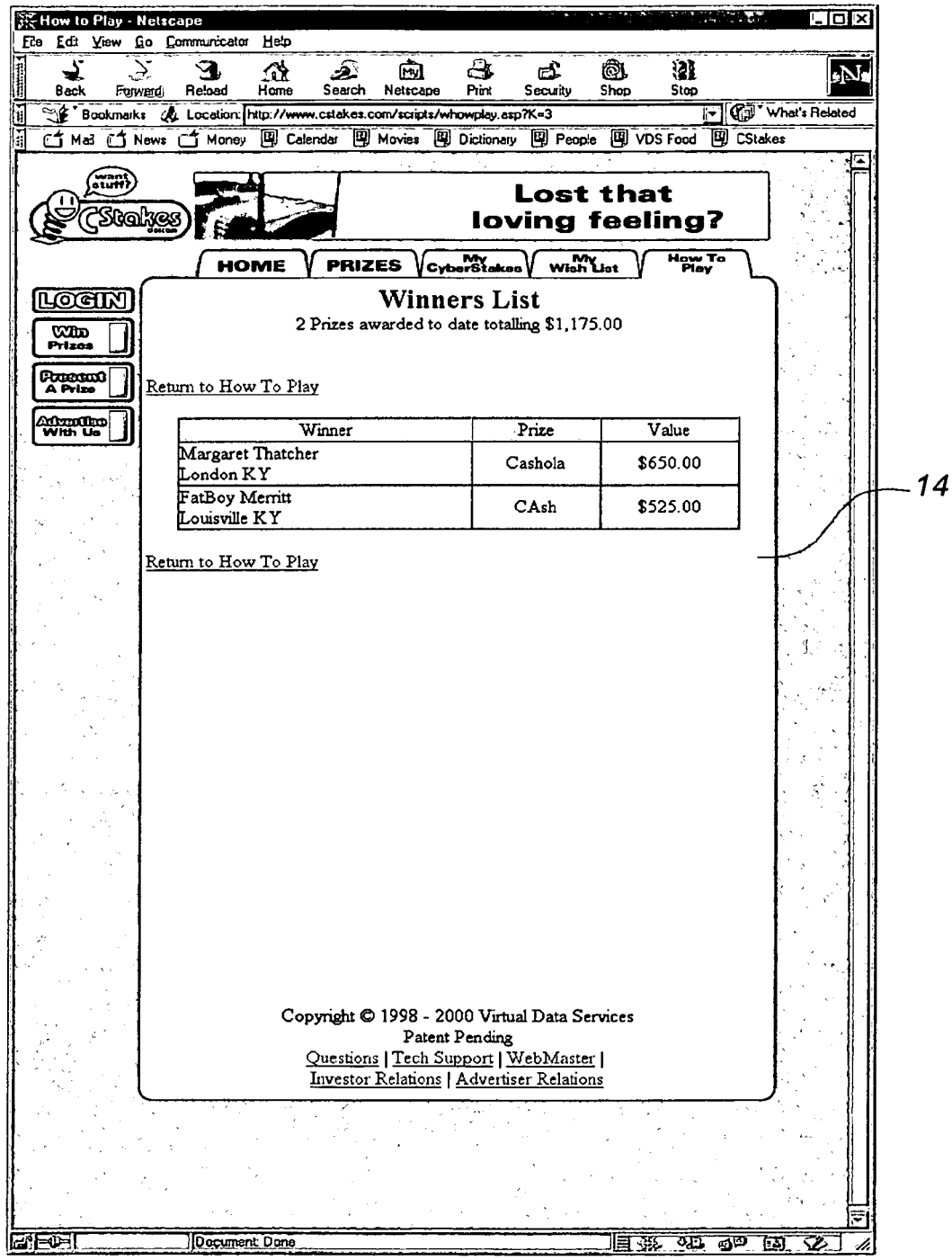
FIG. 12C depicts a screen displaying an example list of winners in the preferred system.

Finally, in relation to "player" options, as discussed above, by selecting the HOW TO PLAY tab 18e, the user can view instructions on how to play, that is, instructions on how the preferred system works. FIG. 12 depicts a preferred HOW TO PLAY SCREEN 92. Various hyperlinks are displayed in the central message window 14 of the HOW TO PLAY SCREEN 92, including a "How Playing Works" 94 hyperlink, a "General Rules" 96 hyperlink, and a "Winners"

hyperlink 98. Selection of each of these hyperlinks directs the user to further information about the preferred system. For example, selection of the "How Playing Works" 94 hyperlink directs the user to the screen depicted in FIG. 12A, said screen including a detailed written description of the system works in the central message window 14. Selection of the "General Rules" 96 hyperlink directs the user to the screen depicted in FIG. 12B, said screen including detailed written rules in the central message window 14. Selection of the "Winners" hyperlink 98 directs the user to the screen depicted in FIG. 12C, said screen including a list of winners in the central message window 14.

FIG. 13 depicts the PRESENTING HOME SCREEN 100 of the preferred system. As described above, the PRESENTING HOME SCREEN 100 is accessed through the selection of the PRESENT A PRIZE button 16c, as described with reference to FIG. 1 and the associated flow chart of FIG. 28.

As with all screens of the preferred system, the PRESENTING HOME SCREEN 100 includes a banner advertisement location 12 that appears at the top of the screen 100 and a central message window 14. As shown in FIG. 13, various text messages, images, and/or hyperlinks can be displayed in this window 14 conveying information to the user about the system. Similar to the "player" screens described above, along the periphery of this window 14 are a series of buttons 16 and a series of tabs 102. The four buttons arrayed along the central message window 14 are identical to those described above with reference to the "player" screens: a LOGIN button 16a, a WIN PRIZES button 16b, a PRESENT A PRIZE button 16c, and an ADVERTISE WITH US button 16d. Indeed, as noted above, these four buttons do appear on each and every screen of the preferred system.

In this preferred system, there are also three tabs 102 arrayed along the top of the central message window 14: a PRESENTING HOME tab 102a, a PRIZE REGISTRATION tab 102b, and a HOW TO PRESENT tab 102c. These tabs 102 are different than those described above with reference to the "player" screens but, although these tabs 102 are not particularly pointed out with reference to all of the screens described below, these three tabs do appear on each and every "prize presenter" screen of the preferred system.

FIG. 40 is a flow chart depicting navigation through and operation of the system, beginning from the PRESENTING HOME SCREEN 100. For a user to continue through the system, one of the buttons 16 or tabs 102 must be clicked or otherwise selected by the user.

Figure 14:
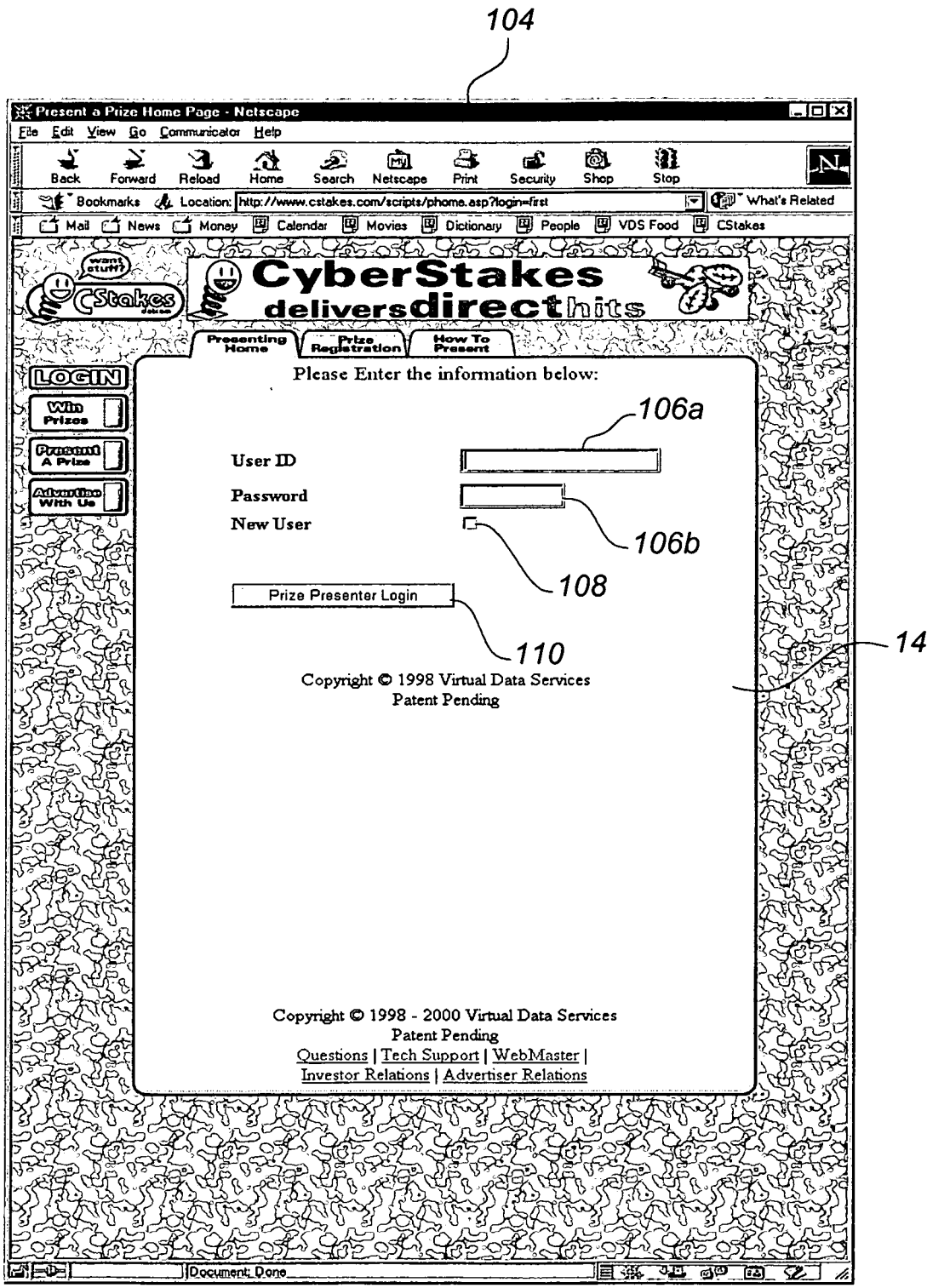
FIG. 14 depicts the LOGIN SCREEN for prize presenters in the preferred system.

If a user is a registered user of the system or wishes to become one, he would select the LOGIN button 16a, as indicated at SELECTION 600 of FIG. 40. A new advertising banner would be retrieved as indicated by RETRIEVE BANNER 602, and the user would be re-directed to the LOGIN SCREEN 104, as depicted in FIG. 14 and which will be more fully described below.

If the user would like to view available prizes or enter one or more of the sweepstakes, he would select the WIN PRIZES button 16b at SELECTION 604. Again, a new advertising banner would be retrieved as indicated by RETRIEVE BANNER 606, and the user would be re-directed to the PRIZES SCREEN 50, as depicted in FIG. 3.

If the user is a prize presenter or wishes to become one, he would select the PRESENT A PRIZE button 16c at SELECTION 608. Again, a new advertising banner would be retrieved as indicated by RETRIEVE BANNER 610. However, since the user is already at the PRESENTING HOME SCREEN 100, he would simply be returned to the same page. Therefore, it is contemplated the PRESENT A PRIZE button 16c not be available as a selection on the PRESENTING HOME SCREEN 100.

Finally, if the user is an advertiser or wishes to become one, he would select the ADVERTISE WITH US button 16d at SELECTION 612. Again, a new advertising banner would be retrieved as indicated by RETRIEVE BANNER 614, and the user would be re-directed to the ADVERTISING HOME screen 170, as depicted in FIG. 21 and which will be more fully described below.

As mentioned above, the tabs 102 included on the PRESENTING HOME SCREEN 100 are "presenter" tabs in that they are designed for a user that will be registering prizes for "sale" through the sweepstakes.

Figure 42:
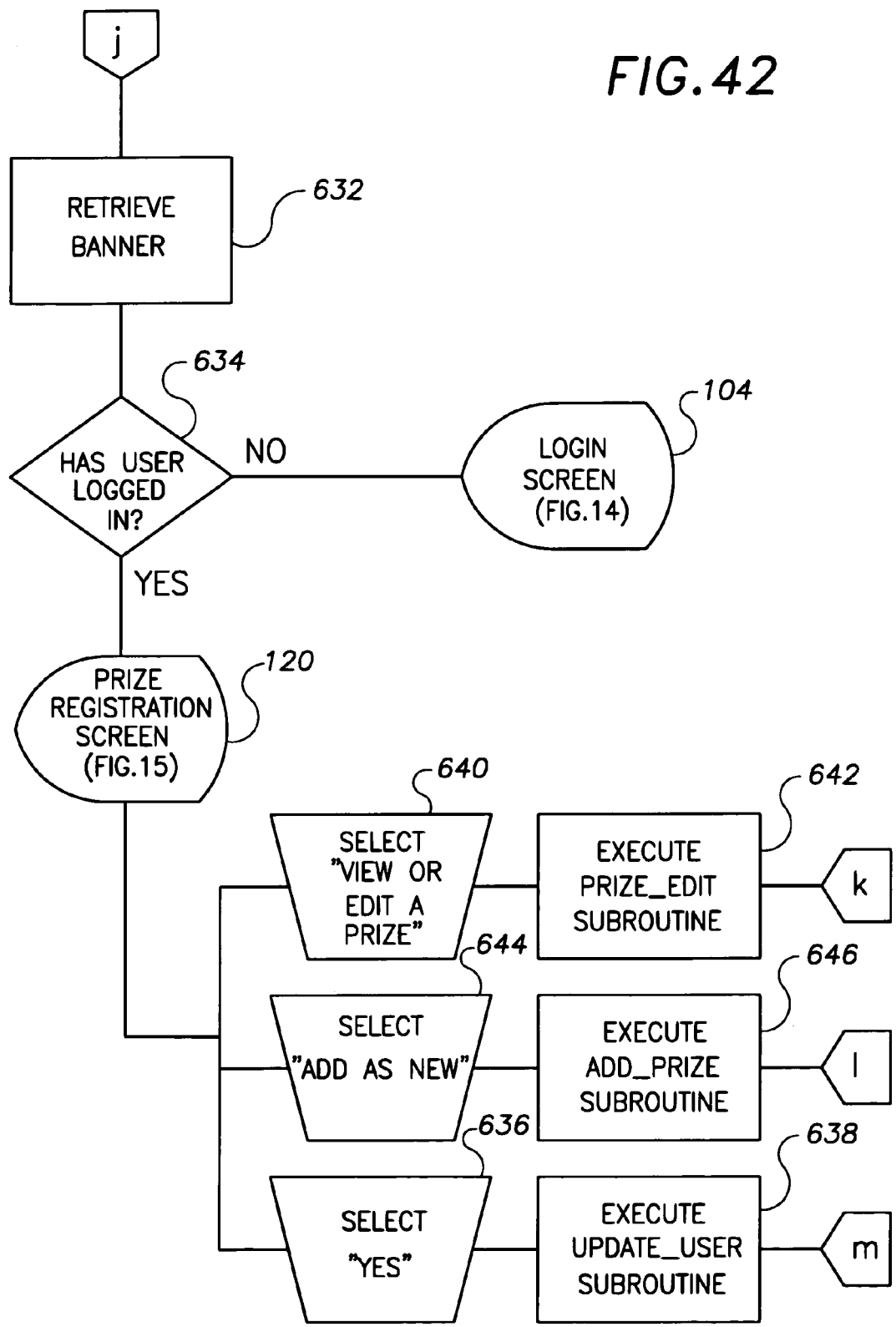

Referring still to FIG. 40 and the tabs 102 shown in FIG. 13, if a user wishes to register a prize for sale through the sweepstakes, he would select the PRIZE REGISTRATION tab 102b at SELECTION 616, which would initiate the subroutine depicted in FIG. 42 as will be more fully described below.

Figure 20:
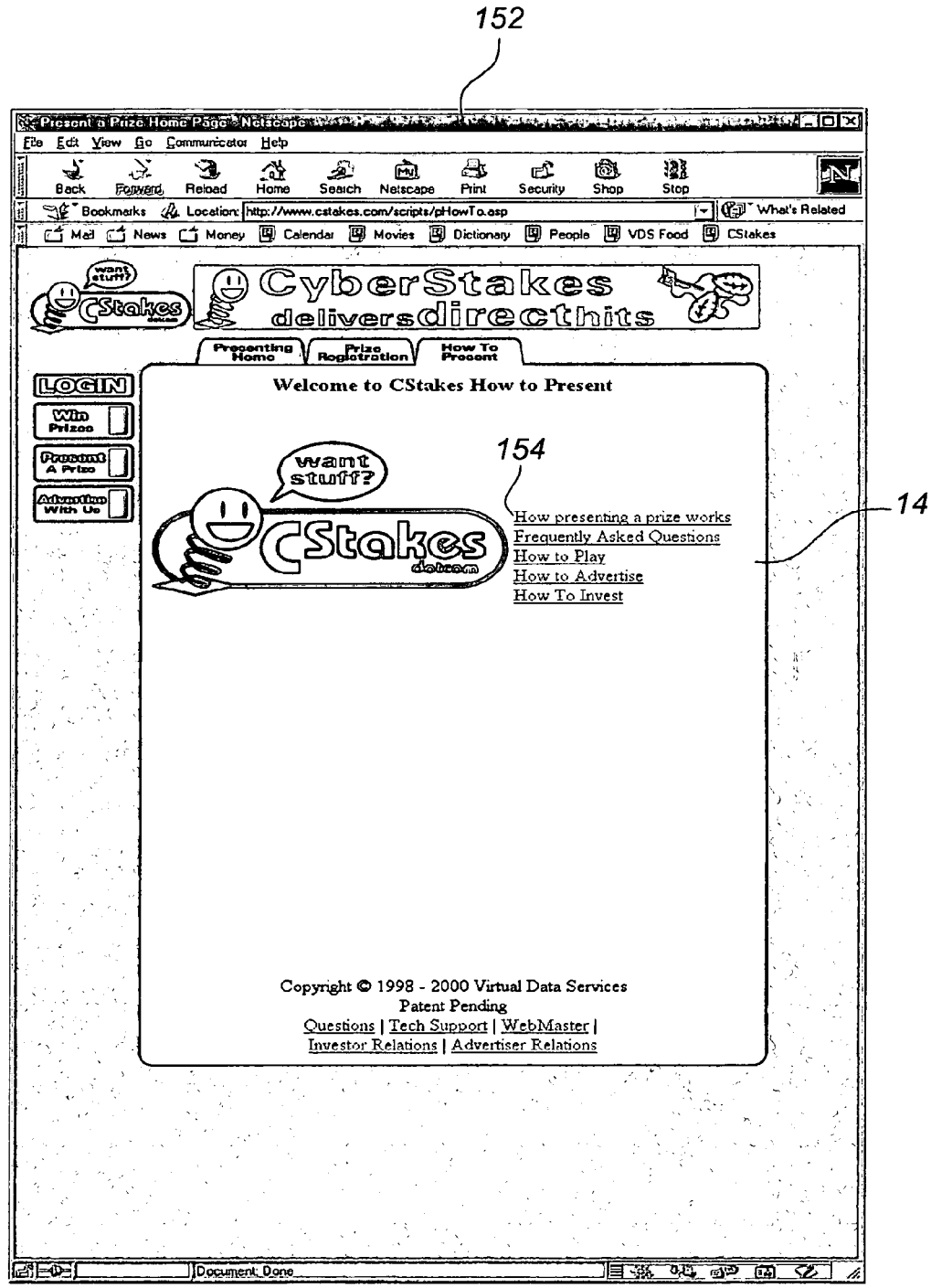
FIG. 20 depicts the HOW TO PRESENT SCREEN in the preferred system.

Finally, to view instructions on how to present prizes, that is, instructions on how the preferred system works, the user would select the HOW TO PRESENT tab 102c at SELECTION 618. A new advertising banner would be retrieved as indicated by RETRIEVE BANNER 620, and the user would be re-directed to the HOW TO PRESENT screen 152, as depicted in FIG. 20 and which will be more fully described below.

Figure 41:
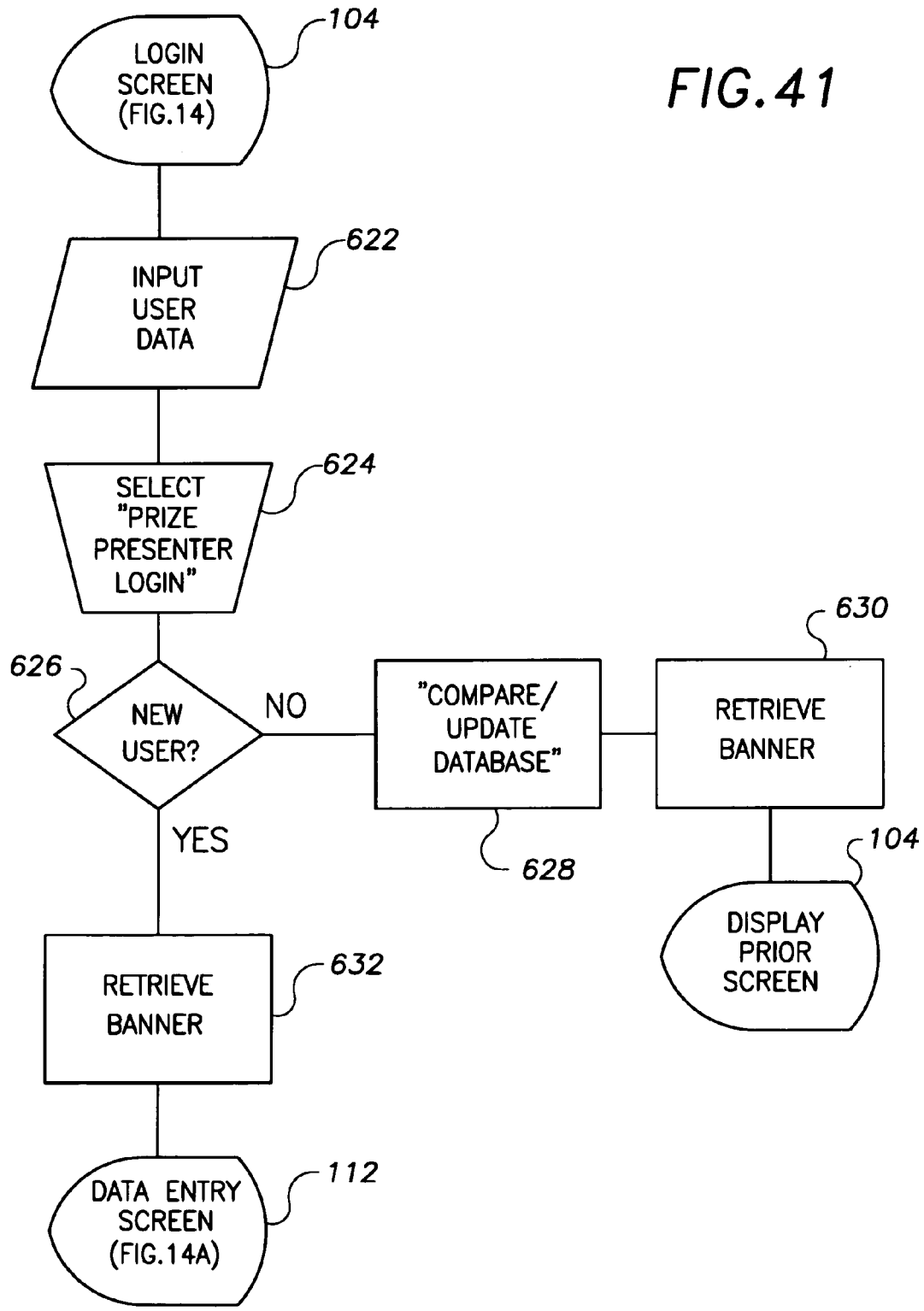

As mentioned above, FIG. 14 depicts the LOGIN SCREEN 104 for prize presenters. The buttons and tabs arrayed around the periphery of the central message window 14 are the same buttons 16 and tabs 102 that appear on the PRESENTING HOME SCREEN 100, as depicted in FIG. 13. In the central message window 14, there are multiple data entry fields 106. In this particular embodiment, there are two fields 106 in which a user can enter his USER ID 106a and PASSWORD 106b. There is also a NEW USER? box 108 which a user can select to indicate that he is a new user. FIG. 41 is a flow chart depicting operation of the system with respect to this LOGIN SCREEN 104. As indicated at INPUT 622, a user enters the various information into the data entry fields using a conventional computer keyboard or similar peripheral device. Once the requisite data is entered, the user can select the PRIZE PRESENTER LOGIN button 110 at SELECTION 624 of FIG. 41; this button 110 is located in the central message window 14 of the LOGIN SCREEN 104, as depicted in FIG. 14. Once the user selects the PRIZE PRESENTER LOGIN button 110, the system then makes a determination at DECISION 626 as to whether the user is a "new" user. If not, provided that the user ID and password entered in data entry fields 106a and 106b match records maintained in an integral USER DATABASE at COMPARE/UPDATE 628, a new advertising banner would be retrieved as indicated by RETRIEVE BANNER 630, and the user would be returned to the prior screen, i.e. the PRESENTING HOME SCREEN 110, as depicted in FIG. 13. Also, it is preferred that the USER DATABASE be updated with record of the user's visit at COMPARE/UPDATE 628.

Figure 14A:
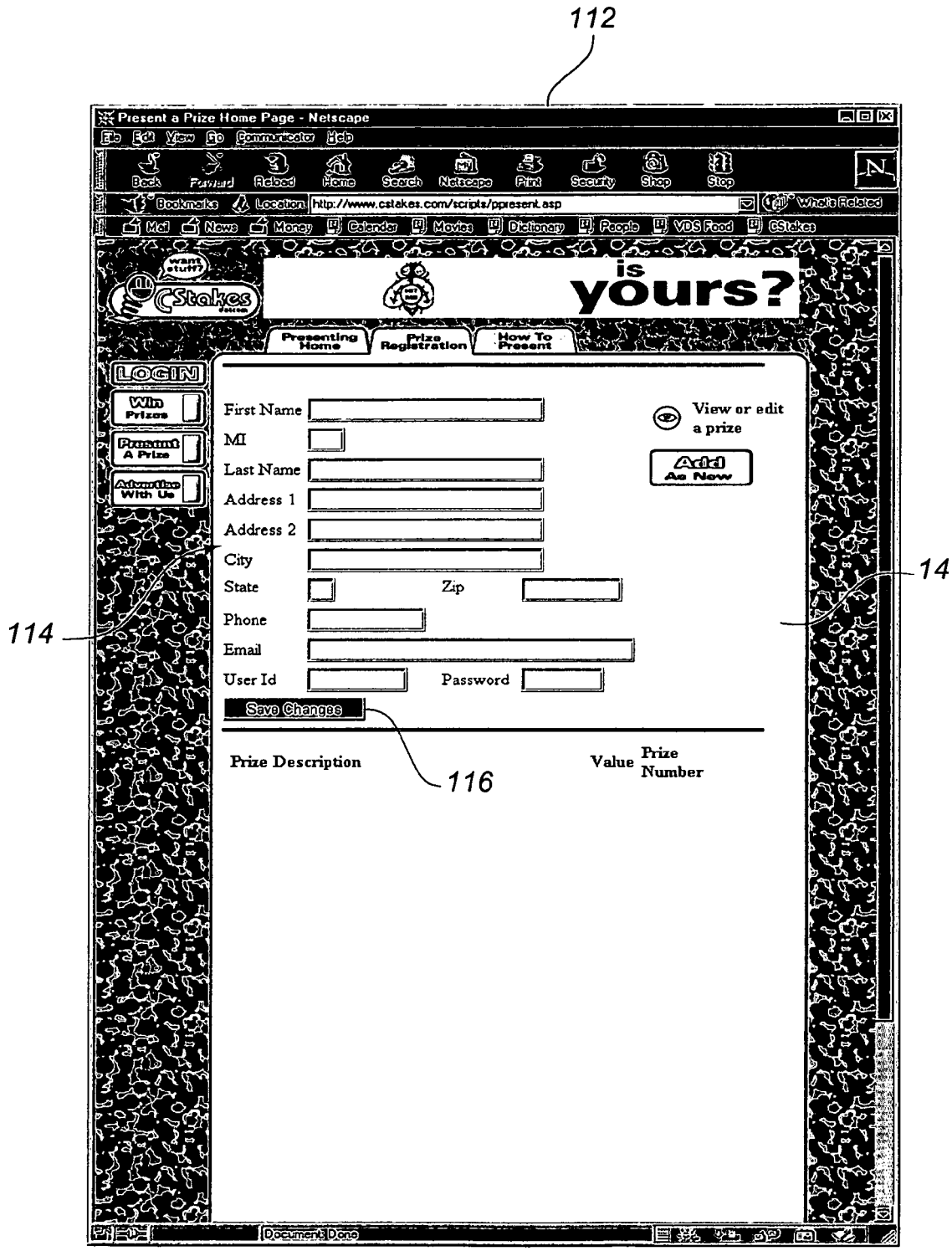
FIG. 14A depicts the DATA ENTRY SCREEN for prize presenters in the preferred system.

If the user is a "new" user, as determined at DECISION 626, a new advertising banner would be retrieved as indicated by RETRIEVE BANNER 632, and the user would be re-directed to the DATA ENTRY SCREEN 112, as depicted in FIG. 14A. In the central message window 14 of the DATA ENTRY SCREEN 112, there are multiple data entry fields, indicated generally by reference numeral 114, that allow the user to input the requisite information. In this particular embodiment, the following information is requested:

TABLE 2

First Name
M.I. (Middle Initial)
Last Name
Address 1
Address 2
City
State
Zip
Phone
Email
User ID
Password It is contemplated and preferred that this information be entered through a conventional computer keyboard or similar peripheral device. Although not depicted in flow chart form, once the user has entered all of the requisite data into the DATA ENTRY SCREEN 112, selection of the SAVE CHANGES button 116 causes this information to be stored in the integral USER DATABASE. The system then returns the user to the LOGIN SCREEN 104, as depicted in FIG. 14.

Figure 15:
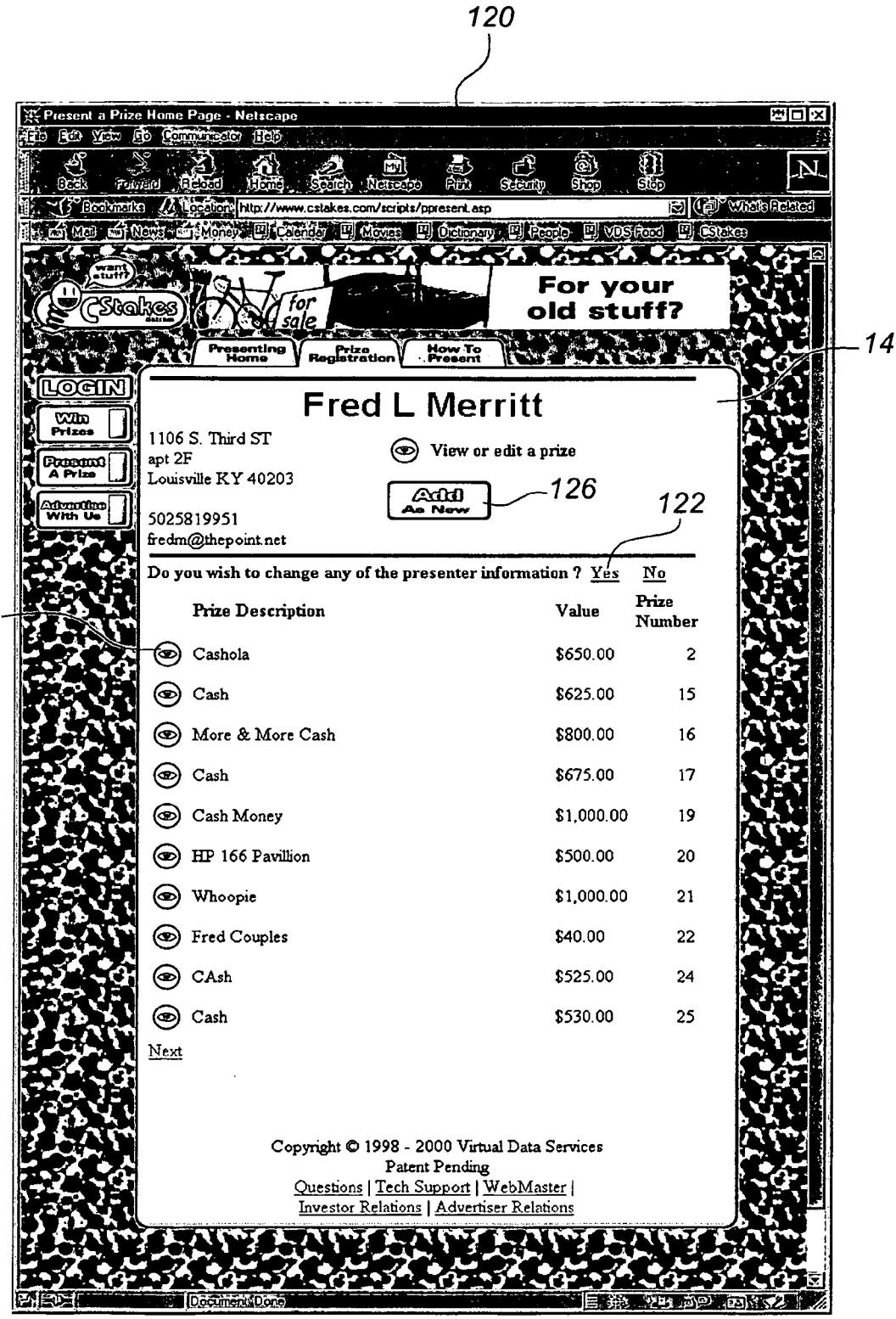
FIG. 15 depicts an example of a PRIZE REGISTRATION SCREEN in the preferred system.

As set forth above, the second tab is the PRIZE REGISTRATION tab 102b which is selected when a user wishes to register a prize for sale through the sweepstakes. Selection of this tab 102 initiates the subroutine depicted in FIG. 42. As shown in FIG. 42, the subroutine first retrieves a new advertising banner at RETRIEVE BANNER 632. The second step in the subroutine is the determination at DECISION 634 as to whether the user has logged into the system. If not, the user is re-directed to the LOGIN SCREEN 104, as depicted in FIG. 14. If the user has already logged into the system, the PRIZE REGISTRATION SCREEN 120 is displayed for the particular user, as depicted in FIG. 15. The PRIZE REGISTRATION SCREEN 120 displays in the central message window 14 the various identifying information that was entered when the user first registered with the system and which is maintained in the integral USER DATABASE, as described with reference to FIG. 14A. From the PRIZE REGISTRATION SCREEN 120, the user has the option of editing or revising any of this identifying information. Specifically, by selecting the YES hyperlink 122 in the central message window 14 at SELECTION 636 of FIG. 42, the "UPDATE_USER" subroutine is executed at EXECUTE 638 of FIG. 42. This subroutine will be described further below with reference to FIG. 46.

The PRIZE REGISTRATION SCREEN 120 also displays in the central message window 14 a listing of those prizes the user has previously registered to be given away through a sweepstakes, records of which are maintained and retrieved from the integral PRIZE DATABASE. If the user would like to review or edit the information associated with one of these prizes, he would select the VIEW icon 124 associated with the prize at SELECTION 640 of FIG. 42, which would trigger execution of the "PRIZE_EDIT" subroutine at EXECUTE 642 of FIG. 42. This subroutine will be described further below with reference to FIG. 43. Also, the user has the option of adding a new prize to be "sold" through a sweepstakes. Specifically, by selecting the ADD AS NEW icon 126 at SELECTION 644 of FIG. 42, the user triggers execution of the "ADD_PRIZE" subroutine at EXECUTE 646 of FIG. 42. This subroutine will be described further below with reference to FIG. 44.

Figure 43:
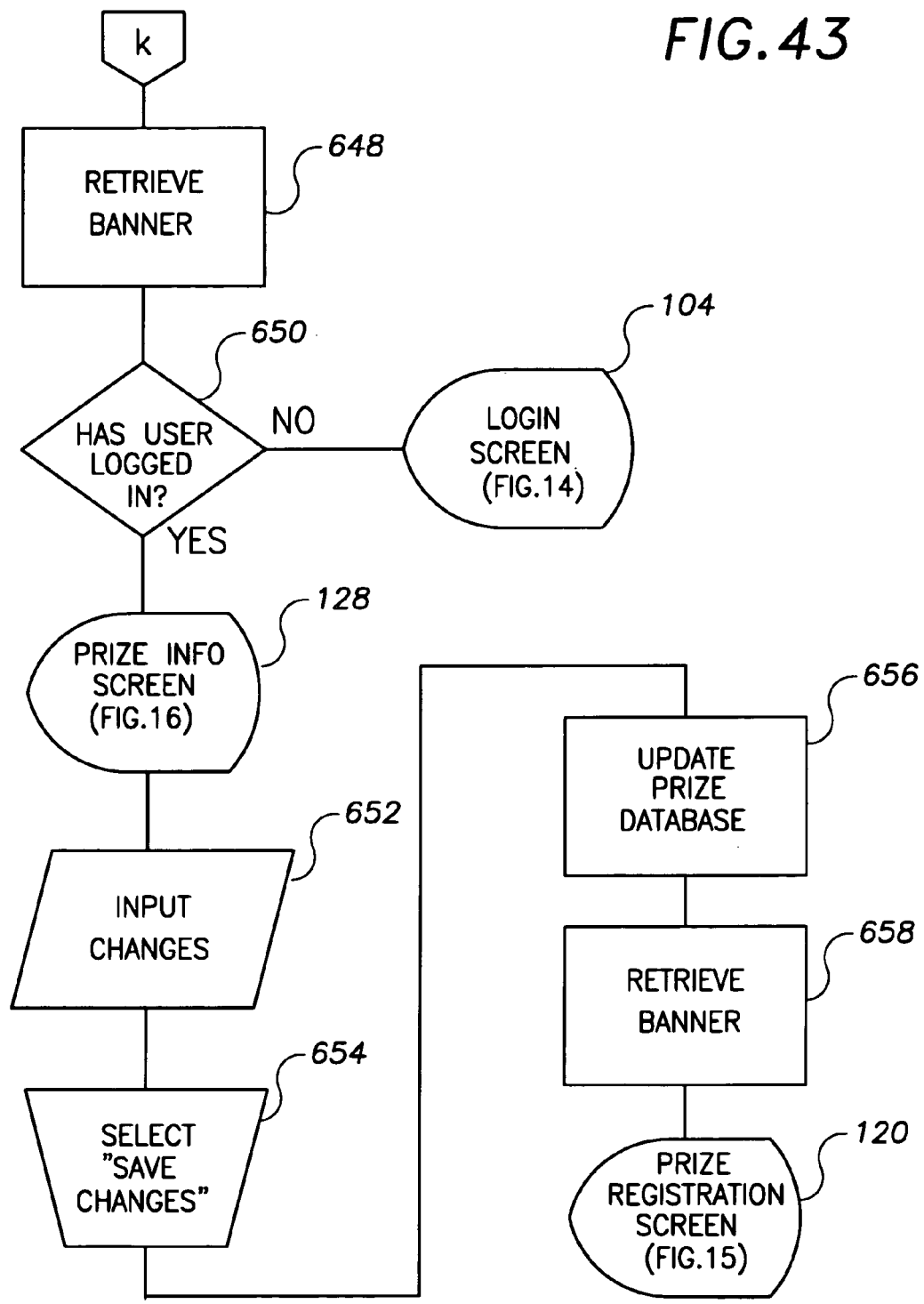

FIG. 43 depicts the operation and function of the "PRIZE_EDIT" subroutine described above. Specifically, the subroutine first retrieves a new advertising banner at RETRIEVE BANNER 648. The second step in the subroutine is the determination at DECISION 650 as to whether the user has logged into the system. If not, the user is re-directed to the LOGIN SCREEN 104, as depicted in FIG. 14. If the user has already logged into the system, the PRIZE INFO SCREEN 128 is displayed for the particular prize, as depicted in FIG. 16.

Figure 16:
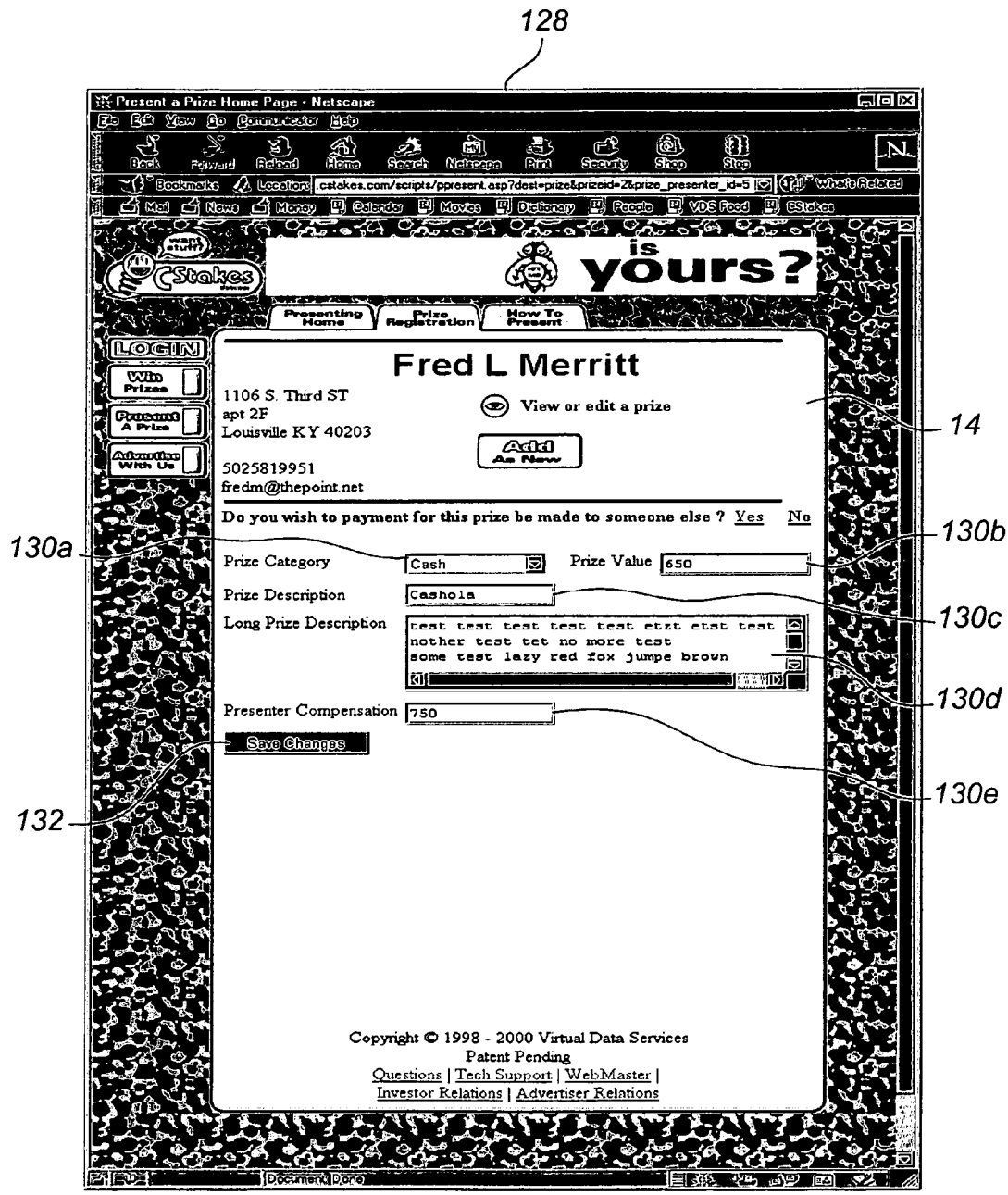
FIG. 16 depicts an example of a PRIZE INFO SCREEN in the preferred system.

As shown in FIG. 16, and as with the PRIZE REGISTRATION SCREEN 120, the PRIZE INFO SCREEN 128 displays in the central message window 14 the various identifying information that was entered when the user first registered with the system. Additionally, the PRIZE INFO SCREEN 128 displays in the central message window 14 specific information about the prize selected, retrieving such information from the integral PRIZE DATABASE. In this case, there are data fields 130 for Prize Category 130a, Prize Value 130b, Prize Description 130c, Long Prize Description 130d, and Sale Price 130e. The user can change one or more of the entries in these data fields using a conventional computer keyboard, a mouse, or a similar peripheral device at INPUT 652 of FIG. 43. Once such changes have been made, selection of the SAVE CHANGES button 132 at SELECTION 654 of FIG. 43 causes the revised information to be stored in the integral PRIZES DATABASE at UPDATE 656 of FIG. 43. A new advertising banner is retrieved at RETRIEVE BANNER 658. The system then returns the user to the PRIZE REGISTRATION SCREEN 120, as depicted in FIG. 15.

There is one additional option available to the user available on the PRIZE INFO SCREEN 128 depicted in FIG. 16, an option to provide payment for the prize to a third party. This option will be fully described with reference to the "ADD_PRIZE" subroutine of FIG. 44 and the associated ADD PRIZE SCREEN 134 depicted in FIG. 17.

Figure 44:
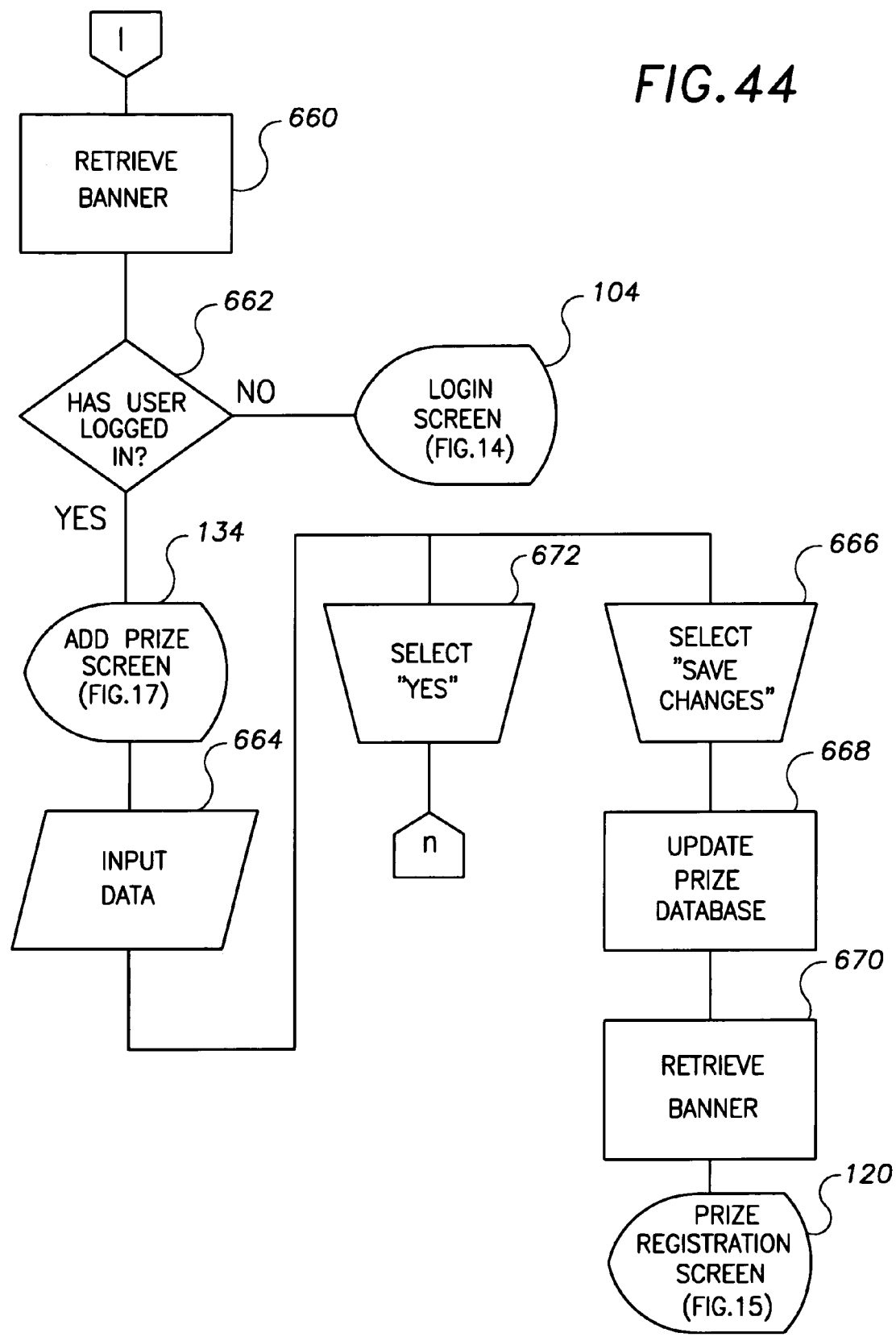

FIG. 44 depicts the operation and function of the "ADD_PRIZE" subroutine described above. Specifically, the subroutine first retrieves a new advertising banner at RETRIEVE BANNER 660. The second step in the subroutine is the determination at DECISION 662 as to whether the user has logged into the system. If not, the user is re-directed to the LOGIN SCREEN 104, as depicted in FIG. 14. If the user has already logged into the system, the ADD PRIZE SCREEN 134 is displayed, as depicted in FIG. 17.

Figure 17:
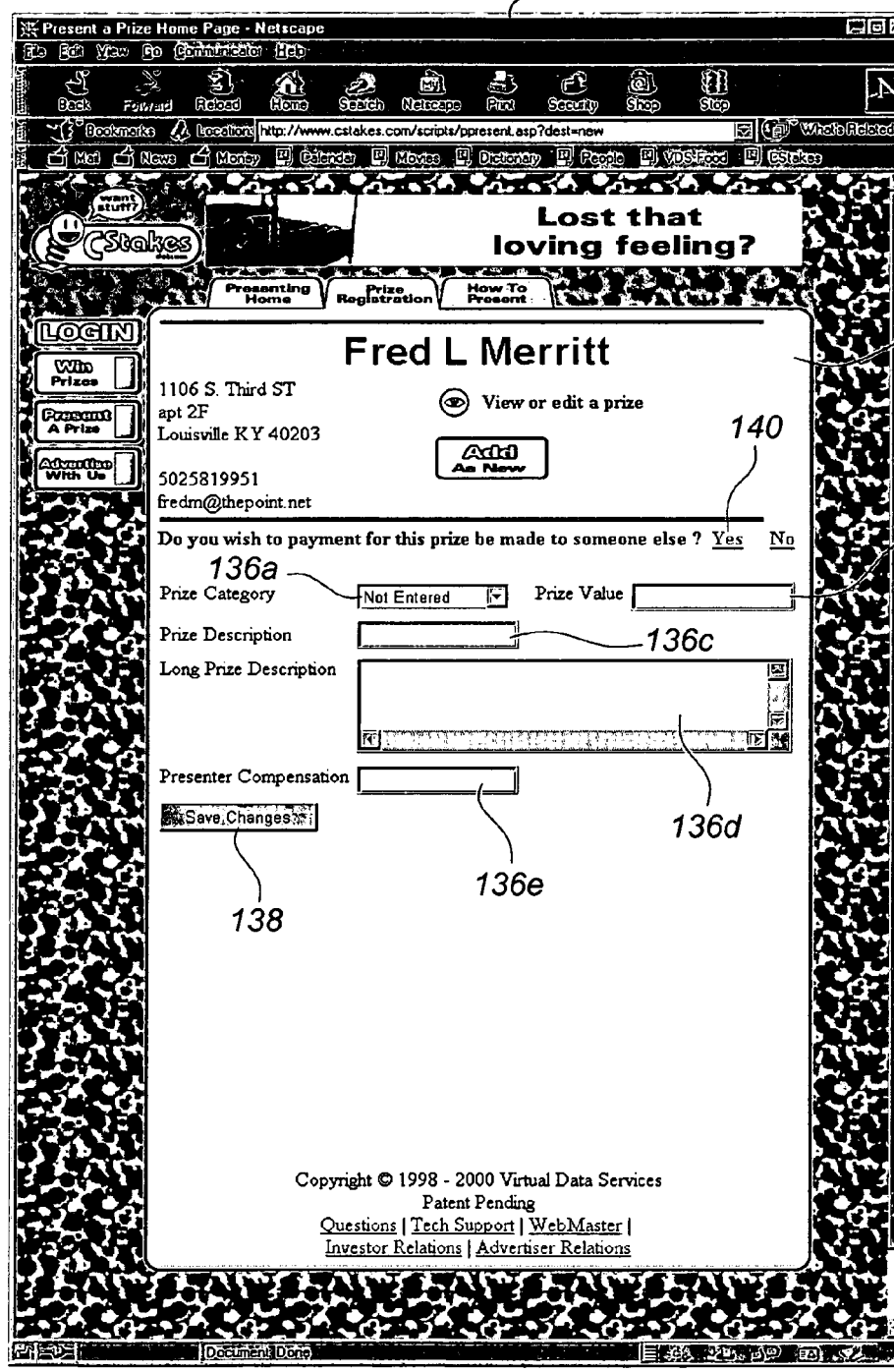
FIG. 17 depicts an example of a ADD PRIZE SCREEN in the preferred system.

As shown in FIG. 17, the ADD PRIZE SCREEN 134 is almost identical to the PRIZE INFO SCREEN 128 depicted in FIG. 16. More specifically, the ADD PRIZE SCREEN 134 also displays in the central message window 14 the various identifying information that was entered when the user first registered with the system. Additionally, the ADD PRIZE SCREEN 134 displays in the central message window 14 empty data fields 136 in which information about the prize to be offered may be entered, including: Prize Category 136a, Prize Value 136b, Prize Description 136c, Long Prize Description 130d, and Sale Price 130e. Of course, the descriptions have no effect other than to communicate to players information about the prizes to be given away; however, the price entered into the Sale Price data field 130e is extremely important as it determines the number of hits required before the prize is given away. Once the appropriate information has been entered at INPUT 664 of FIG. 44, selection of the SAVE CHANGES button 138 at SELECTION 666 of FIG. 44 causes the new information to be stored in the integral PRIZES DATABASE at UPDATE 668 of FIG. 44. A new advertising banner is retrieved at RETRIEVE BANNER 670, and then the system returns the user to the PRIZE REGISTRATION SCREEN 120, as depicted in FIG. 15.

There is one additional option available to the user available on the ADD PRIZE SCREEN 134 depicted in FIG. 17, an option to provide payment for the prize to a third party, such as a charitable organization. Specifically, by selecting the YES hyperlink 140 in the central message window 14 at SELECTION 672 of FIG. 44, a subroutine is initiated, as depicted in FIG. 45.

Figure 18:
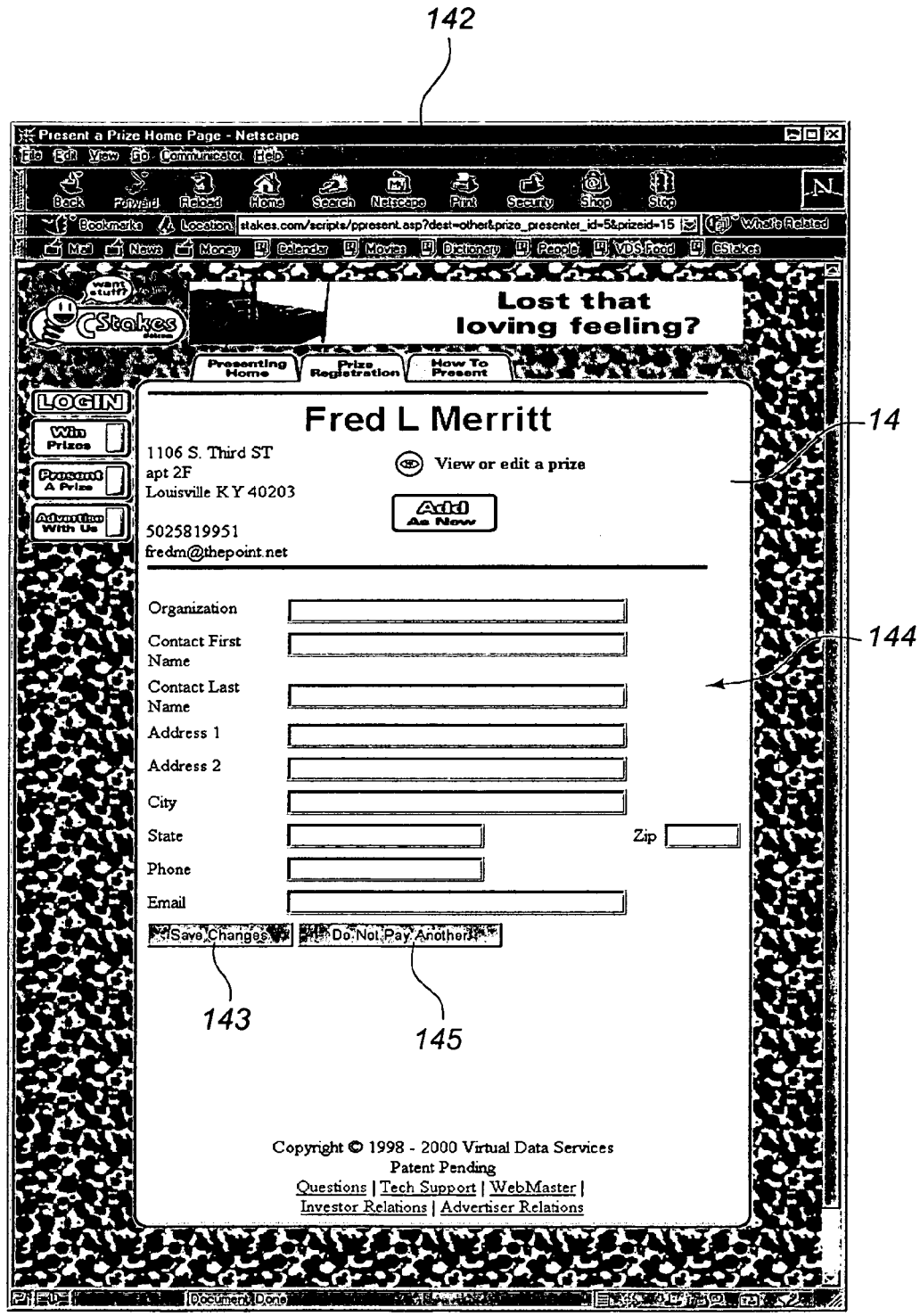
FIG. 18 depicts an example of a DATA ENTRY SCREEN in the preferred system.
Figure 45:
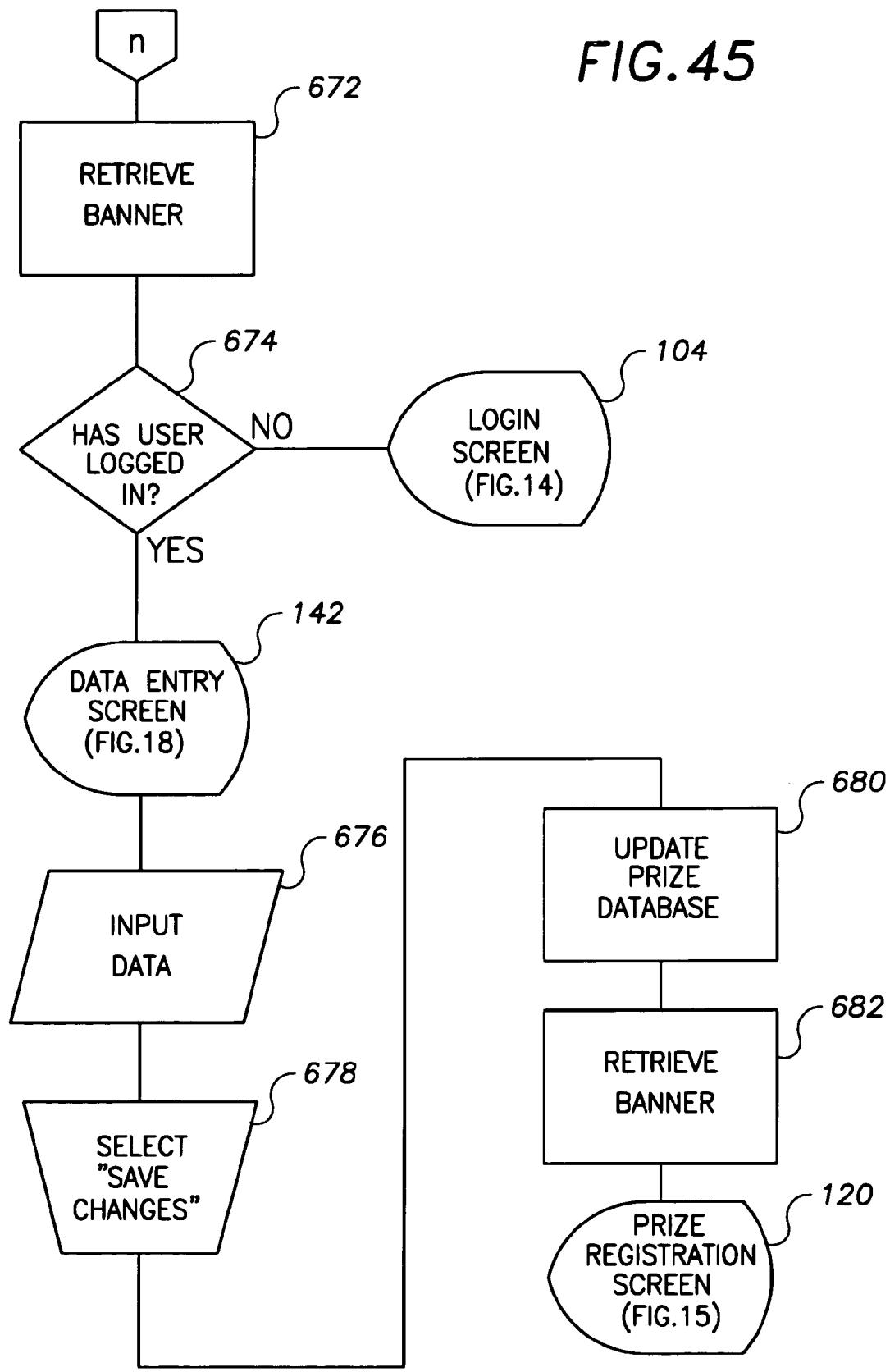

Referring now to FIG. 45, the subroutine first retrieves a new advertising banner at RETRIEVE BANNER 672. The second step in the subroutine is the determination at DECISION 674 as to whether the user has logged into the system. If not, the user is re-directed to the LOGIN SCREEN 104, as depicted in FIG. 14. If the user has already logged into the system, the DATA ENTRY SCREEN 142 is displayed, as depicted in FIG. 18. In the central message window 14 of the DATA ENTRY SCREEN 142, there are multiple data entry fields, indicated generally by reference numeral 144, that allow the user to input the requisite identifying information. In this particular embodiment, the following information is requested:

TABLE 3

Organization
Contact First Name
Contact Last Name
Address 1
Address 2
City
State
Zip
Phone
Email It is contemplated and preferred that this information be entered through a conventional computer keyboard or similar peripheral device. Once the user has entered all of the requisite data into the DATA ENTRY SCREEN 142 at INPUT 676 of FIG. 44, selection of the SAVE CHANGES button 143 at SELECTION 678 of FIG. 44 causes this information to be stored in the integral PRIZE DATABASE at UPDATE 680 along with the information about the prize with which the third party is associated. A new advertising banner is retrieved at RETRIEVE BANNER 682, and then the system returns the user to the PRIZE REGISTRATION SCREEN 120, as depicted in FIG. 15. Although not indicated in the flow chart of FIG. 44, selection of the DO NOT PAY ANOTHER button 145 returns the user to the ADD PRIZE SCREEN of FIG. 17.

Figure 46:
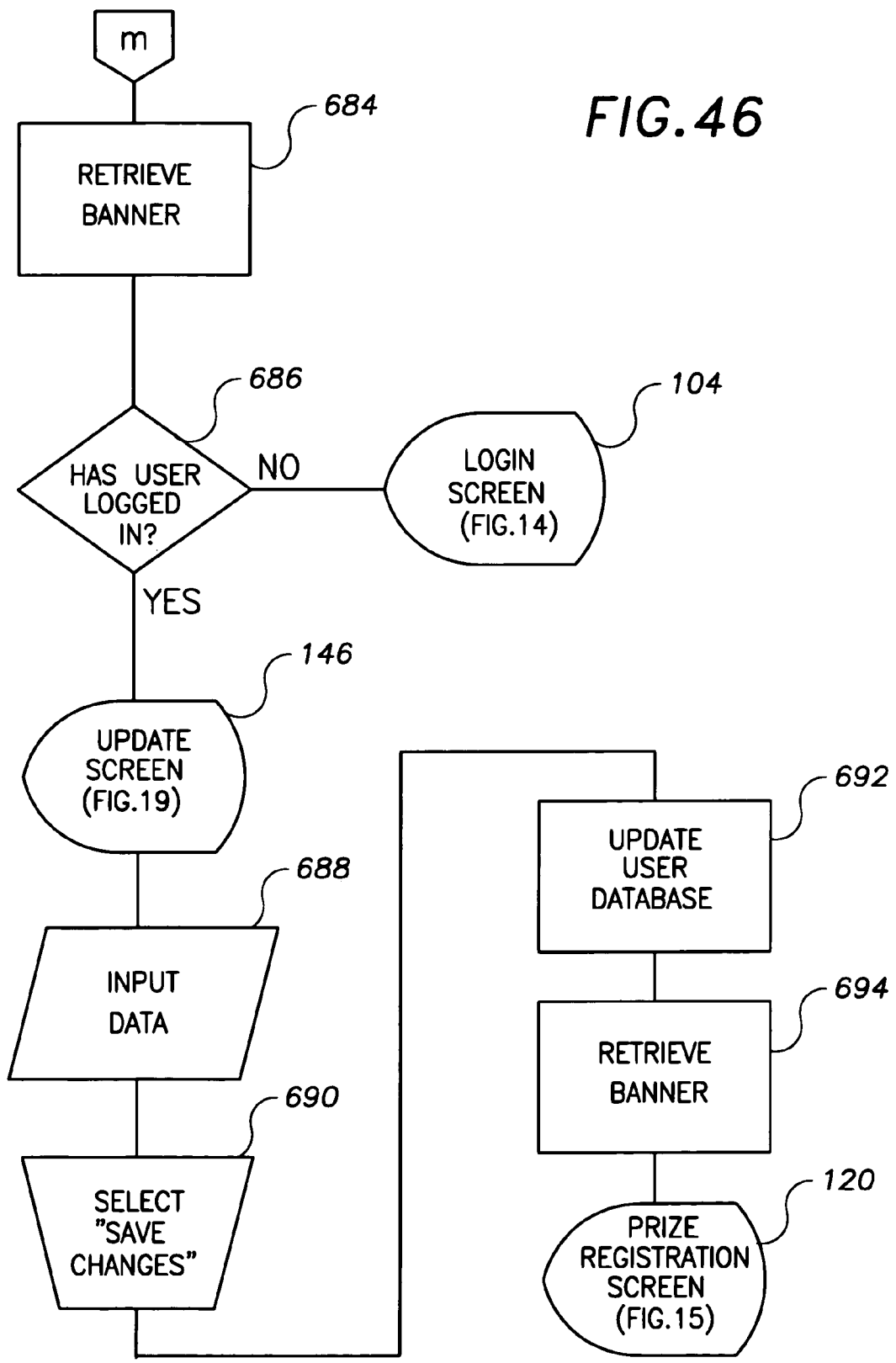

FIG. 46 depicts the operation and function of the "UPDATE_USER" subroutine described above. Specifically, the subroutine first retrieves a new advertising banner at RETRIEVE BANNER 684. The second step in the subroutine is the determination at DECISION 686 as to whether the user has logged into the system. If not, the user is re-directed to the LOGIN SCREEN 104, as depicted in FIG. 14. If the user has already logged into the system, the UPDATE SCREEN 146 is displayed for the particular user, as depicted in FIG. 19.

Figure 19:
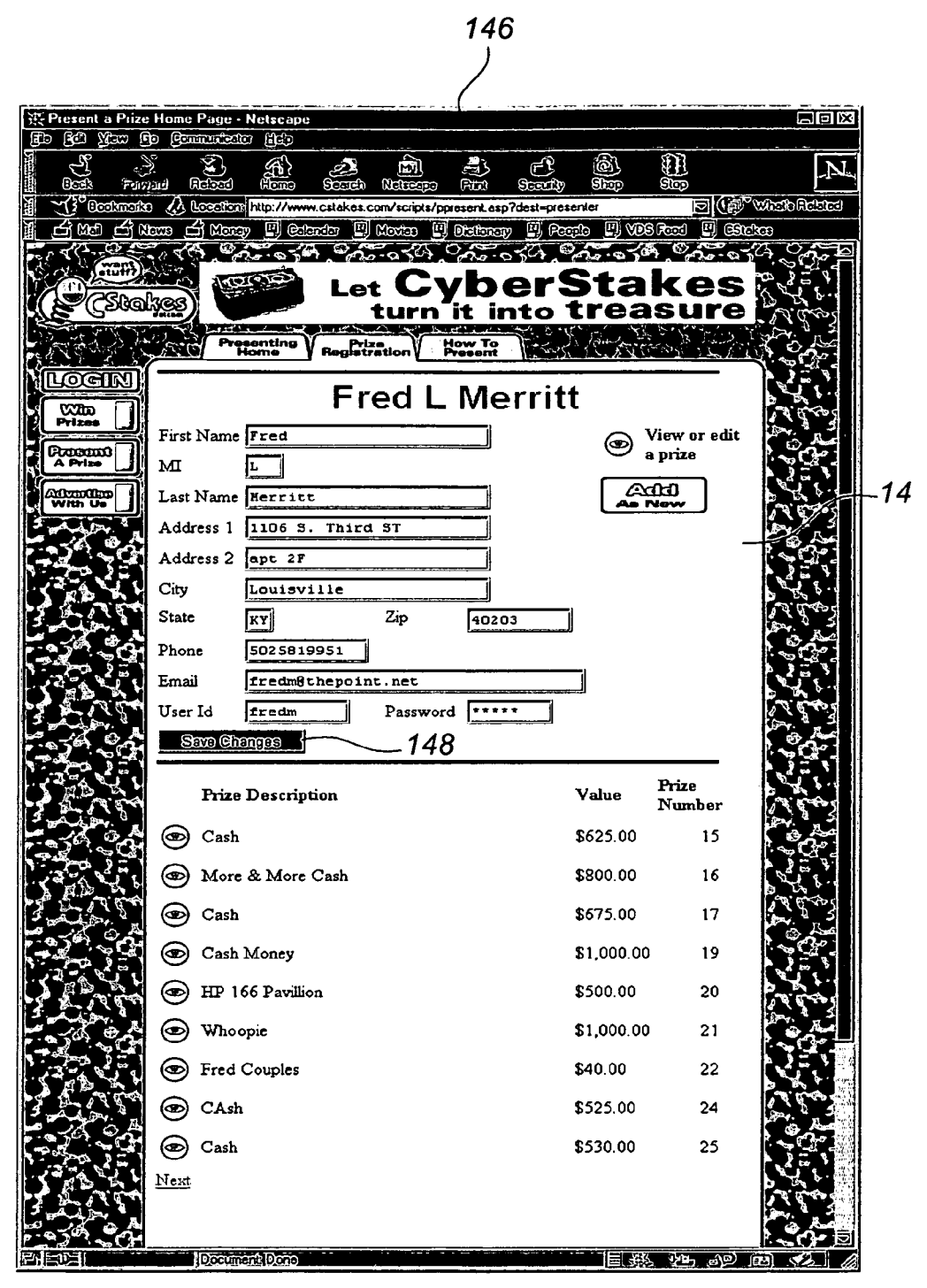

The UPDATE SCREEN 146 depicted in FIG. 19 is substantially identical as the LOGIN SCREEN 104 of FIG. 14A, except that the information currently stored in the USER DATABASE is displayed in the appropriate data fields. Of course, the user can modify any or all of this information at INPUT 688 of FIG. 46, selecting the SAVE CHANGES button 148 at SELECTION 690 of FIG. 46 to update the information stored in the integral USER DATABASE at UPDATE 692. A new advertising banner is then retrieved at RETRIEVE BANNER 694 of FIG. 46, and then the system returns the user to the PRIZE REGISTRATION SCREEN 120, as depicted in FIG. 15.

It is also important to note that the UPDATE SCREEN 146 also displays in the central message window 14 a listing of those prizes the user has previously registered to be given away through a sweepstakes, records of which are maintained and retrieved from the integral PRIZE DATABASE. As with the PRIZE INFORMATION SCREEN 120 depicted in FIG. 15, if the user would like to review or edit the information associated with one of these prizes, he could select the VIEW icon 124 associated with the prize would trigger execution of the "PRIZE_EDIT" subroutine as described with reference to FIG. 43.

Figure 20A:
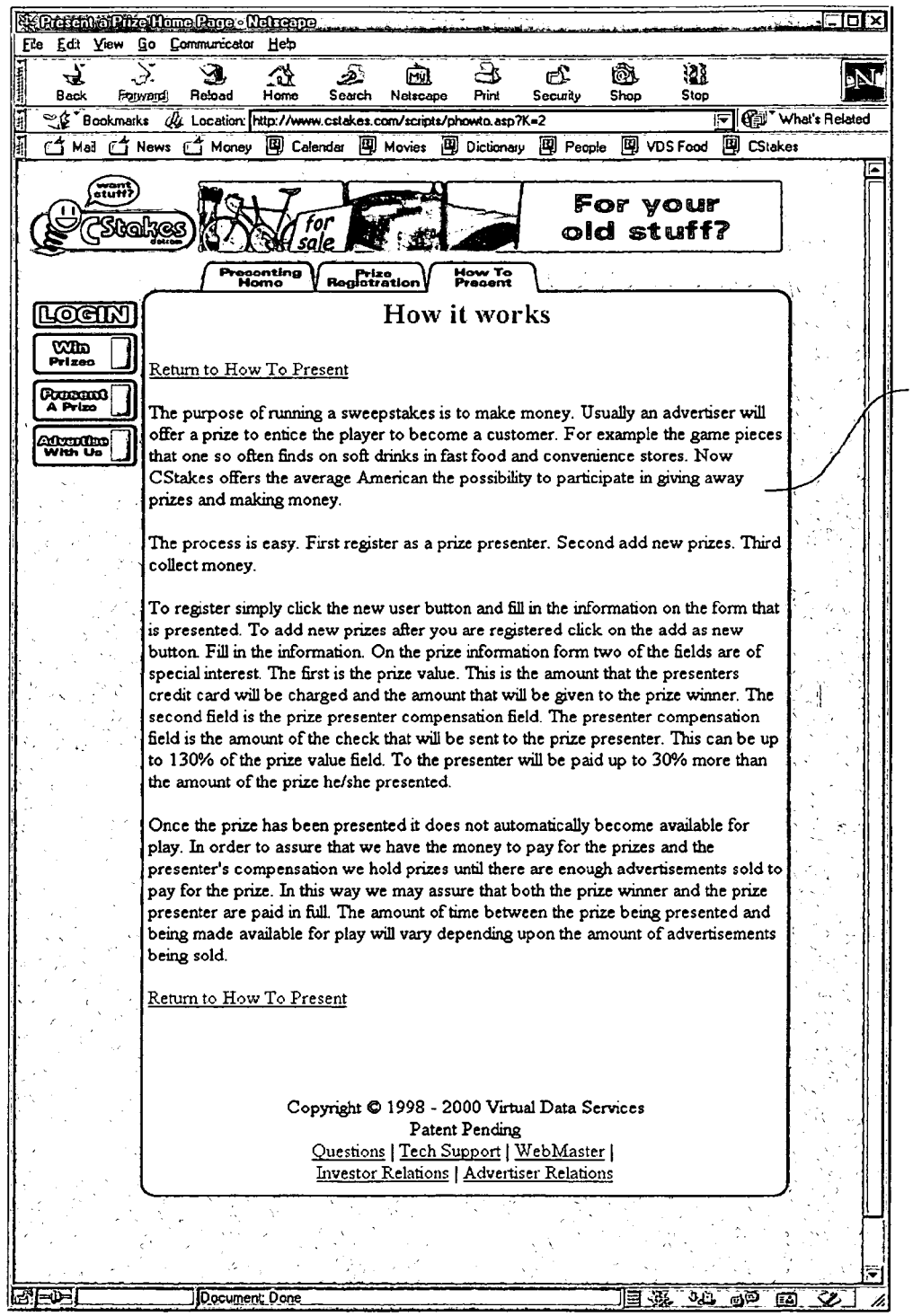
FIG. 20A depicts a screen displaying a detailed written description of the preferred system with respect to a prize presenter.

Finally, in relation to "prize presenter" options, as discussed above, by selecting the HOW TO PRESENT tab 102c, the user can view instructions on how to present prizes, that is, instructions on how the preferred system works. FIG. 20 depicts a preferred HOW TO PRESENT SCREEN 152. Various hyperlinks are displayed in the central message window 14 of the HOW TO PRESENT SCREEN 152, including, for example, a "How Presenting a Prize Works" 154 hyperlink. Selection of the "How Presenting a Prize Works" 154 hyperlink directs the user to further information about the preferred system, specifically to the screen depicted in FIG. 20A. As shown in FIG. 20A, the central message window 14 of this screen includes a detailed written description of the system works.

FIG. 21 depicts the ADVERTISING HOME SCREEN 170 of the preferred system. As described above, the ADVERTISING HOME SCREEN 170 is accessed through the selection of the ADVERTISE WITH US button 16c, as described with reference to FIG. 1 and the associated flow chart of FIG. 28.

As with all screens of the preferred system, the ADVERTISING HOME SCREEN 170 includes a banner advertisement location 12 that appears at the top of the screen 170 and a central message window 14. In this particular embodiment shown in FIG. 21, various text messages, images, and/or hyperlinks can be displayed in this window 14 conveying information to the user about the system. Similar to the "player" and "prize presenter" screens described above, along the periphery of this window 14 are a series of buttons 16 and a series of tabs 172. The four buttons arrayed along the central message window 14 are identical to those described above with reference to the "player" and "prize presenter" screens: a LOGIN button 16a, a WIN PRIZES button 16b, a PRESENT A PRIZE button 16c, and an ADVERTISE WITH US button 16d. Indeed, as noted above, these four buttons do appear on each and every screen of the preferred system.

In this preferred system, there are also four tabs arrayed along the top of the central message window 14: an ADVERTISING HOME tab 172a, a PROFILES tab 172b, an INVOICES tab 172c, and a HOW TO ADVERTISE tab 172d. These tabs are different than those described above with reference to the "player" and the "prize presenter" screens but, although these tabs 172 are not particularly pointed out with reference to all of the screens described below, these three tabs do appear on each and every "advertiser" screen of the preferred system.

FIG. 47 is a flow chart depicting navigation through and operation of the system, beginning from the ADVERTISING HOME SCREEN 170. For a user to continue through the system, one of the buttons 16 or tabs 172 must be clicked or otherwise selected by the user.

Figure 22:
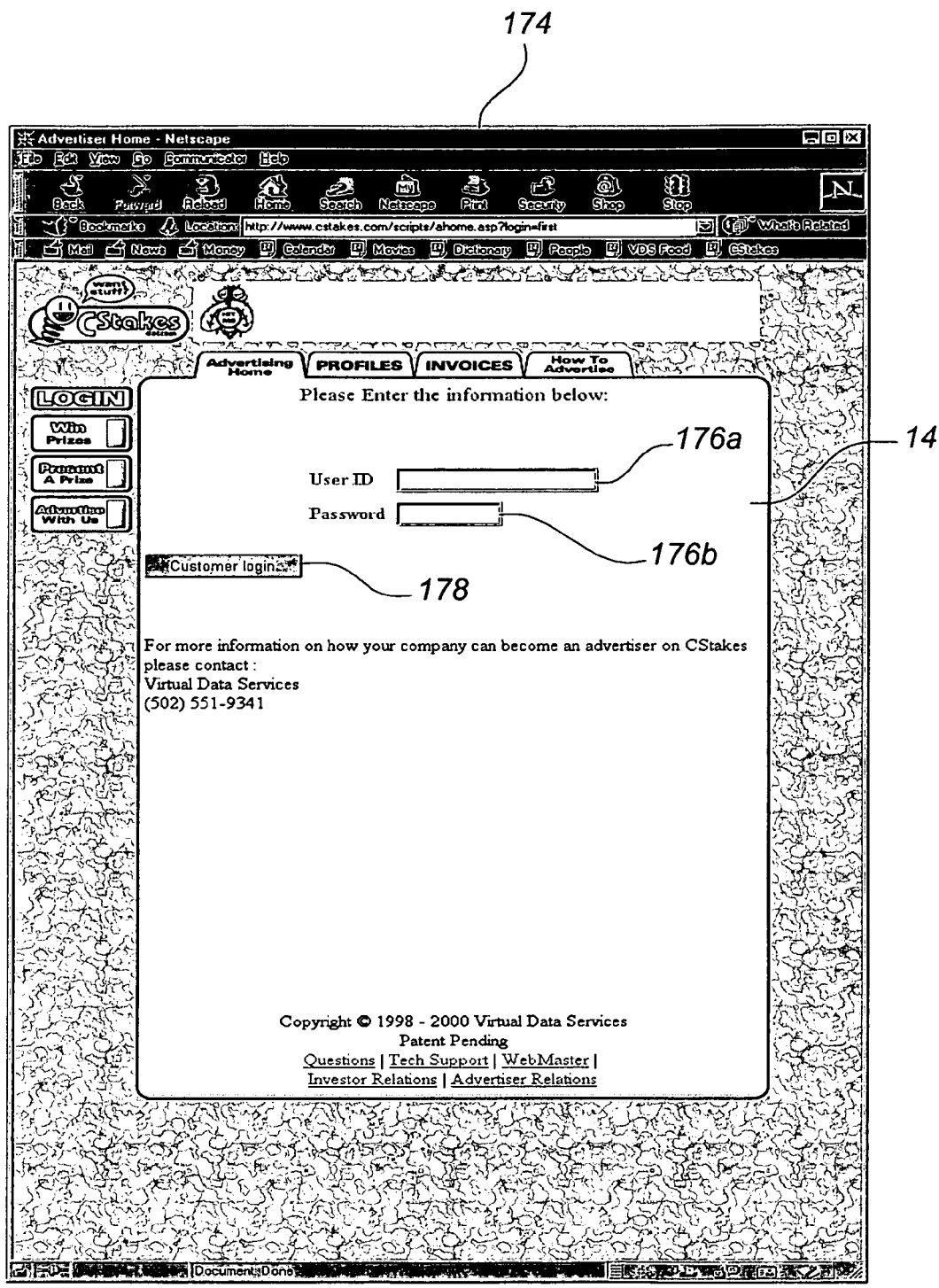
FIG. 22 depicts the LOGIN SCREEN for advertisers in the preferred system.

If a user is a registered user of the system or wishes to become one, he would select the LOGIN button 16a, as indicated at SELECTION 700 in FIG. 47. A new advertising banner would be retrieved as indicated by RETRIEVE BANNER 702, and the user would be re-directed to the LOGIN SCREEN 174, as depicted in FIG. 22 and which will be more fully described below.

If the user would like to view available prizes or enter one or more of the sweepstakes, he would select the WIN PRIZES button 16b at SELECTION 704. Again, a new advertising banner would be retrieved as indicated by RETRIEVE BANNER 706, and the user would be re-directed to the PRIZES SCREEN 50, as depicted in FIG. 3.

If the user is a prize presenter, he would select the PRESENT A PRIZE button 16c at SELECTION 708. Again, a new advertising banner would be retrieved as indicated by RETRIEVE BANNER 710, and the user would be re-directed to the PRESENTING HOME SCREEN 100, as depicted in FIG. 13.

Finally, in relation to the buttons 16, if the user is an advertiser, he would select the ADVERTISE WITH US button 16d at SELECTION 712. Again, a new advertising banner would be retrieved as indicated by RETRIEVE BANNER 714. However, since the user is already at the ADVERTISING HOME SCREEN 170, he would simply be returned to the same page. Therefore, it is contemplated the ADVERTISE WITH US button 16d not be available as a selection on the ADVERTISING HOME SCREEN 170.

As mentioned above, the tabs 172 included on the ADVERTISING HOME SCREEN 170 are "advertiser" tabs in that they are designed for advertisers that will be registering with the system and to whom players will be re-directed.

Referring still to FIG. 47 and the tabs 172 shown in FIG. 21, if a user wishes to view target profiles that have been previously registered with the system, he would select the PROFILES tab 172b at SELECTION 716, which would initiate the subroutine depicted in FIG. 49 as will be more fully described below.

If a user wishes to view invoices associated with the number of re-directions to the advertiser's web site, he would select the INVOICES tab 172c at SELECTION 718, which would initiate the subroutine depicted in FIG. 53 as will be more fully described below.

Figure 27:
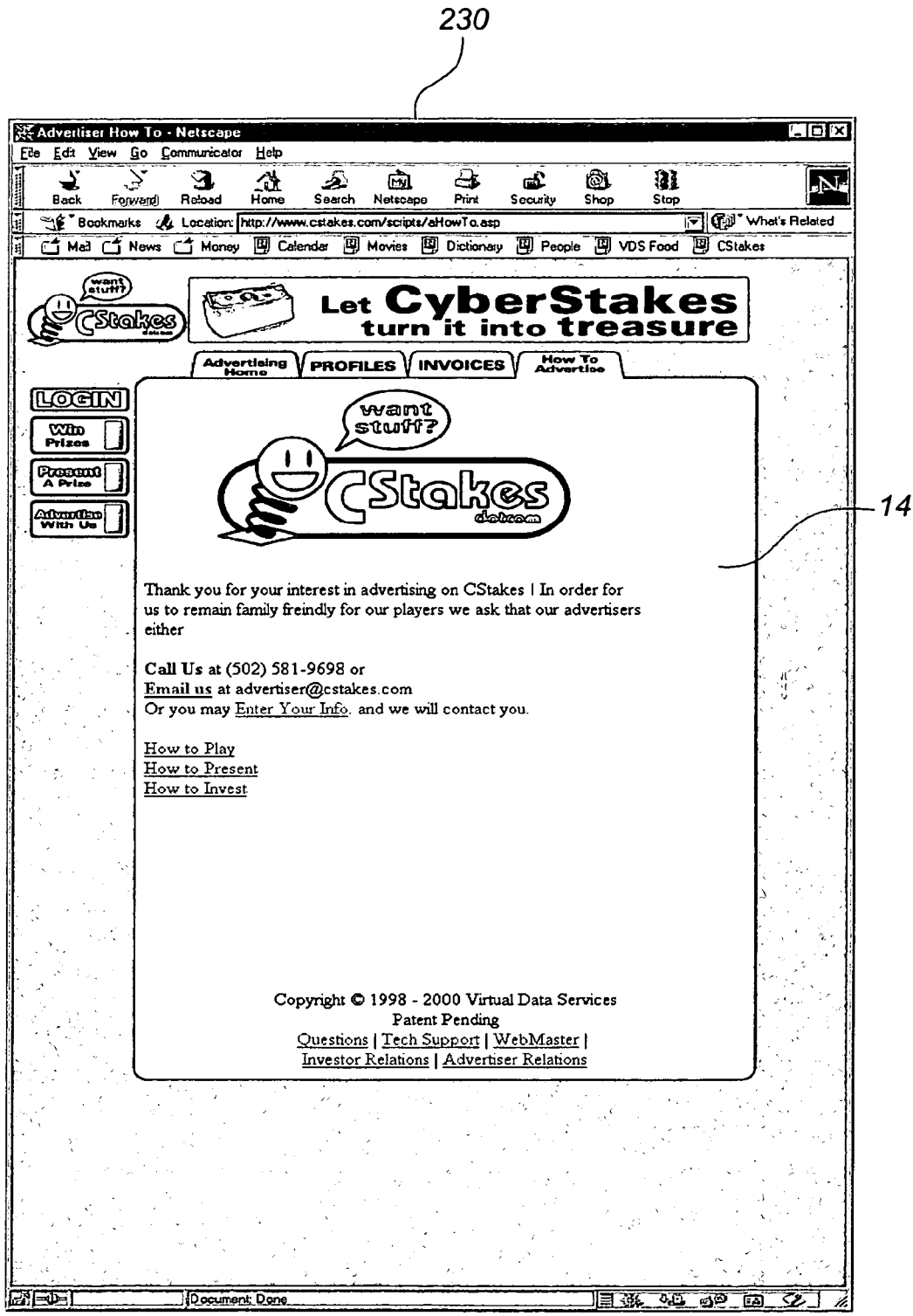
FIG. 27 depicts the HOW TO ADVERTISE SCREEN in the preferred system.

Finally, to view instructions on how to advertise, that is, instructions on how the preferred system works, the user would select the HOW TO ADVERTISE tab 172d at SELECTION 720. A new advertising banner would be retrieved as indicated by RETRIEVE BANNER 722, and the user would be re-directed to the HOW TO ADVERTISE screen 230, as depicted in FIG. 27 and which will be more fully described below.

Figure 48:
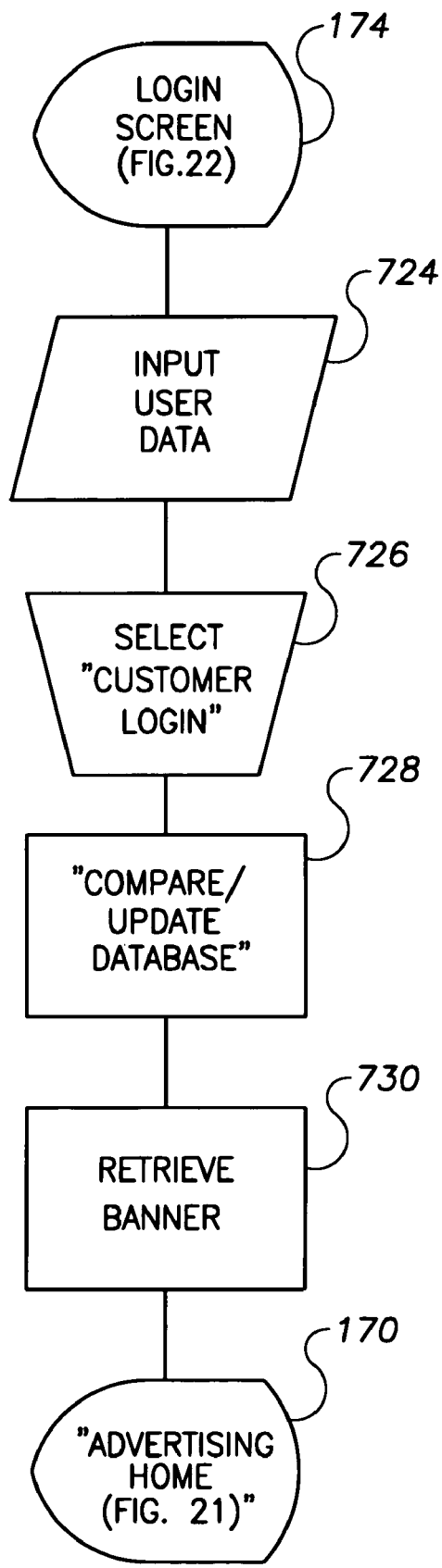

As mentioned above, FIG. 22 depicts the LOGIN SCREEN 174 for advertisers. The buttons and tabs arrayed around the periphery of the central message window 14 are the same buttons 16 and tabs 172 that appear on the ADVERTISING HOME SCREEN 170, as depicted in FIG. 20. In the central message window 14, there are multiple data entry fields 176. In this particular embodiment, there are two fields 176 in which a user can enter his USER ID 176a and PASSWORD 176b. FIG. 48 is a flow chart depicting operation of the system with respect to this LOGIN SCREEN 174. As indicated at INPUT 724, a user enters the various information into the data entry fields using a conventional computer keyboard or similar peripheral device. Once the requisite data is entered, the user can select the CUSTOMER LOGIN button 178 at SELECTION 726 of FIG. 41; this button 178 is located in the central message window 14 of the LOGIN SCREEN 174, as depicted in FIG. 22. Provided that the user ID and password entered in data entry fields 176a and 176b match records maintained in the integral USER DATABASE 728 at COMPARE/UPDATE 728, a new advertising banner would be retrieved as indicated by RETRIEVE BANNER 730, and the user would be returned to the prior screen, i.e. the ADVERTISING HOME SCREEN 110, as depicted in FIG. 21. Also, it is preferred that the USER DATABASE be updated with record of the user's visit at COMPARE/UPDATE 728.

It is important to note that although the preferred system described herein contains no means through a new advertiser can register on-line; however, such means could be provided without departing from the spirit and scope of the present invention.

Figure 23:
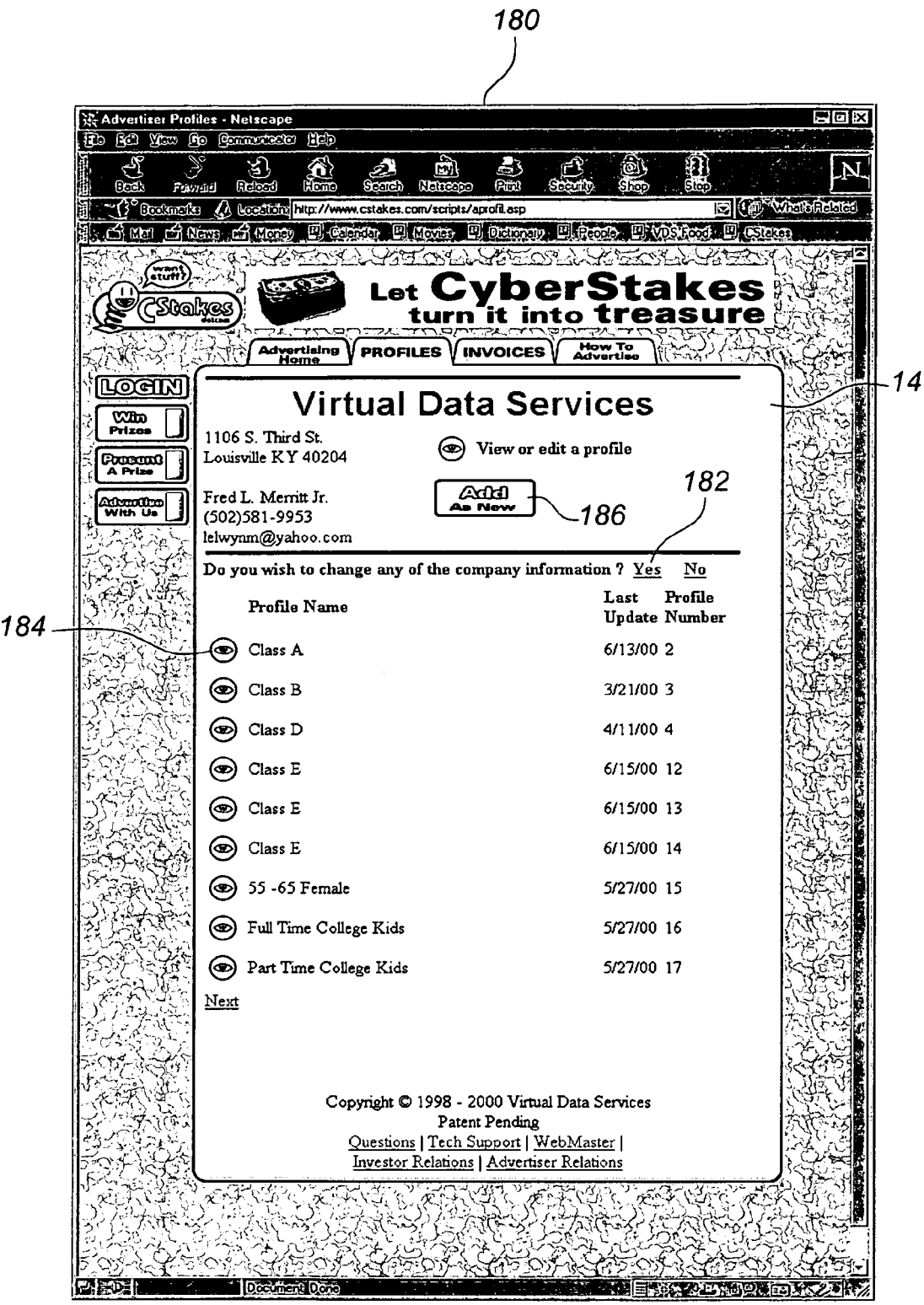
FIG. 23 depicts an example of a PROFILES SCREEN in the preferred system.
Figure 49:
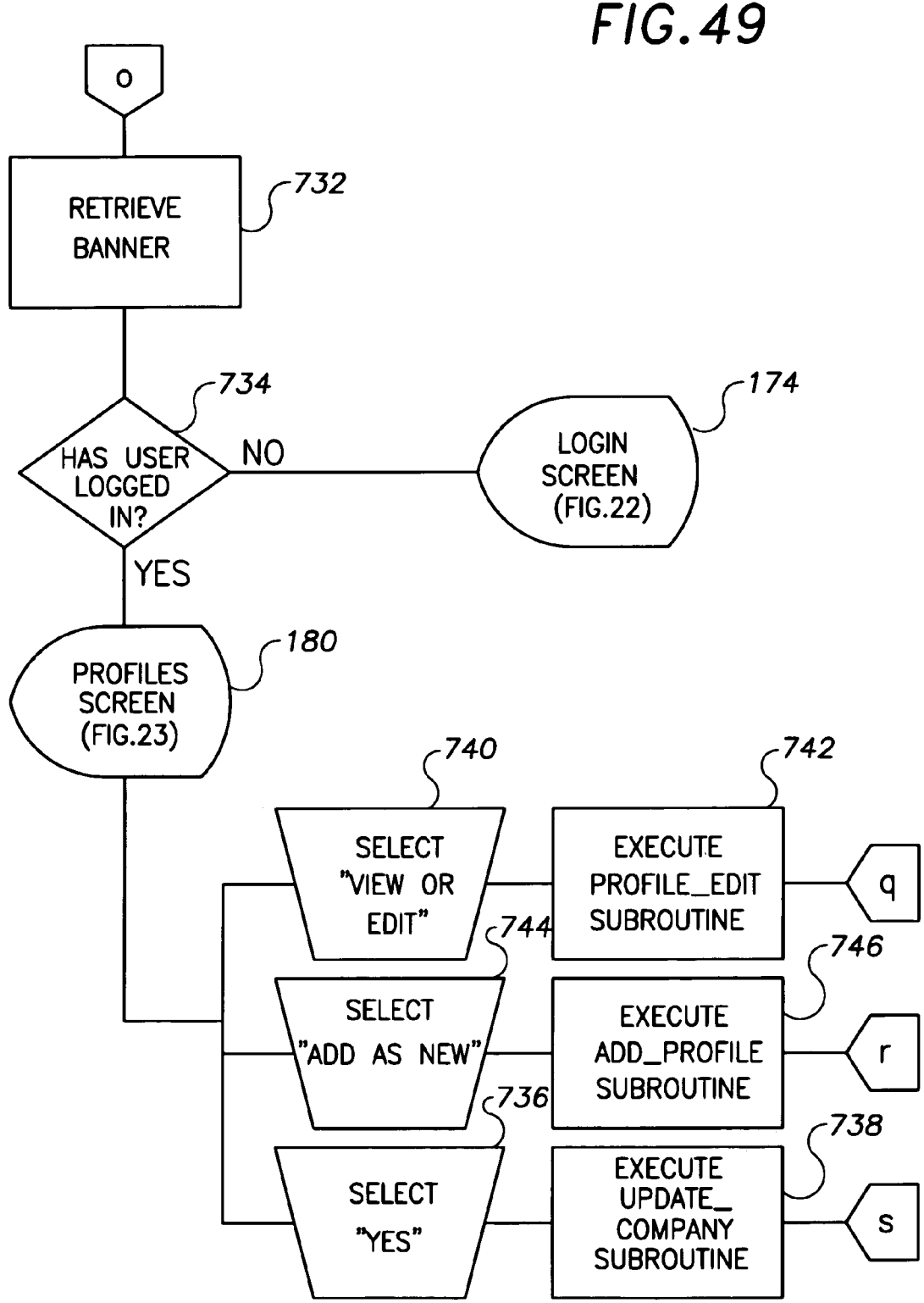

FIG. 49 depicts the operation and function of the subroutine initiated by selection of the PROFILES tab 172b, as discussed with reference to FIG. 21 and the associated flow chart of FIG. 47. The subroutine first retrieves a new advertising banner at RETRIEVE BANNER 732. The second step in the subroutine is the determination at DECISION 734 as to whether the user has logged into the system. If not, the user is re-directed to the LOGIN SCREEN 174, as depicted in FIG. 22. If the user has already logged into the system, the PROFILES SCREEN 180 is displayed for the particular user, as depicted in FIG. 23. The PROFILES SCREEN 180 displays in the central message window 14 the various identifying information about the advertiser. From the PROFILES SCREEN 180, the user has the option of editing or revising any of this identifying information. Specifically, by selecting the YES hyperlink 182 in the central message window 14 at SELECTION 736 of FIG. 49, the "UPDATE_COMPANY" subroutine is executed at EXECUTE 738 of FIG. 49. This subroutine will be described further below with reference to FIG. 52.

The PROFILES SCREEN 180 also displays in the central message window 14 a listing of those target profiles that have been established by the advertiser, along with the date of the last update of each of these profiles, records of the profiles being maintained and retrieved from the integral PROFILE DATABASE. If the user would like to review or edit the information associated with one of these prizes, he would select the VIEW icon 184 associated with the profile at SELECTION 740 of FIG. 49, which would trigger execution of the "PROFILE_EDIT" subroutine at EXECUTE 742 of FIG. 49. This subroutine will be described further below with reference to FIG. 50. Also, the user has the option of adding a new target profile. Specifically, by selecting the ADD AS NEW icon 186 at SELECTION 744 of FIG. 49, the user triggers execution of the "ADD_PROFILE" subroutine at EXECUTE 746 of FIG. 49. This subroutine will be described further below with reference to FIG. 51.

Figure 53:
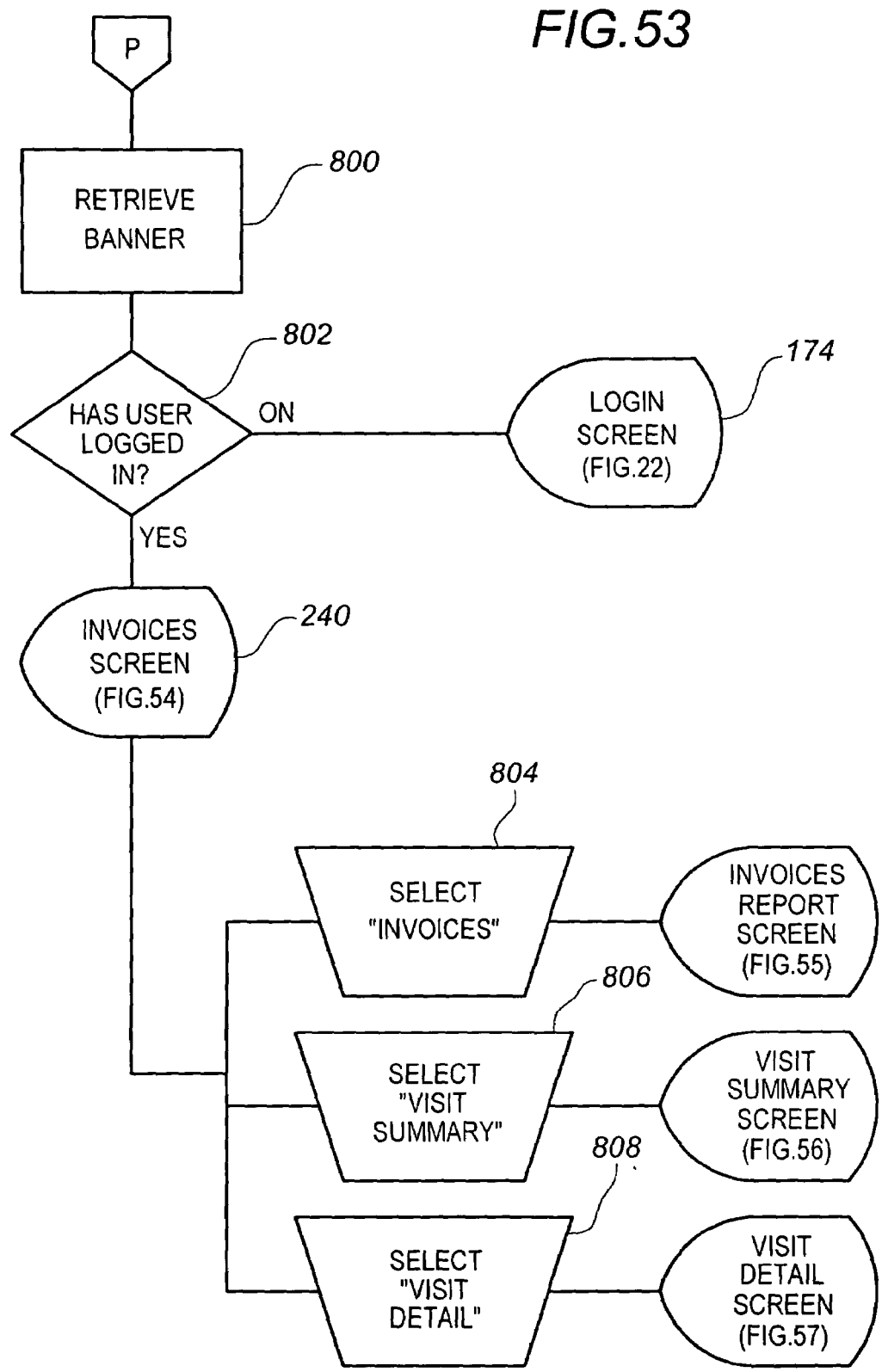

FIG. 53 depicts the operation and function of the subroutine initiated by selection of the INVOICES tab 172c, as discussed with reference to FIG. 21 and the associated flow chart of FIG. 47. The subroutine first retrieves a new advertising banner at RETRIEVE BANNER 800. The second step in the subroutine is the determination at DECISION 802 as to whether the user has logged into the system. If not, the user is re-directed to the LOGIN SCREEN 174, as depicted in FIG. 22. If the user has already logged into the system, the INVOICES SCREEN 240 is displayed for the particular user, as depicted in FIG. 54.

Figure 54:
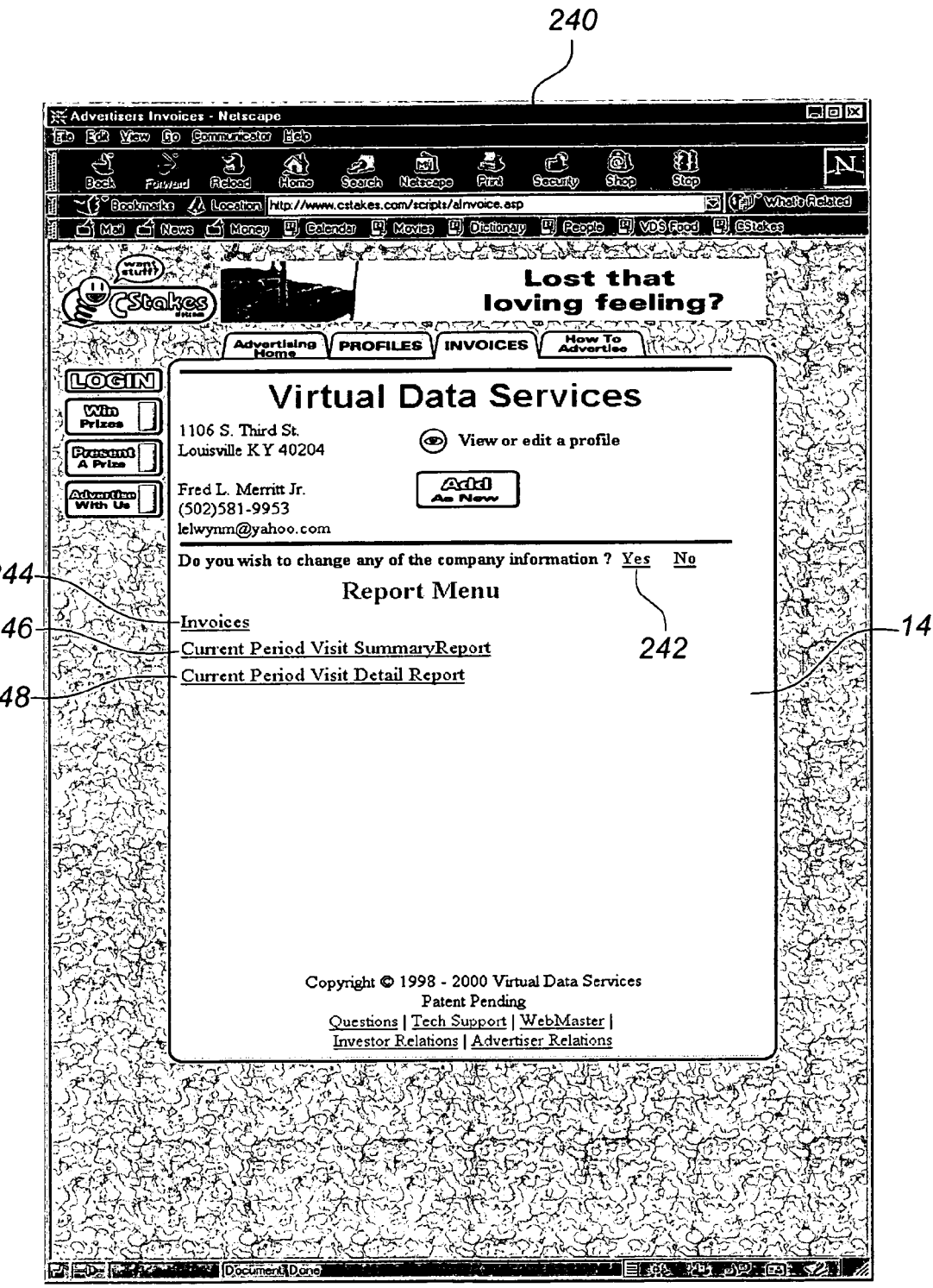
FIG. 54 depicts an example of an INVOICES SCREEN in the preferred system.

Referring now to FIG. 54, the INVOICES SCREEN 240 displays in the central message window 14 the various identifying information about the advertiser. Although not indicated in the associated flow chart of FIG. 53, as with the PROFILES SCREEN, from the INVOICES SCREEN 240, the user has the option of editing or revising any of this identifying information by selecting the YES hyperlink 242 in the central message window 14. This causes the execution of the "UPDATE_COMPANY" subroutine as is described above with reference to FIG. 52.

Figure 55:
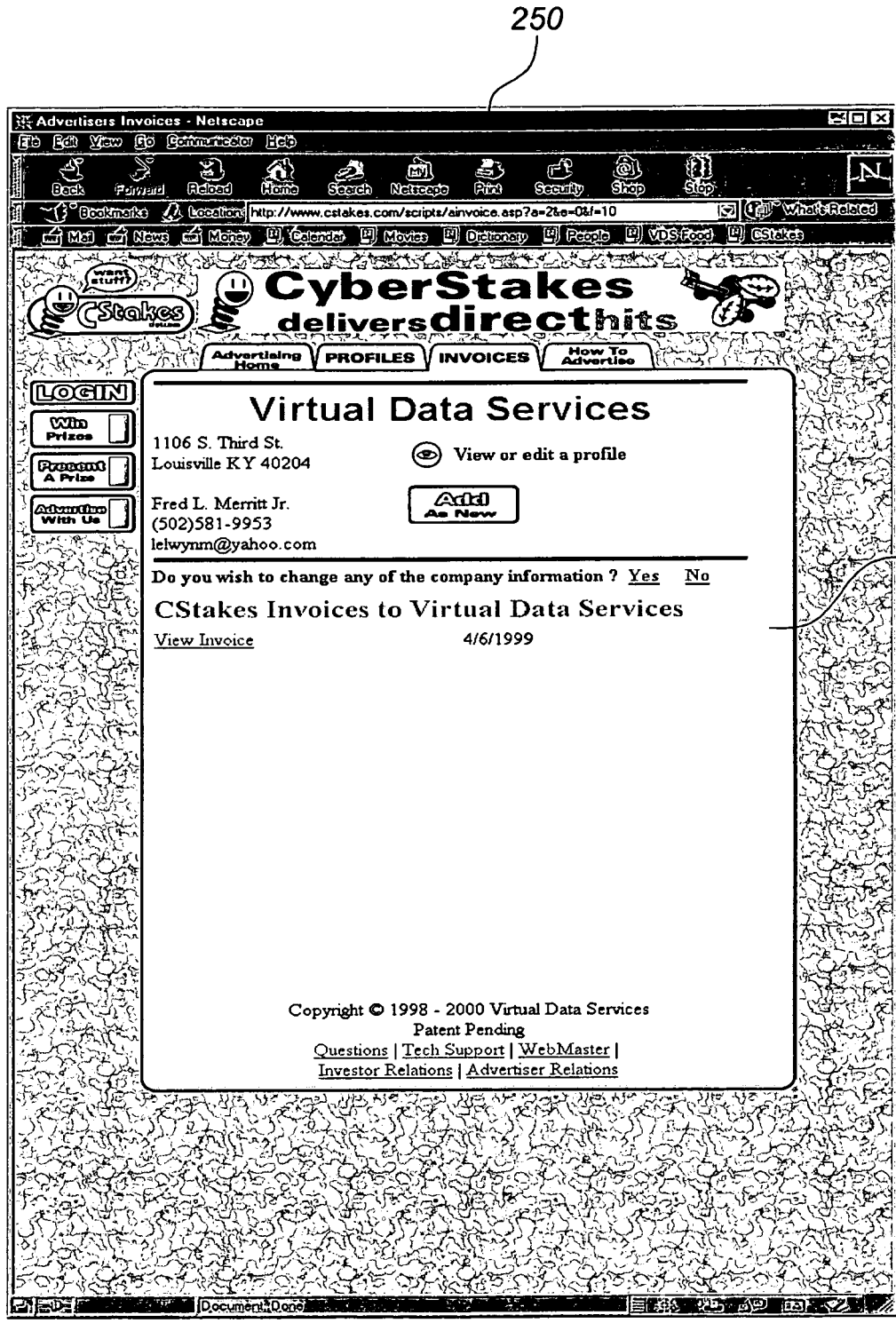
FIG. 55 depicts an example of an INVOICES REPORT SCREEN in the preferred system.
Figure 56:
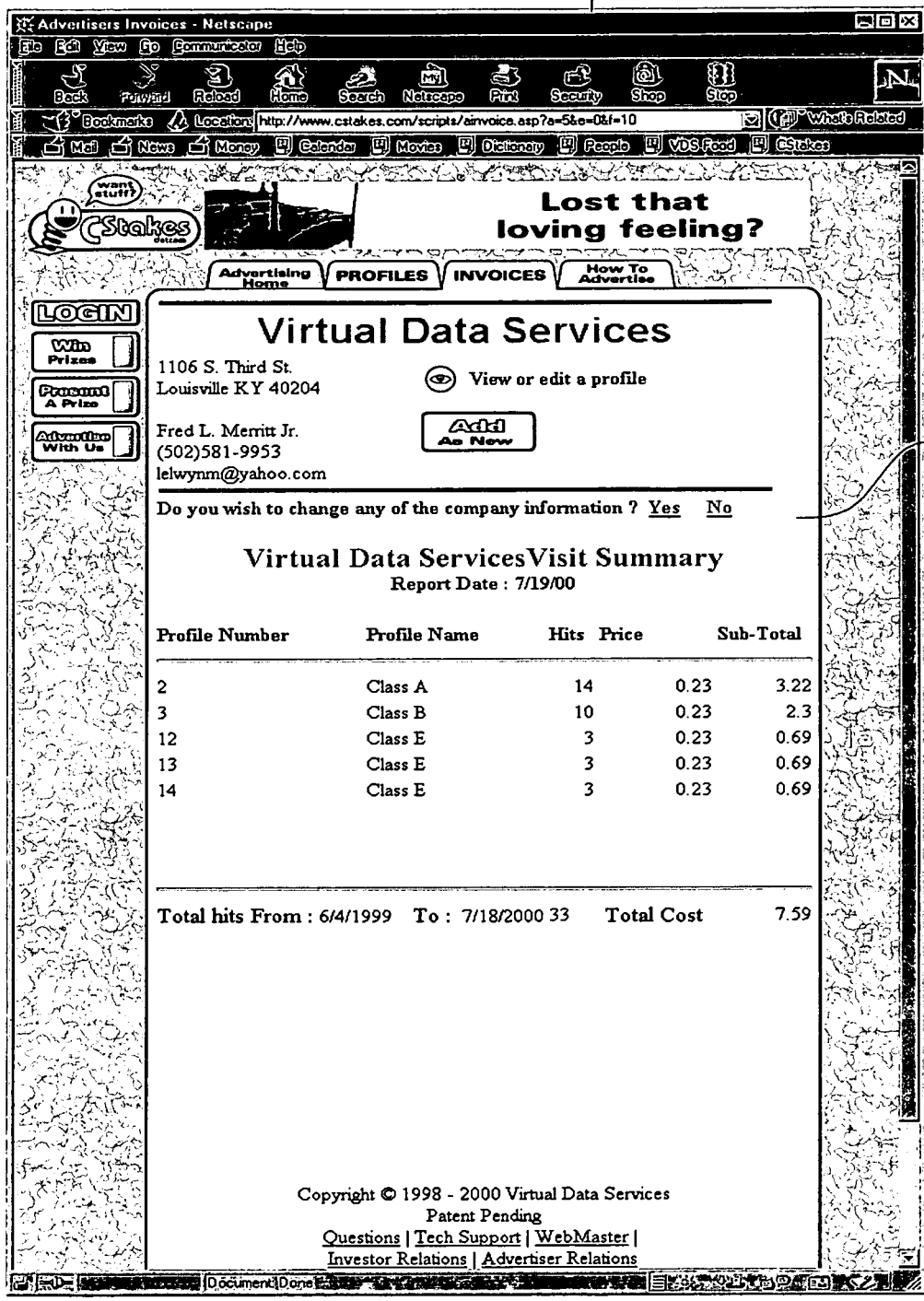
FIG. 56 depicts an example of a VISIT SUMMARY SCREEN in the preferred system.

The INVOICES SCREEN 240 also displays in the central message window 14 a listing of reports the user can select to view, specifically an Invoice Report, a Visit Summary Report, and a Visit Detail Report. To view the Invoices Report, the user can select the "Invoices" hyperlink 244 at SELECTION 804 of FIG. 53, and the INVOICES REPORT SCREEN 250 is displayed, as depicted in FIG. 55. To view the Visit Summary Report, the user can select the "Visit Summary Report" hyperlink 246 at SELECTION 806 of FIG. 53, and the VISIT SUMMARY SCREEN 270 is displayed, as depicted in FIG. 56. Finally, to view the Visit Detail Report, the user can select the "Visit Detail Report" hyperlink 248 at SELECTION 808 of FIG. 53, and the VISIT DETAIL SCREEN 280 is displayed, as depicted in FIG. 57.

Figure 55A:
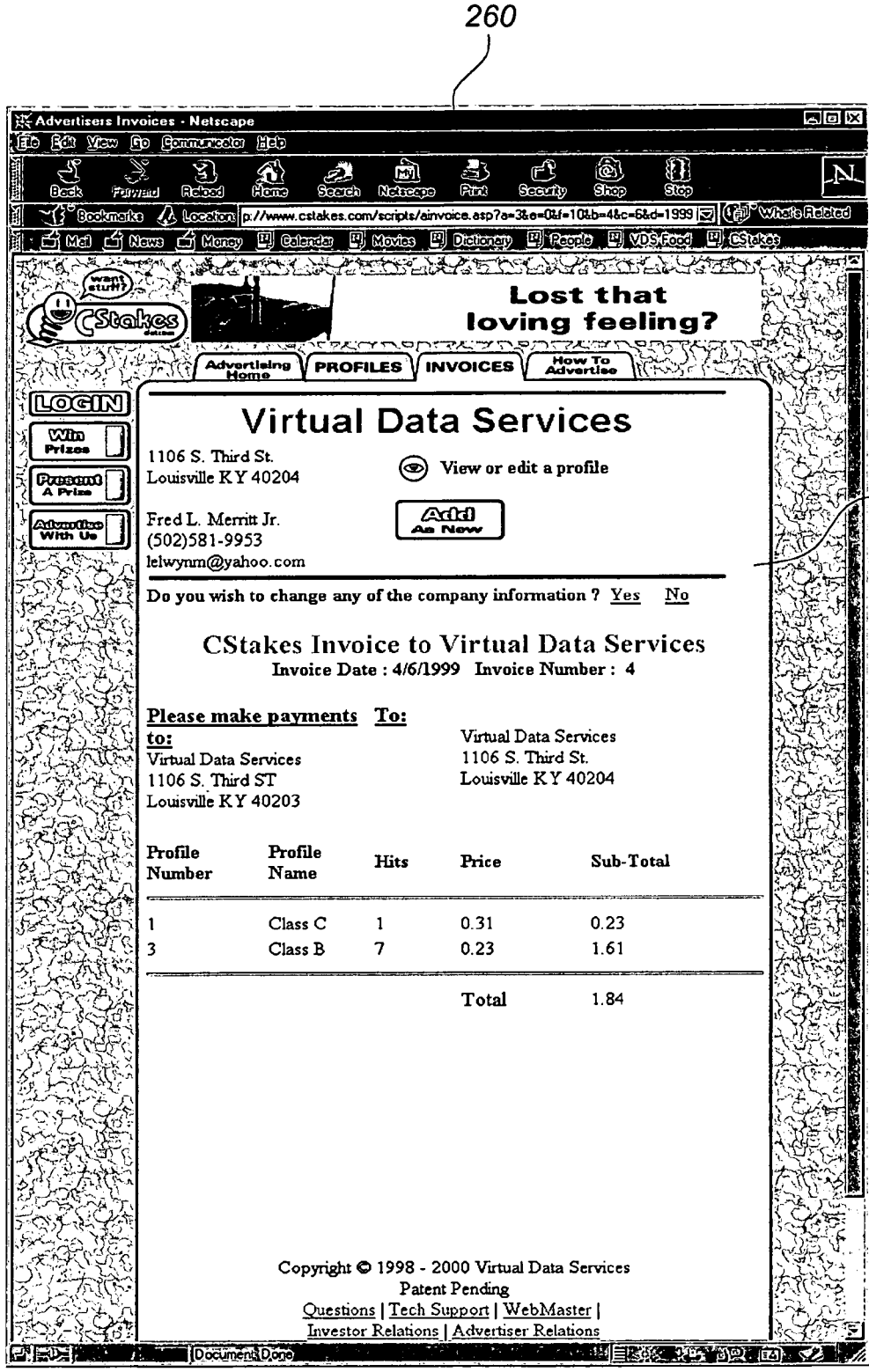

FIG. 55 depicts the INVOICES REPORT SCREEN 250. As with all of the invoice-related screens, the INVOICES REPORT SCREEN displays in the central message window 14 the various identifying information about the advertiser. More importantly, the INVOICES REPORT SCREEN 250 also displays in the central message window 14 a listing of current invoices. By selection the appropriate hypertext link 252, the user can view a specific invoice; an example of such a INVOICE 260 is depicted in FIG. 55A.

FIG. 56 depicts the VISIT SUMMARY SCREEN 270. The primary purpose of the VISIT SUMMARY SCREEN 270 is to provide in the central message window 14 a summary of the hits, or re-directions, that have been performed with respect to each of the advertiser's profile.

Figure 57:
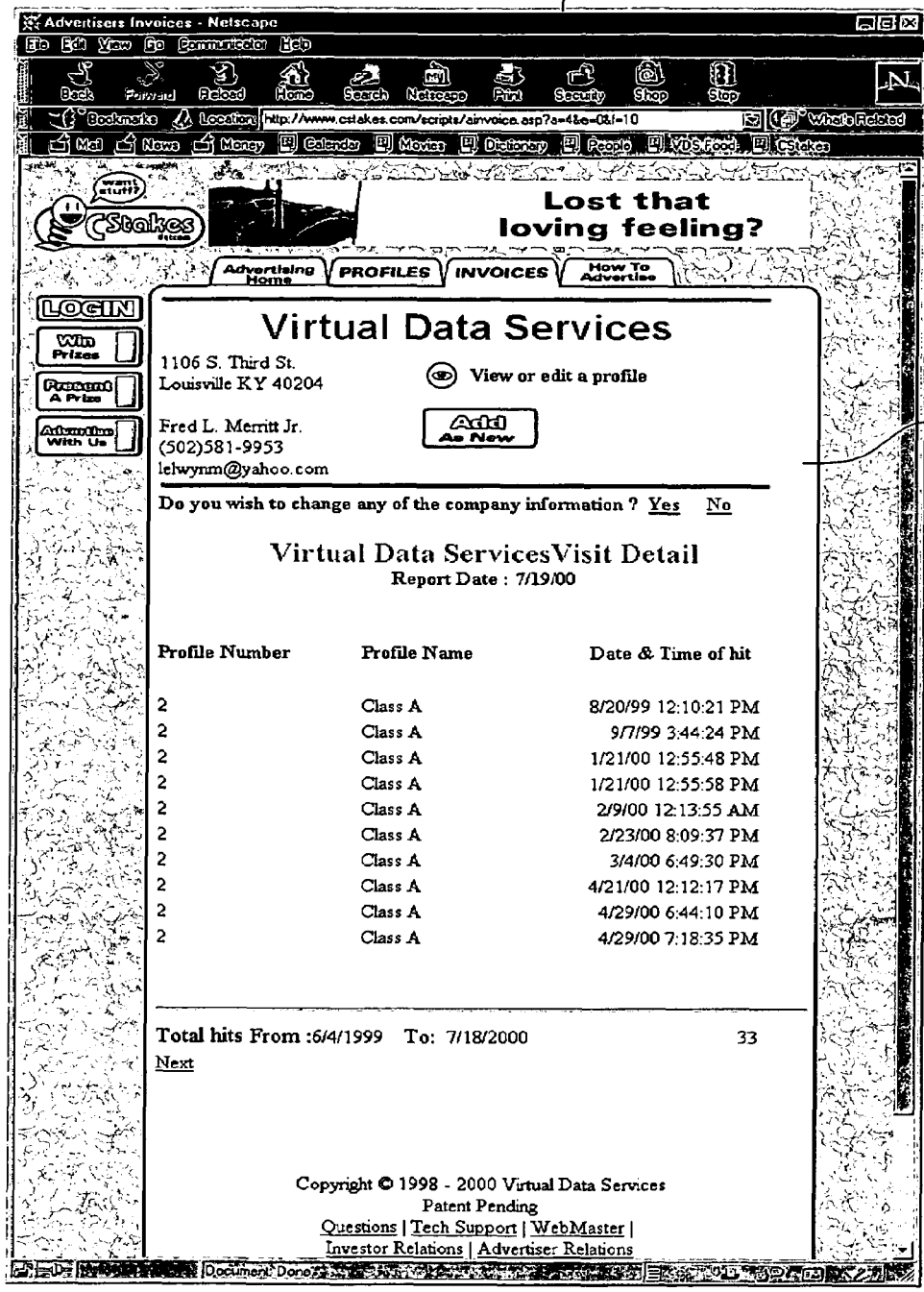
FIG. 57 depicts an example of a VISIT DETAIL SCREEN in the preferred system.

FIG. 57 depicts the VISIT DETAIL SCREEN 280. The primary purpose of the VISIT DETAIL SCREEN 280 is to provide in the central message window 14 a detailed listing of all hits, or re-directions, that have been performed with respect to each of the advertiser's profiles. In this regard, the advertiser can see on what dates and at what time re-directions were performed, information that the advertiser can verify through a review of its web site statistical data.

Figure 50:
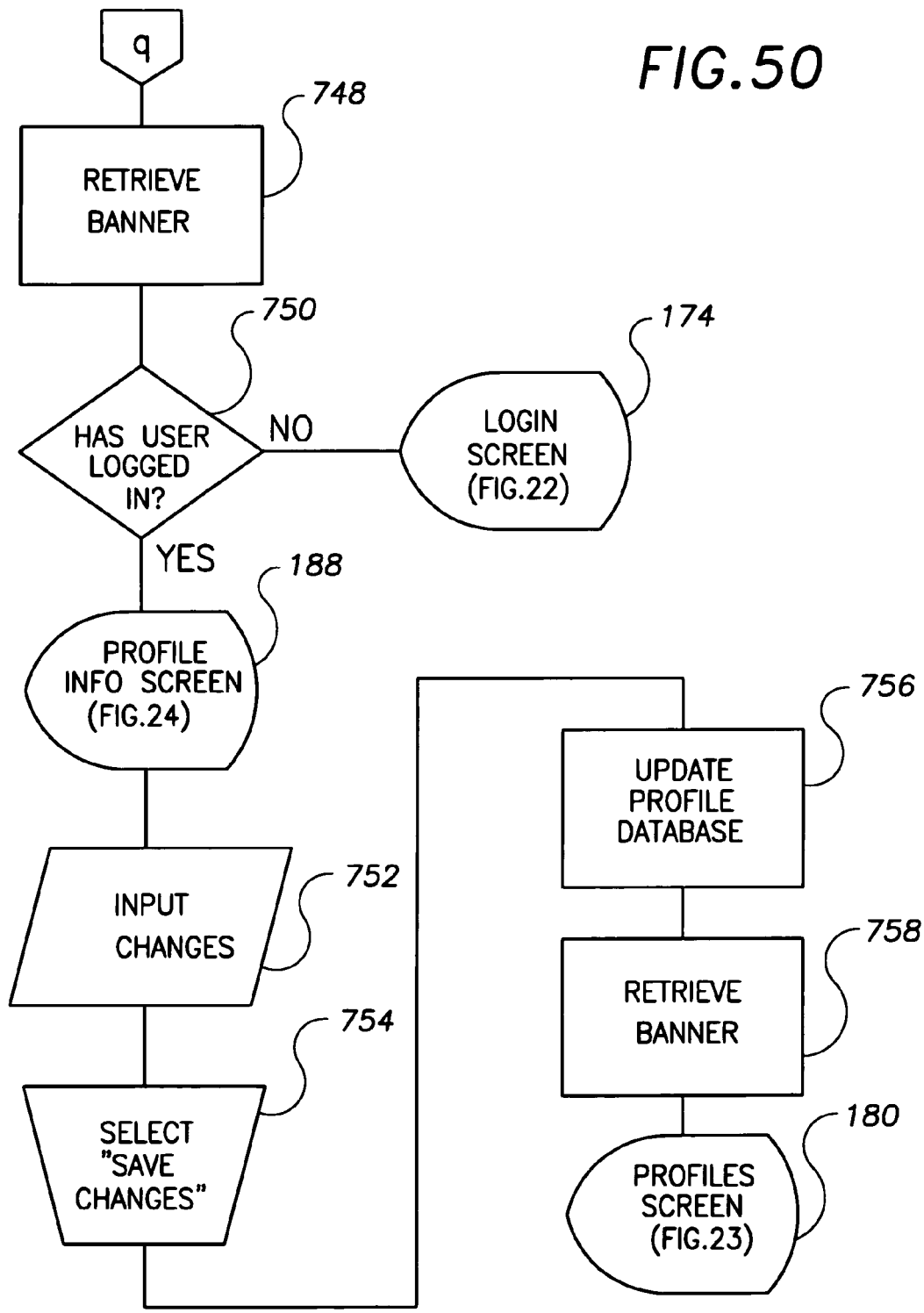

FIG. 50 depicts the operation and function of the "PROFILE_EDIT" subroutine described above. Specifically, the subroutine first retrieves a new advertising banner at RETRIEVE BANNER 748. The second step in the subroutine is the determination at DECISION 750 as to whether the user has logged into the system. If not, the user is re-directed to the LOGIN SCREEN 174, as depicted in FIG. 22. If the user has already logged into the system, the PROFILE INFO SCREEN 188 is displayed for the particular profile, as depicted in FIG. 24.

Figure 24:
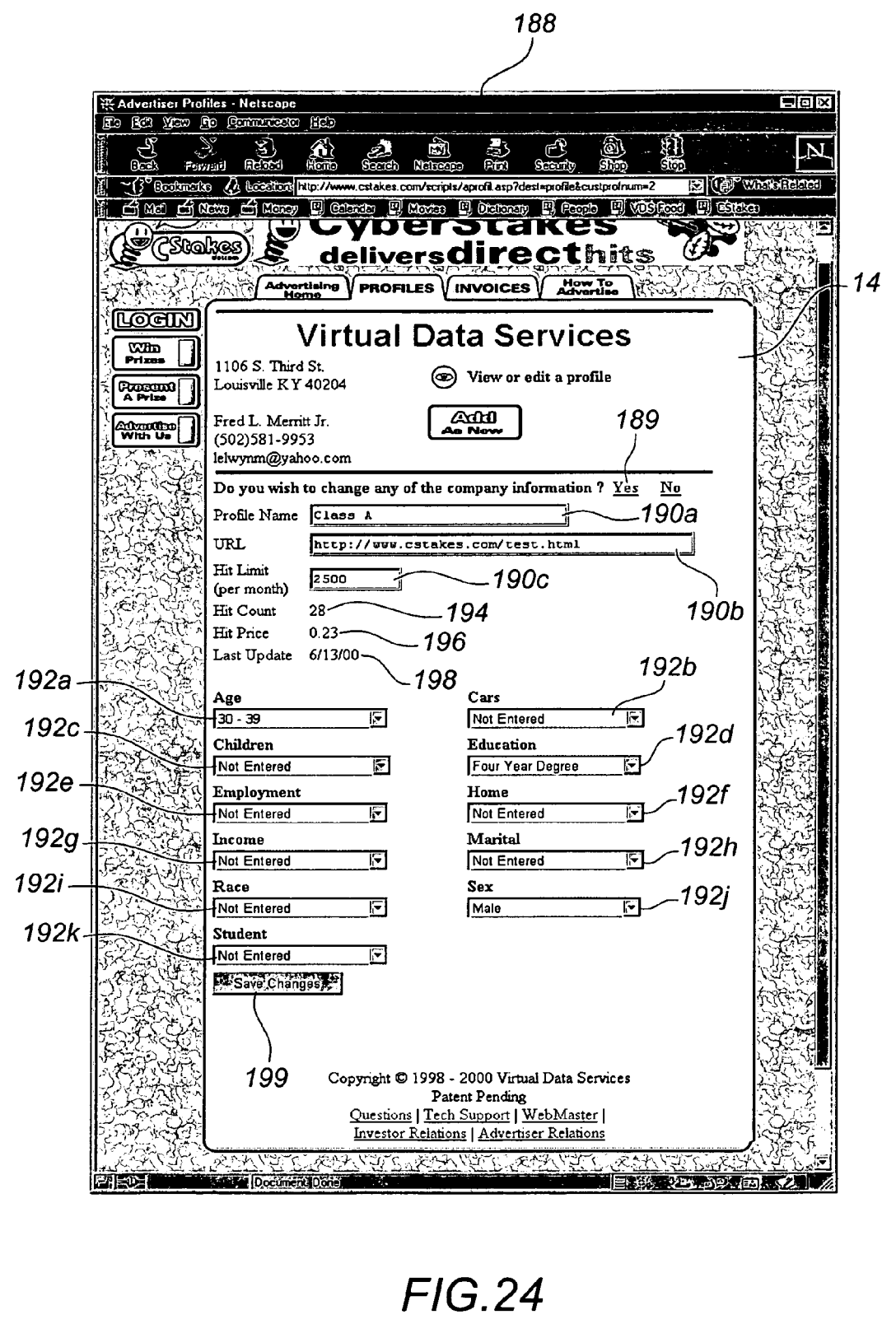

As shown in FIG. 24, the PROFILE INFO SCREEN 188 displays in the central message window 14 the various identifying information about the advertiser. Although not indicated in the flow chart of FIG. 50, the user again has the option of editing or revising any of this identifying information. Specifically, by selecting the YES hyperlink 189 in the central message window 14, the "UPDATE_COMPANY" subroutine is executed as will be described further below with reference to FIG. 52.

More importantly, the PROFILE INFO SCREEN 188 displays in the central message window 14 specific information about the profile selected, retrieving such information from the integral PROFILE DATABASE. In this case, there are data fields 190 for Profile Name 190*a*, URL (for re-direction) 190*b*, and Hit Limit 190*c*. Of course, the "Profile Name" is simply a descriptor that identifies the profile to the advertiser and has no real effect in the system. However, the URL is important because it identifies the web site to which a player will be re-directed if he matches the target profile. And, the "Hit Limit" is simply a statement by the advertiser as to which how much he is willing to pay each month. In this example, the advertiser will pay for the first 500 "hits" of the month.

Additionally, there are pull-down menus 192 that allow a user to define the target demographic. In this case, there are pull-down menus 192 associated with Age 192*a*, Cars 192*b*, Children 192*c*, Education 192*d*, Employment 192*e*, Home 192*f*, Income 192*g*, Marital 192*h*, Race 192*i*, Sex 192*j*, and Student 192*k*. Of course, other menus could be included for establishing additional criteria that define the target demographic without departing from the spirit and scope of the present invention.

The user can change one or more of the entries in these data fields using a conventional computer keyboard, a mouse, or a similar peripheral device at INPUT 752 of FIG. 50. Once such changes have been made, selection of the SAVE CHANGES button 199 at SELECTION 754 of FIG. 50 causes the revised information to be stored in the integral PROFILE DATABASE at UPDATE 756 of FIG. 50. A new advertising banner is retrieved at RETRIEVE BANNER 758. The system then returns the user to the PROFILES SCREEN 180, as depicted in FIG. 23.

Returning again to FIG. 24, the PROFILE INFO SCREEN 188 further preferably displays information about the current "Hit Count" 194, the negotiated "Hit Price" 196, and the date of the "Last Update" 198.

Figure 51:
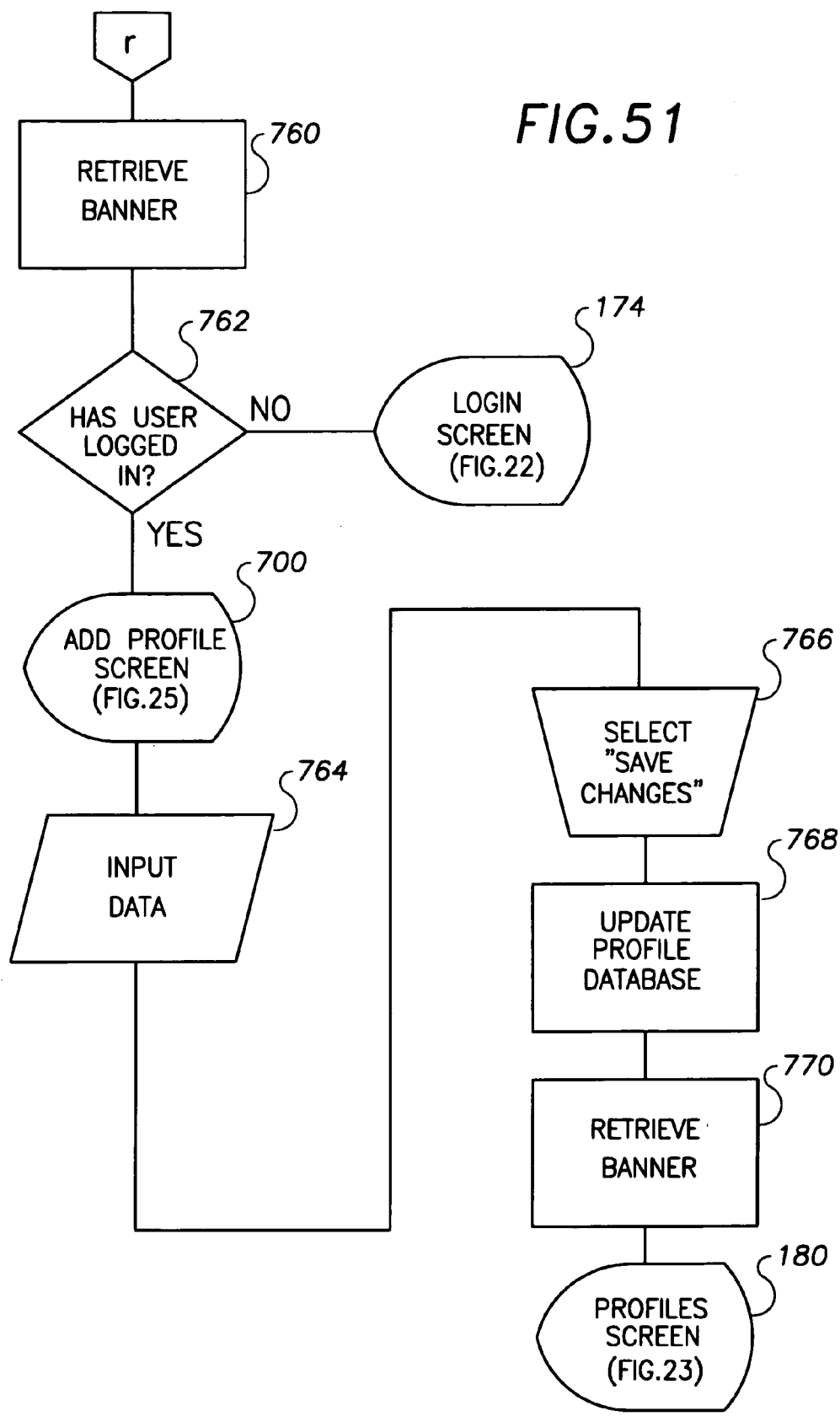

FIG. 51 depicts the operation and function of the "ADD_PROFILE" subroutine described above. Specifically, the subroutine first retrieves a new advertising banner at RETRIEVE BANNER 760. The second step in the subroutine is the determination at DECISION 762 as to whether the user has logged into the system. If not, the user is re-directed to the LOGIN SCREEN 174, as depicted in FIG. 22. If the user has already logged into the system, the ADD PROFILE SCREEN 200 is displayed, as depicted in FIG. 25.

Figure 25:
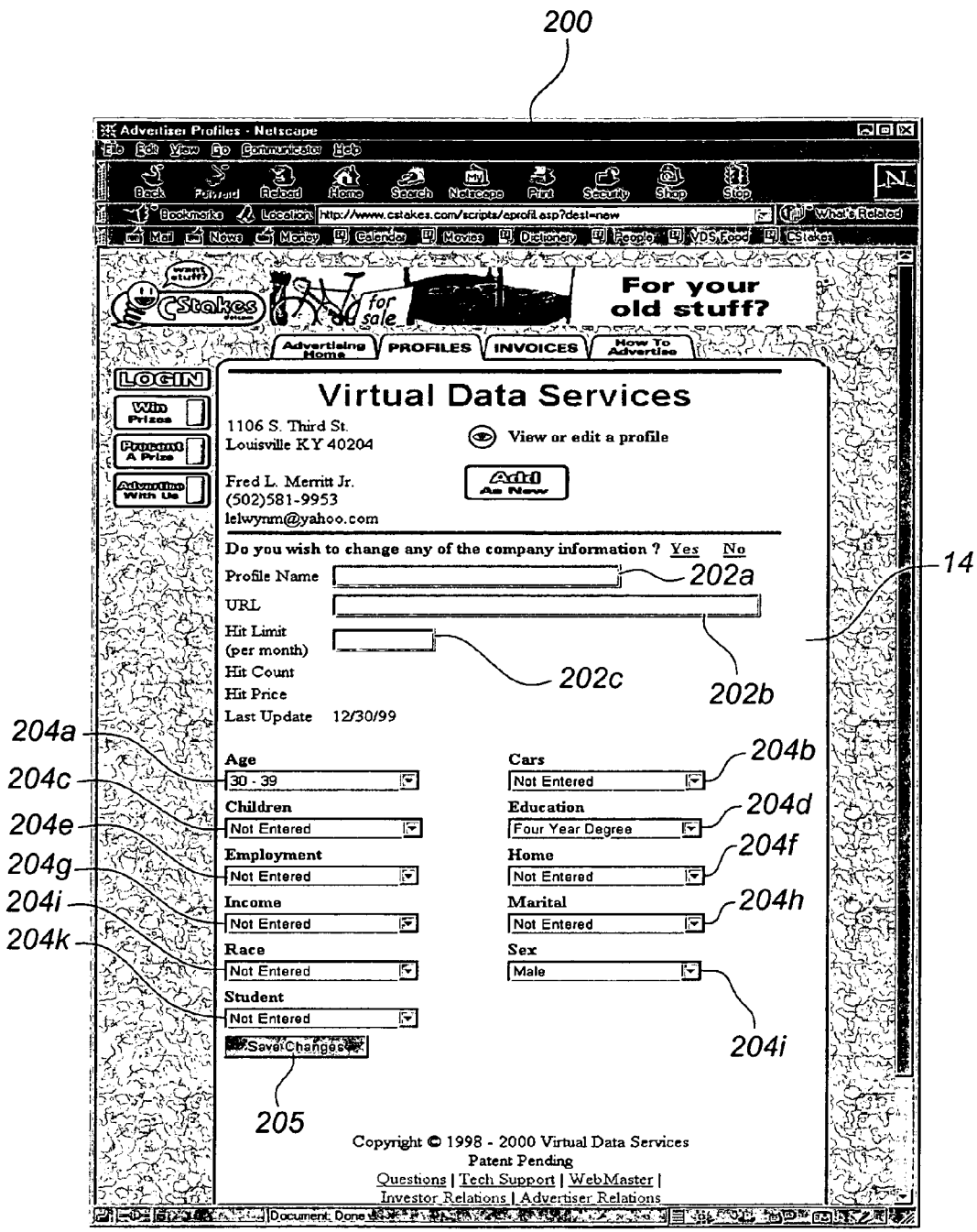
FIG. 25 depicts an example of an ADD PROFILE SCREEN in the preferred system.

As shown in FIG. 25, the ADD PROFILE SCREEN 200 is almost identical to the PROFILE INFO SCREEN 188 depicted in FIG. 24. More specifically, the ADD PROFILE SCREEN 188 also displays in the central message window 14 the various identifying information about the advertiser. Additionally, the ADD PROFILE SCREEN 200 displays in the central message window 14 empty data fields 200 in which information about the profile can be entered, including: the Profile Name 202*a*, URL (for re-direction) 202*b*, and Hit Limit 202*c*, each of which was described above. Additionally, there are pull-down menus 204 that allow a user to define the target demographic. In this case, there are pull-down menus 204 associated with Age 204*a*, Cars 204*b*, Children 204*c*, Education 204*d*, Employment 204*e*, Home 204*f*, Income 204*g*, Marital 204*h*, Race 204*i*, Sex 204*j*, and Student 204*k*. Of course, other menus could be included for establishing additional criteria that define the target demographic without departing from the spirit and scope of the present invention.

The user enters the requisite information is these various data fields using a conventional computer keyboard, a mouse, or a similar peripheral device at INPUT 764 of FIG. 51. Once all requisite information has been entered, selection of the SAVE CHANGES button 205 at SELECTION 766 of FIG. 51 causes the new information to be stored in the integral PROFILE DATABASE at UPDATE 768 of FIG. 51. A new advertising banner is retrieved at RETRIEVE BANNER 770. The system then returns the user to the PROFILES SCREEN 180, as depicted in FIG. 23.

Figure 26:
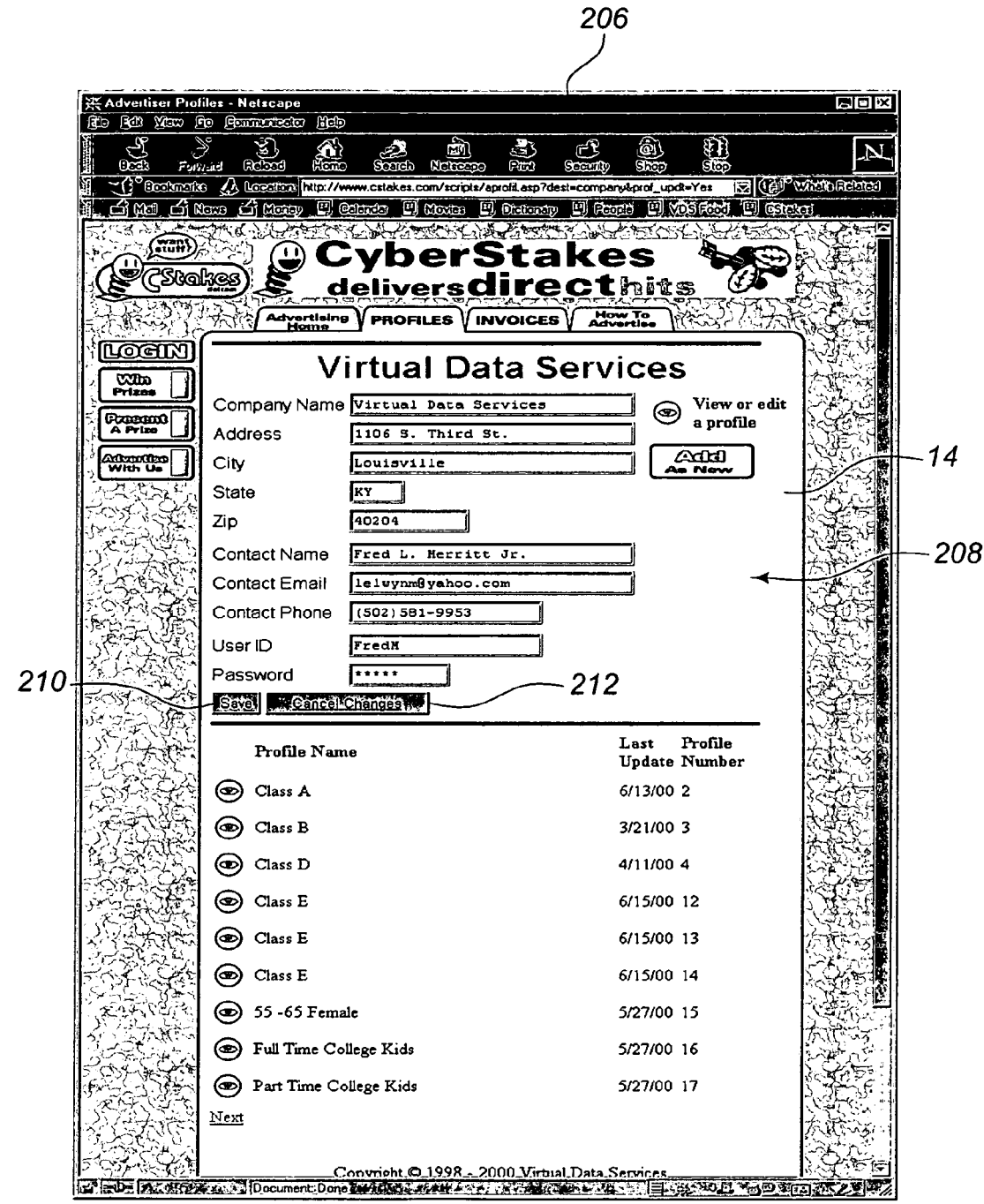
FIG. 26 depicts an example of an UPDATE SCREEN 200 in the preferred system.
Figure 52:
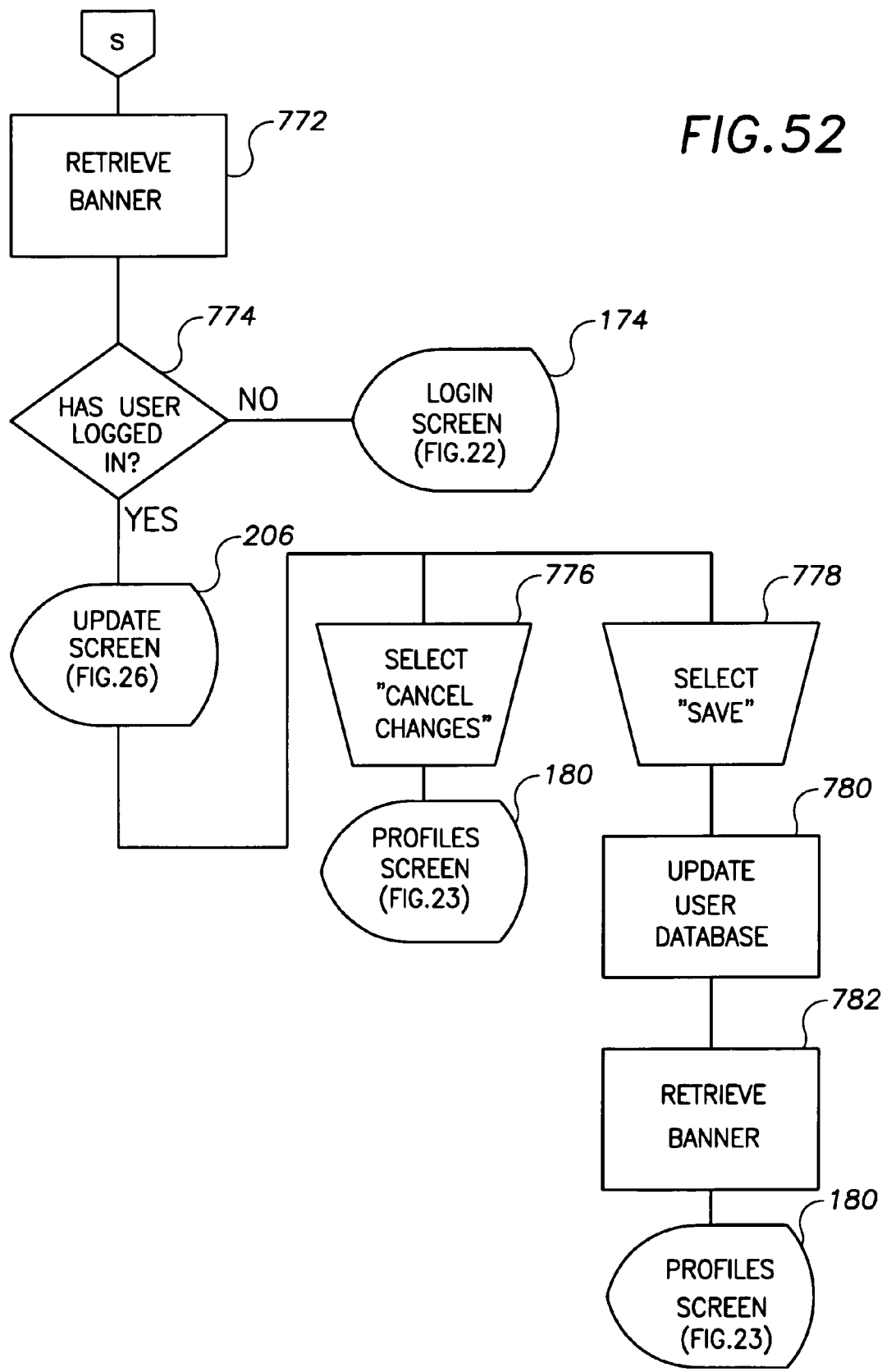

FIG. 52 depicts the operation and function of the "UPDATE_COMPANY" subroutine described above. Specifically, the subroutine first retrieves a new advertising banner at RETRIEVE BANNER 772. The second step in the subroutine is the determination at DECISION 774 as to whether the user has logged into the system. If not, the user is re-directed to the LOGIN SCREEN 174, as depicted in FIG. 22. If the user has already logged into the system, the UPDATE SCREEN 200 is displayed, as depicted in FIG. 26.

In the central message window 14 of the UPDATE SCREEN 112, there are multiple data entry fields, indicated generally by reference numeral 208, that allow the user to revise the identifying information about the advertiser that is stored in the integral ADVERTISER DATABASE. In this particular embodiment, the following information is stored in the ADVERTISER DATABASE and may be changed by the advertiser:

TABLE 4

Company Name
Address
City
State
Zip
Contact Name
Contact Email
Contact Phone
User ID
Password It is contemplated and preferred that this information be entered through a conventional computer keyboard or similar peripheral device. Once the user has revised any or all of the data, selection of the SAVE button 210 at SELECTION 778 of FIG. 52 causes this information to be stored in the integral USER DATABASE at UPDATE 780. A new advertising banner is retrieved at RETRIEVE BANNER 782. The system then returns the user to the PROFILES SCREEN 180, as depicted in FIG. 23.

If the user changes his mind and no changes to the identifying information are necessary, selection of the CANCEL CHANGES button 212 at SELECTION 776 of FIG. 52 returns the user to the PROFILES SCREEN 180, as depicted in FIG. 23, with no updates being made to the ADVERTISER DATABASE.

Finally, in relation to "advertiser" options, as discussed above, by selecting the HOW TO ADVERTISE tab 172d, the user can view instructions on how to advertise, that is, instructions on how the preferred system works. FIG. 27 depicts a preferred HOW TO ADVERTISE SCREEN 230. As shown in FIG. 27, various text and associated hyperlinks can be displayed in the central message window 14 of the HOW TO PRESENT SCREEN 230.

To carry out execution of the routines and subroutines of the referred system described above, it is understood that standard Hypertext Markup Language (HTML) and associated programming languages and techniques would be used. With benefit of the foregoing description, such programming is readily accomplished by one of ordinary skill in the art.

Furthermore, it will be obvious to those skilled in the art that modifications may be made to the preferred embodiments described herein without departing from the spirit and scope of the present invention.

The invention claimed is:

1. A system for re-directing users of a global information network to specific advertisements resident on said network, wherein said system includes a sweepstakes component, comprising:
    a first database storing and maintaining identifying information related to a plurality of users, said users having registered with the system and being classified as a sweepstakes player, a prize presenter, or an advertiser;
    a second database storing and maintaining information related to a plurality of prizes to be distributed through the sweepstakes component of the system, each of said prizes being associated with a prize presenter registered with the system; and
    a third database storing and maintaining target advertising profiles, each of said profiles being associated with an advertiser registered with the system;
    wherein when a sweepstakes player enters a sweepstakes for a particular prize, the identifying information related to said sweepstakes player stored and maintained in said first database is compared to the target advertising profiles stored and maintained in said third database, and said user is directed to a specific advertisement of a particular advertiser registered with the system based on said comparison;
    wherein said particular advertiser pays a predetermined amount for the directing of said sweepstakes player to the specific advertisement; and
    wherein said sweepstakes is conducted to distribute the particular prize once a predetermined revenue has been generated by the directing of users to advertisements.

2. A system as recited in claim 1, wherein said databases are maintained and accessed by a central control computer integrally connected to said global information network.

3. A system as recited in claim 1, wherein said global information network is the World Wide Web portion of the global Internet.

4. A system as recited in claim 3, wherein said system is accessed by users through an Internet browser.

5. A system as recited in claim 1, wherein the identifying information associated with each sweepstakes player comprises a plurality of discreet demographic descriptors.

6. A system as recited in claim 5, wherein said advertising profiles are defined by a plurality of discreet demographic descriptors.

7. A system as recited in claim 6, wherein the comparison of the identifying information related to each said sweepstakes player to each said target advertising profile is carried out through a comparison of the discreet demographic descriptors.

8. A system as recited in claim 1, wherein a selling price for each of said prizes is established by the associated prize presenter.

9. A system as recited in claim 8, wherein said predetermined revenue required for distribution of each said prize is greater that the established selling price of each said prize.

10. A system incorporating a sweepstakes component for directing Internet traffic to web sites having specific advertisements resident thereon, and generating revenue based upon the number of users directed to said web sites, comprising:
    a central station storing (a) identifying information related to a plurality of registered users, each of said users being classified as a sweepstakes player, a prize presenter, or an advertiser, (b) a list of prizes and information related thereto each associated with a registered prize presenter, and (c) a plurality of target advertising profiles each associated with a registered advertiser; and a plurality of advertisement web sites each associated with one of said registered advertisers and a particular advertising profile;

said central station, in response to each of said sweepstakes players entering into said system and selecting one of said prizes from the list, (a) comparing identifying information of each of said entering and selecting sweepstakes players with said target advertising profiles and directing each entering and selecting sweepstakes players to a specific advertisement web site based on said comparisons, (b) determining revenue due from each registered advertiser in proportion to the number of times a specific advertisement web site associated with said registered advertiser was visited by entering and selecting sweepstakes players, and (c) randomly selecting one of said entering and selecting sweepstakes players for awarding said selected prize thereto when said revenue equals a predetermined value.

11. A method for re-directing users of a global information network to specific advertisements resident on said network, wherein said method includes a sweepstakes component, comprising the steps of:

registering a plurality of sweepstakes players, each of said players providing demographic information in response to a series of inquiries, said demographic information being stored and maintained in an integral user database;

registering a plurality of prize presenters, each of said prize presenters providing identifying information that is stored and maintained in said integral user database, and each of said prize presenters registering one or more prizes for distribution through the sweepstakes component of the system, the selling price of each prize being established by the prize presenter, and the selling price and identifying information associated with each prize being stored and maintained in an integral prize database;

registering a plurality of advertisers, each of said advertisers providing identifying information that is stored and maintained in said integral user database, and each of said advertisers registering one or more target demographic profiles that are stored and maintained in an integral profile database;

providing a means for a particular sweepstakes player to enter a sweepstakes for a particular prize registered with the system, upon entry into said sweepstakes, the demographic information of the particular sweepstakes player as stored and maintained in the integral user database being compared to the target demographic profiles stored and maintained in the integral profile database;

re-directing the particular sweepstakes player to an advertisement of a particular advertiser registered with the system based on said comparison, said particular advertiser paying a predetermined amount for the re-direction of said sweepstakes player to the advertisement; and distributing the particular prize to one of the sweepstakes players that have entered the sweepstakes for the particular prize through a random drawing, said drawing being initiated when the advertising revenue generated through re-direction of sweepstakes players exceeds the selling price established by the prize presenter by a predetermined amount.

12. A method for causing increased viewing of advertisements displayed on web sites of a global information network using a sweepstakes contest, comprising the steps of:

storing a list of prizes to be awarded a winner of a sweepstakes contest and displaying information pertaining to each prize on said global information network;

storing a list of sweepstakes players and information associated with each of said players;

storing a list of advertisers and demographic profiles associated with each of said advertisers;

receiving a selection of a prize from said list of prizes from each of said players entering the global information network and comparing said information associated with each of said players with said demographic profiles;

placing each of said players entering said network in communication with a specific advertisement web site of one of said advertisers based upon a match between said information associated with said players entering said network and said demographic profiles; and randomly selecting one of said players selecting said prize for an award thereto of said prize when a predetermined value proportional to the number of times each of said entering players was placed in communication with said specific advertisement web sites has been reached.

13. A method as recited in claim 12, in which a predetermined sum is a paid to a presenter of said awarded prize.

14. A network for the display of an item for sale, said network utilizing a sweepstakes contest for the sale of said item, including:

a multiplicity of individual user computers for displaying said item, each of said computers adapted to receive an individual user's affirmation to enter the sweepstakes contest associated with said item, each of said individual users having inputted specific identifying data;

a central control computer for receiving and storing said identifying data, establishing a value for said item marked up from a price provided by a seller of said item, and transmitting the display of said item to said individual user computers, said central control computer further having an advertiser database and matching said stored identifying data with one or more advertisers in said advertiser database when an affirmation is received; and a plurality of advertising computers for storing and communicating advertisements;

wherein said central control computer, in response to receiving an affirmation from each of said individual user computers, placing each of said individual user computers in communication with the advertising computer of said matched advertiser for the display of an advertisement on said individual user computer, hereinafter referred to as a "re-direction," said matched advertisers paying a predetermined amount for each such re-direction;

continuously counting the number of re-directions;

determining the product of said counted re-directions and the predetermined amount assigned to each re-direction as paid by the matched advertisers, closing said sweepstakes contest when said product equals said established value, and randomly selecting one of said users associated with a communicated affirmation for award of said item.

* * * * *